US009555855B2

(12) United States Patent
Iwai et al.

(10) Patent No.: US 9,555,855 B2
(45) Date of Patent: Jan. 31, 2017

(54) BICYCLE SPROCKET

(71) Applicant: Shimano Inc., Sakai, Osaka (JP)

(72) Inventors: Toru Iwai, Osaka (JP); Toyoshi Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 141 days.

(21) Appl. No.: 14/199,057

(22) Filed: Mar. 6, 2014

(65) Prior Publication Data
US 2014/0335986 A1  Nov. 13, 2014

Related U.S. Application Data

(63) Continuation-in-part of application No. 14/140,848, filed on Dec. 26, 2013, which is a continuation-in-part of application No. 13/888,539, filed on May 7, 2013.

(51) Int. Cl.
*F16H 55/30* (2006.01)
*F16H 55/06* (2006.01)
*B62M 9/10* (2006.01)

(52) U.S. Cl.
CPC ................... *B62M 9/105* (2013.01)

(58) Field of Classification Search
CPC .......... F16H 55/30; F16H 55/06; F16H 55/12; B62M 9/105; B62M 9/10
USPC .................................................. 474/161, 152
See application file for complete search history.

(56) References Cited

U.S. PATENT DOCUMENTS

| | | | | |
|---|---|---|---|---|
| 566,750 A | * | 9/1896 | Gardner | F16H 57/05 474/161 |
| 2,721,485 A | * | 10/1955 | Bombardier | B62D 55/0963 474/161 |
| 3,469,468 A | * | 9/1969 | Cozzarin | F16H 55/06 474/161 |
| 3,590,456 A | * | 7/1971 | Seaman | F16H 55/16 29/893.37 |
| 3,630,098 A | * | 12/1971 | Oxley | B29C 45/1642 474/161 |
| 4,453,924 A | * | 6/1984 | Sugino | B62M 9/105 474/160 |
| 4,472,164 A | * | 9/1984 | Pusch | B62D 55/125 305/199 |

(Continued)

FOREIGN PATENT DOCUMENTS

| CN | 201313616 Y | 9/2009 |
|---|---|---|
| CN | 201914398 U | 8/2011 |

(Continued)

*Primary Examiner* — Henry Liu
(74) *Attorney, Agent, or Firm* — Global IP Counselors

(57) ABSTRACT

A bicycle sprocket includes a sprocket body and a plurality of sprocket teeth. The sprocket teeth extend radially outwardly from an outer periphery of the sprocket body. The sprocket body includes a first layered member, a second layered member and a third layered member. The first layered member has a first axial surface and a second axial surface. The second layered member is attached to the first axial surface such that the first and second layered members overlap each other in an axial direction as viewed parallel to a rotational axis. The third layered member is attached to the second axial surface such that the first and third layered members overlap each other in the axial direction as viewed parallel to the rotational axis. At least one of the second and third layered members has at least one concavo-convex portion.

20 Claims, 27 Drawing Sheets

(56) References Cited

U.S. PATENT DOCUMENTS

| | | | | |
|---|---|---|---|---|
| 4,589,860 | A * | 5/1986 | Brandenstein | F16H 55/06 474/152 |
| 4,867,733 | A * | 9/1989 | Yamanoi | B62M 9/00 474/161 |
| 4,869,709 | A * | 9/1989 | Nagano | B62M 9/08 474/152 |
| 5,865,699 | A * | 2/1999 | Leini | B27B 17/08 29/527.2 |
| 6,014,808 | A * | 1/2000 | Santi | F16H 55/06 29/893.3 |
| 6,540,630 | B1 * | 4/2003 | Oertley | B62D 55/0963 305/137 |
| 6,899,651 | B2 * | 5/2005 | Oertley | F16H 55/12 305/137 |
| 7,491,143 | B2 * | 2/2009 | Valle | B62M 9/105 474/152 |
| 7,824,287 | B2 * | 11/2010 | Nonoshita | B62M 9/10 474/152 |
| 7,850,564 | B2 * | 12/2010 | Nonoshita | B62M 9/105 474/152 |
| 7,947,149 | B2 * | 5/2011 | Myatt | B29C 33/485 156/324 |
| 7,967,709 | B2 * | 6/2011 | Emura | B62M 9/105 474/160 |
| 9,033,835 | B2 * | 5/2015 | Blank | B62M 9/10 474/152 |
| 2002/0086753 | A1 * | 7/2002 | Yahata | B62M 9/105 474/160 |
| 2003/0199351 | A1 * | 10/2003 | Nichols | B62M 9/10 474/160 |
| 2005/0233850 | A1 * | 10/2005 | Andel | F16H 55/06 474/152 |
| 2007/0161443 | A1 * | 7/2007 | Krisl | B65G 23/06 474/95 |
| 2010/0081530 | A1 * | 4/2010 | Crump | B21K 1/30 474/152 |
| 2013/0143704 | A1 * | 6/2013 | Blank | B62M 9/10 474/161 |

FOREIGN PATENT DOCUMENTS

| | | |
|---|---|---|
| DE | 202010009082 U1 | 11/2011 |
| DE | 202010009083 U1 | 11/2011 |
| EP | 1375334 A1 | 1/2004 |
| JP | 62-23187 U | 2/1987 |
| TW | M356692 U | 5/2009 |

* cited by examiner

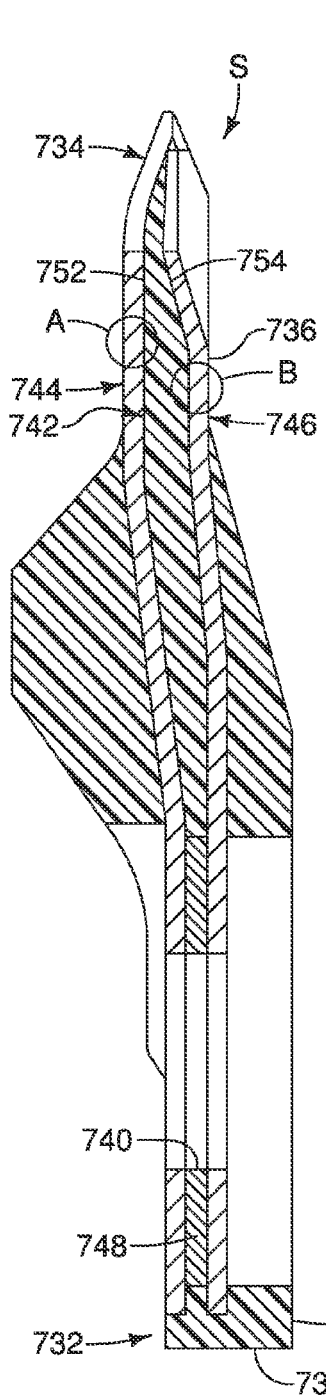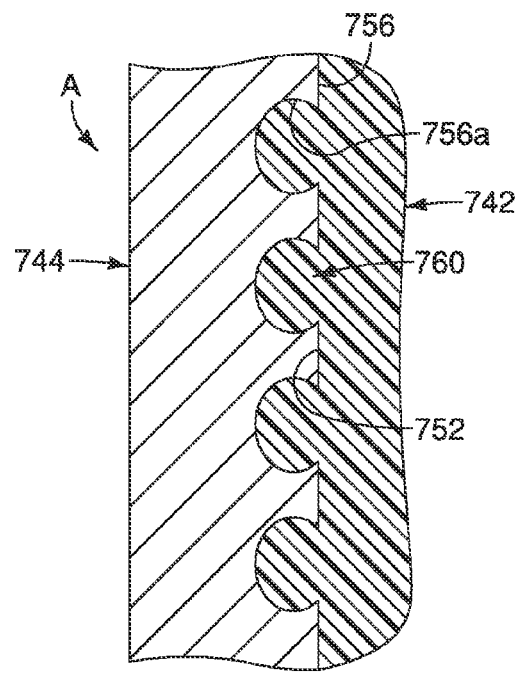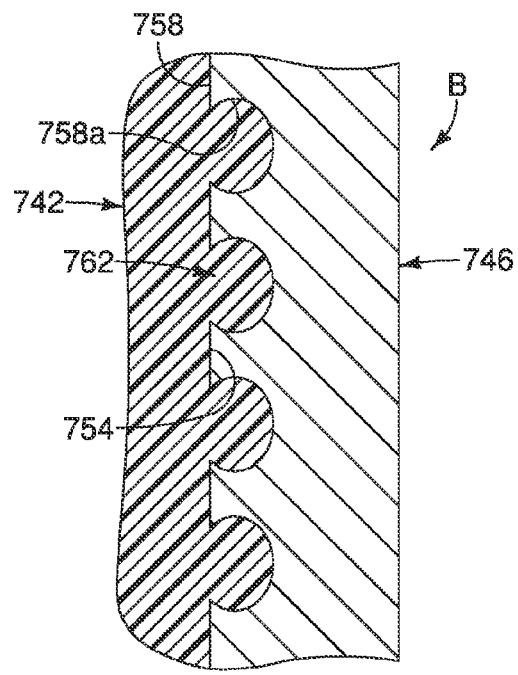
FIG. 29
FIG. 30
FIG. 31

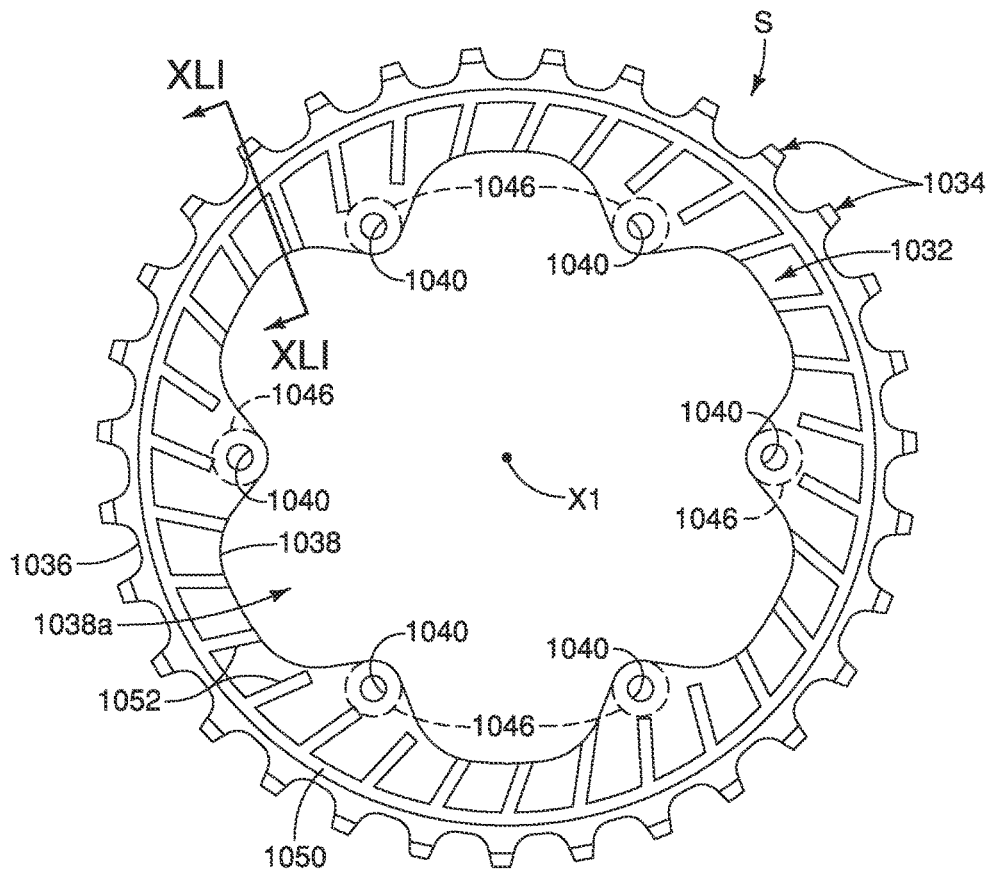
FIG. 39
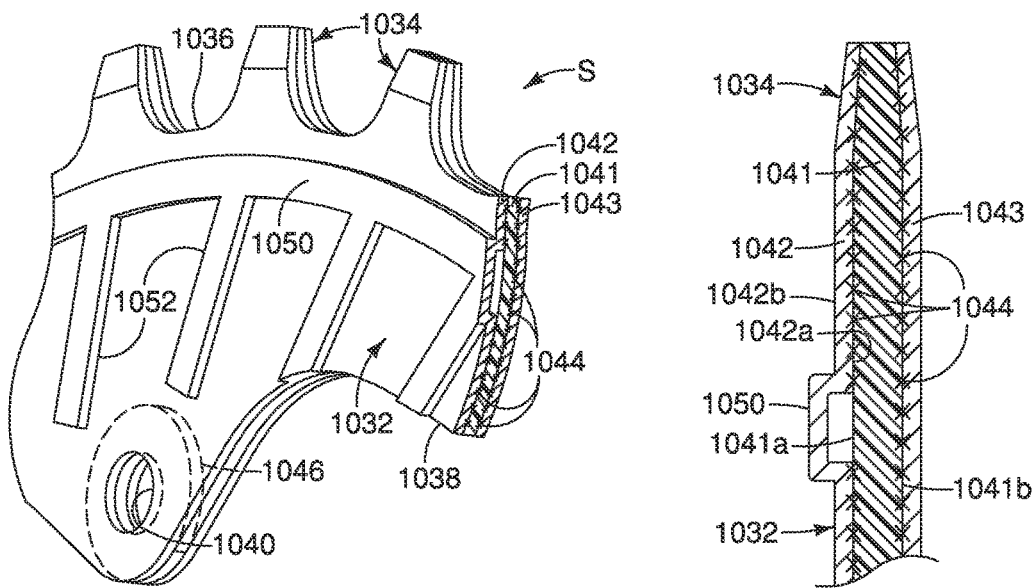
FIG. 40
FIG. 41

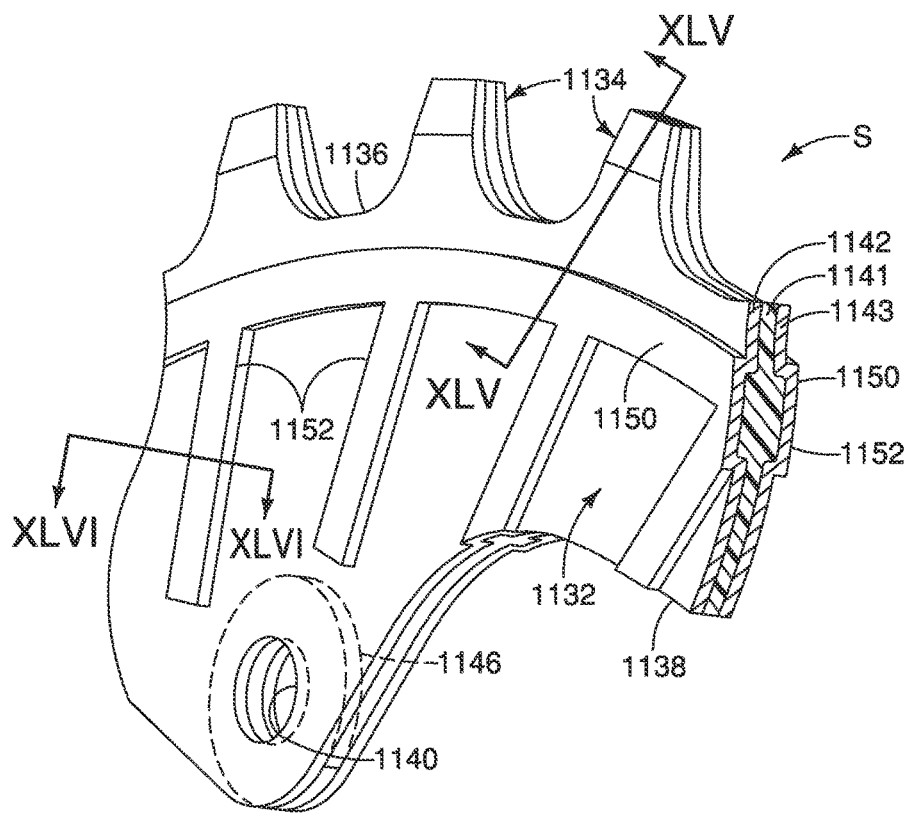
FIG. 44
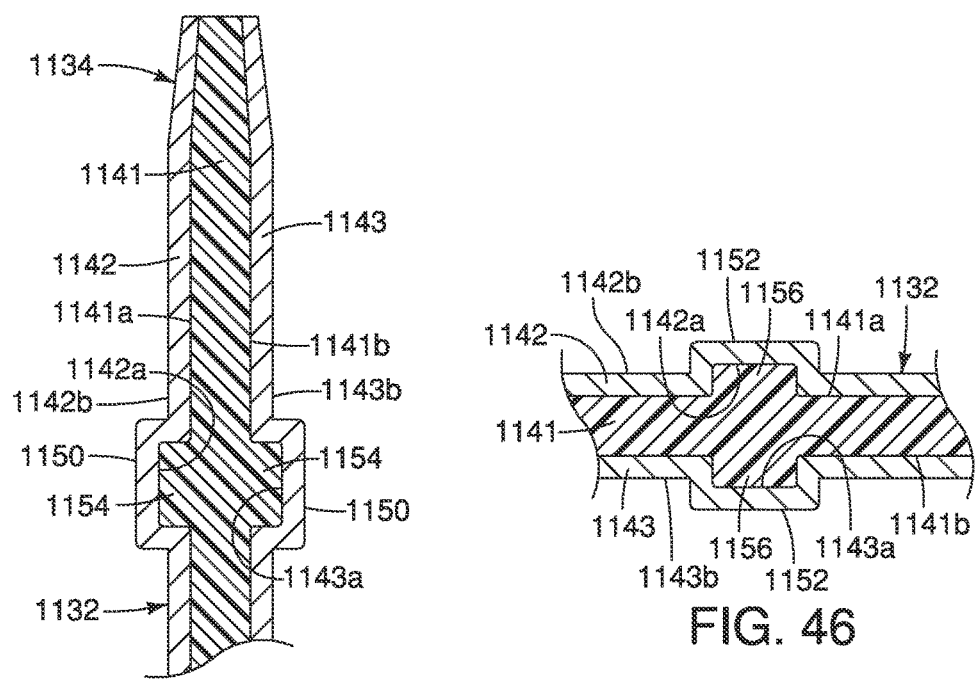
FIG. 45
FIG. 46

BICYCLE SPROCKET

CROSS-REFERENCE TO RELATED APPLICATIONS

This application is a continuation-in-part application of U.S. patent application Ser. No. 14/140,848, filed on Dec. 26, 2013, which in turn is a continuation-in-part application of U.S. patent application Ser. No. 13/888,539, filed on May 7, 2013. The entire disclosures of U.S. patent application Ser. Nos. 13/888,539 and 14/140,848 are hereby incorporated herein by reference.

BACKGROUND

Field of the Invention

This invention generally relates to a bicycle sprocket. More specifically, the present invention relates to a bicycle sprocket with a multi-layered structure.

Background Information

In recent years, bicycle component manufacturers have been manufacturing bicycle transmissions that have more available speeds to the rider. As the available speeds in the bicycle transmission increases, the number of sprockets installed on the rear wheel also usually increases. While sprockets can be made thinner, a minimum spacing between adjacent sprockets is required to accommodate the chain. Moreover, a rear end of a conventional bicycle frame only has a limited amount of space for mounting the wheel and a rear sprocket assembly. Thus, there is a desire to increase the number gears without changing the dimensions of the conventional bicycle frame. Accordingly, various attempts have been made in order to increase the maximum number of sprocket that can be installed on a rear hub assembly. For example, some multiple sprocket assemblies use a spider (sprocket support), which supports a plurality of ring-shaped sprocket wheels. By using a spider, a light metal such as aluminum, etc., is generally used for the spider, while various types of steel materials are used for the sprockets to provide adequate strength.

SUMMARY

Generally, the present disclosure is directed to various features of a bicycle sprocket with a multi-layered structure. Thus, one object of the present disclosure is to provide a bicycle sprocket with a multi-layered structure.

In accordance with a first aspect of the present invention, a bicycle sprocket is provided that basically comprises a sprocket body and a plurality of sprocket teeth. The sprocket body has a rotational axis. The sprocket teeth extend radially outwardly from an outer periphery of the sprocket body. The sprocket body includes a first layered member, a second layered member and a third layered member. The first layered member has a first axial surface and a second axial surface opposite to the first axial surface. The second layered member is attached to the first axial surface of the first layered member such that the first and second layered members overlap each other in an axial direction as viewed parallel to the rotational axis. The third layered member is attached to the second axial surface such that the first and third layered members overlap each other in the axial direction as viewed parallel to the rotational axis. At least one of the second and third layered members has at least one concavo-convex portion. According to the first aspect of the present invention, it is possible to effectively save weight of the bicycle sprocket while maintaining necessary rigidity.

In accordance with a second aspect of the present invention, the bicycle sprocket according to the first aspect is configured so that the first layered member has a specific gravity that is less than those of the second layered member and the third layered member. According to the second aspect of the present invention, it is possible to effectively improve weight distribution of the bicycle sprocket.

In accordance with a third aspect of the present invention, the bicycle sprocket according to the first aspect is configured so that at least one of the first and second axial surfaces of the first layered member has a convex portion that mates with the at least one concavo-convex portion. According to the third aspect of the present invention, it is possible to effectively maintain the rigidity of the bicycle sprocket.

In accordance with a fourth aspect of the present invention, the bicycle sprocket according to the third aspect is configured so that no gap exists at an interface between the at least one concavo-convex portion and the convex portion. According to the fourth aspect of the present invention, it is possible to further effectively maintain the rigidity of the bicycle sprocket.

In accordance with a fifth aspect of the present invention, the bicycle sprocket according to the first aspect is configured so that the at least one of the second and third layered members being attached to the first layered member by an integral molding process. According to the fifth aspect of the present invention, it is possible to effectively and quickly manufacture the bicycle sprocket.

In accordance with a sixth aspect of the present invention, the bicycle sprocket according to the first aspect is configured so that the at least one of the second and third layered members is attached to the first layered member by adhesive. According to the sixth aspect of the present invention, it is possible to inexpensively attach at least one of the second and third layered members to the first layered member.

In accordance with a seventh aspect of the present invention, the bicycle sprocket according to the first aspect is configured so that the at least one of the second and third layered members is attached to the first layered member by diffusion bonding. According to the seventh aspect of the present invention, it is possible to firmly attach at least one of the second and third layered members to the first layered member.

In accordance with an eighth aspect of the present invention, the bicycle sprocket according to the first aspect is configured so that the first layered member is made of a first metallic material, the second layered member is made of a second metallic material, the third layered member is made of a third metallic material, and the first metallic material being different from the second and third metallic materials. According to the eighth aspect of the present invention, it is possible to select lightweight materials to save weight of the bicycle sprocket while maintaining necessary rigidity.

In accordance with a ninth aspect of the present invention, the bicycle sprocket according to the first aspect is configured so that the first layered member is made of a first non-metallic material, the second layered member is made of a second metallic material, the third layered member is made of a third metallic material. According to the ninth aspect of the present invention, it is possible to effectively obtain the necessary rigidity of the bicycle sprocket with the second and third layered members while save weight of the bicycle sprocket with the first non-metallic material of the first layered member.

In accordance with a tenth aspect of the present invention, the bicycle sprocket according to the first aspect is configured so that the each of the second and third layered members has at least one concavo-convex portion. According to the tenth aspect of the present invention, it is possible to further increase the rigidity of the bicycle sprocket.

In accordance with an eleventh aspect of the present invention, the bicycle sprocket according to the first aspect is configured so that the at least one concavo-convex portion extends in a circumferential direction with respect to the rotational axis of the sprocket body. According to the eleventh aspect of the present invention, it is possible to effectively resist bending of the bicycle sprocket.

In accordance with a twelfth aspect of the present invention, the bicycle sprocket according to the first aspect is configured so that the at least one concavo-convex portion extends generally in a radial direction with respect to the rotational axis of the sprocket body. According to the twelfth aspect of the present invention, it is possible to effectively resist bending of the bicycle sprocket.

In accordance with a thirteenth aspect of the present invention, the bicycle sprocket according to the first aspect is configured so that the at least one of the second and third layered members has a plurality of concavo-convex portions. According to the thirteenth aspect of the present invention, it is possible to more effectively resist bending of the bicycle sprocket.

In accordance with a fourteenth aspect of the present invention, the bicycle sprocket according to the thirteenth aspect is configured so that the plurality of concavo-convex portions includes a first concavo-convex portion extending in a circumferential direction with respect to the rotational axis of the sprocket body and a second concavo-convex portion extending generally in a radial direction with respect to the rotational axis of the sprocket body. According to the fourteenth aspect of the present invention, it is possible to effectively resist bending of the bicycle sprocket.

In accordance with a fifteenth aspect of the present invention, the bicycle sprocket according to the first aspect is configured so that at least one of the sprocket teeth includes the first layered member, the second layered member and the third layered member. According to the fifteenth aspect of the present invention, it is possible to provide a sprocket that is both rigid and lightweight.

In accordance with a sixteenth aspect of the present invention, the bicycle sprocket according to the twelfth aspect is configured so that the at least one concavo-convex portion inclines with respect to the radial direction with respect to the rotational axis of the sprocket body. According to the sixteenth aspect of the present invention, it is possible to reinforce the bicycle sprocket while minimizing weight.

In accordance with a seventeenth aspect of the present invention, the bicycle sprocket according to the twelfth aspect is configured so that the at least one concavo-convex portion is positioned radially inward from each of the sprocket teeth. According to the seventeenth aspect of the present invention, it is possible to effectively provide sufficient strength without interfering with the engagement of the chain with sprocket.

In accordance with an eighteenth aspect of the present invention, the bicycle sprocket according to the twelfth aspect is configured so that the at least one concavo-convex portion includes a plurality of concavo-convex portions equaling to a total number of the sprocket teeth. According to the eighteenth aspect of the present invention, it is possible to effectively provide sufficient strength according to the size of the bicycle sprocket.

Other objects, features, aspects and advantages of the disclosed bicycle sprocket will become apparent to those skilled in the art from the following detailed description, which, taken in conjunction with the annexed drawings, discloses embodiments of the bicycle sprocket.

BRIEF DESCRIPTION OF THE DRAWINGS

Referring now to the attached drawings which form a part of this original disclosure:

FIG. 29 is a partial cross sectional profile view of a portion of the bicycle sprocket illustrated in FIG. 27 as seen along section line XXIX-XXIX of FIG. 27;

FIG. 30 is an enlarged, partial cross sectional view of portion A of the bicycle sprocket in illustrated in FIG. 29;

FIG. 31 is an enlarged, partial cross sectional view of portion B of the bicycle sprocket in illustrated in FIG. 29;

FIG. 39 is a side elevational view of the bicycle sprocket in accordance with an eleventh embodiment;

FIG. 40 is a partial perspective view of the bicycle sprocket illustrated in FIG. 39 showing the layers of the sprocket body;

FIG. 41 is a partial cross sectional profile view of a portion of the bicycle sprocket illustrated in FIG. 39 as seen along section line XLI-XLI of FIG. 39;

FIG. 44 is a partial perspective view of the bicycle sprocket illustrated in FIGS. 42 and 43 showing the layers of the sprocket body;

FIG. 45 is a partial cross sectional profile view of a portion of the bicycle sprocket illustrated in FIGS. 42 to 44 as seen along section line XLV-XLV of FIG. 44;

FIG. 46 is a partial cross sectional profile view of a portion of the bicycle sprocket illustrated in FIGS. 42 to 45 as seen along section line XLVI-XLVI of FIG. 44;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
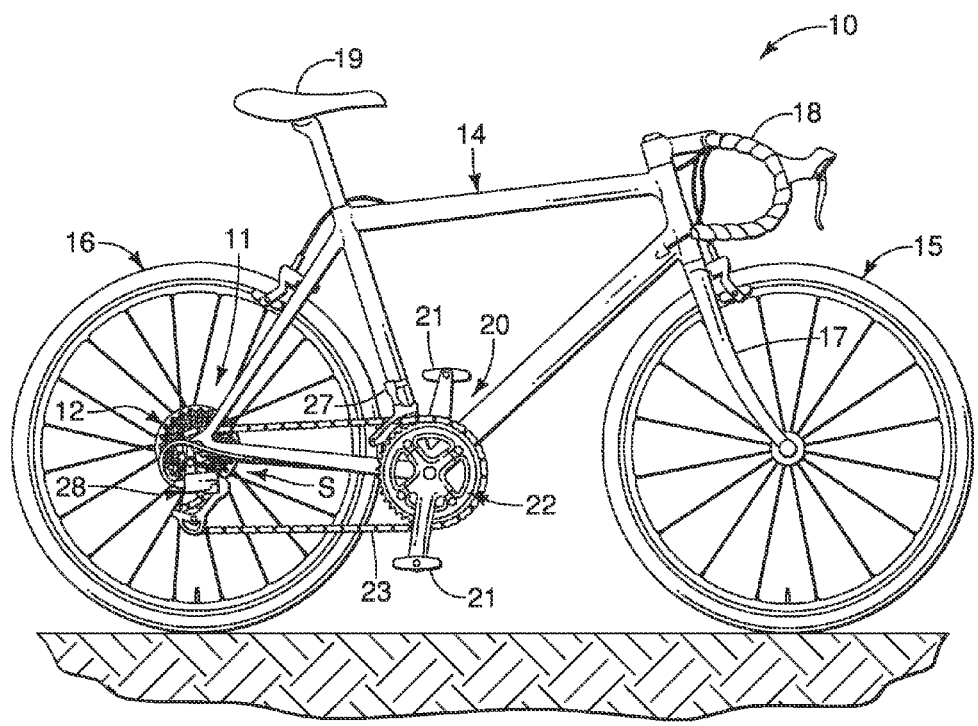
FIG. 1 is a side elevational view of a bicycle having a bicycle sprocket in accordance with a first embodiment.

Referring initially to FIG. 1, a bicycle 10 is illustrated having a rear bicycle hub 11 with a multi-stage rear sprocket assembly (cassette) 12 (e.g., a multiple sprocket assembly) in accordance with a first embodiment. While the bicycle 10 is illustrated as a road bike, it will be apparent to those skilled in the art from this disclosure that the present invention can be applied to other types of bicycles such as a mountain bike. The rear sprocket assembly 12 includes ten (10) rear sprockets S (e.g., a plurality of bicycle sprockets) that are mounted on the rear bicycle hub 11 with a plurality of spacers (or sprocket support members) arranged between the sprockets S. An innermost sprocket S of the rear sprocket assembly 12 is the largest, and has the most teeth, while an outermost sprocket S of the rear sprocket assembly 12 is the smallest, and has the fewest teeth. In the illustrated embodiment, the sprockets S have 34T, 30T, 26T, 23T, 21T, 19T, 17T, 15T, 13T, 11T tooth configurations, respectively. However, it will be apparent to those skilled in the bicycle art from this disclosure that the sprockets S can have different tooth configurations as needed and/or desired. Furthermore, it will be apparent to those skilled in the bicycle art from this disclosure that the rear sprocket assembly 12 can include different number of the sprockets S, such as less than or more than ten as needed and/or desired.

Referring to FIG. 1, the bicycle 10 basically has a frame 14 with front and rear wheels 15 and 16 rotatably coupled thereto. A front fork 17 is pivotally coupled to the front of the frame 14 with the front wheel 15 rotatably coupled thereto in a conventional manner. A handlebar 18 is rigidly attached to the front fork 17 in order to turn the front wheel 15 to steer the bicycle 10. The rear wheel 16 is rotatably coupled to a rear portion or rear triangle of the frame 14 via the rear bicycle hub 11 in a conventional manner. A seat 19 is adjustably coupled to the frame 14 via a seat post in a conventional manner, and a drive train 20 is provided on the bicycle 10 for propelling the bicycle 10. The bicycle 10 is conventional except for selected parts of the drive train 20, as discussed below.

The drive train 20 basically includes the rear multi-stage sprocket assembly 12, a pair of pedals 21, a front multi-stage sprocket assembly 22 mounted to rotate with the pedals 21, and a chain 23 extending between the rear multi-stage sprocket assembly 12 and the front multi-stage sprocket assembly 22. The rear sprocket assembly 12 is preferably coupled to the rear bicycle hub 11 via a freewheel. The pedals 21 are coupled to the front multi-stage sprocket assembly 22 by a conventional crank set to transfer force from the rider to the chain 23. The force from the chain 23 is selectively transferred to the rear wheel 16 via the rear bicycle hub 11 (e.g. via the rear sprocket assembly 12 depending on the direction of rotation) in a conventional manner. The chain 23 used in the drive train 20 is designed to be compatible with the rear ten-stage sprocket assembly 12. In particular, the chain 23 is a conventional chain used with a conventional rear sprocket assembly. Accordingly, the chain 23 will not be explained and/or illustrated in detail herein. Similarly, the front sprocket assembly 22 is configured to be compatible with the chain 23. Such front sprocket assembly 22 is well known in the bicycle art. Accordingly, the front sprocket assembly 22 will not be explained and/or illustrated in detail herein. Nevertheless, it will be apparent to those skilled in the art from this disclosure that the present invention can be applied to such a front sprocket assembly.

The drive train 20 is basically controlled by conventional front and rear shifting units (not shown) that control the lateral positions of front and rear derailleurs 27 and 28 in a conventional manner. Thus, when the rider is pedaling, the front and rear sprocket assemblies 22 and 12 are rotating to circulate or cycle the chain 23 due to the movement of the pedals 21. The shifting units (not shown) can be actuated by the rider to control the lateral positions of the front and/or rear derailleurs 27 and/or 28. When the chain 23 is circulated or cycled in the forward (clockwise direction as seen in FIG. 1), the shifting units can be actuated to control the gear ratio of the drive train 20 by controlling the lateral position of the chain 23 via the derailleurs 27 and 28 in a conventional manner. The derailleurs 27 and 28 selectively apply a lateral force outwardly/inwardly to the chain 23 to cause up/down shifts in a conventional manner. The drive train 20 is basically conventional, except for the rear multi-stage sprocket assembly 12 in the embodiment. Thus, the drive train 20 will not be discussed and/or illustrated in further detail herein, except as related to the rear multi-stage sprocket assembly 12.

Since the various parts of the bicycle 10 and most of the parts of the drive train 20 are well known in the bicycle art, these parts of the bicycle 10 and the drive train 20 will not be discussed and/or illustrated in detail herein, except as related to the present invention. However, it will be apparent to those skilled in the bicycle art from this disclosure that various conventional bicycle parts such as brakes, different hub structures, etc., which are not illustrated and/or discussed in detail herein, can be used in conjunction with the present invention as needed and/or desired.

Figure 2:
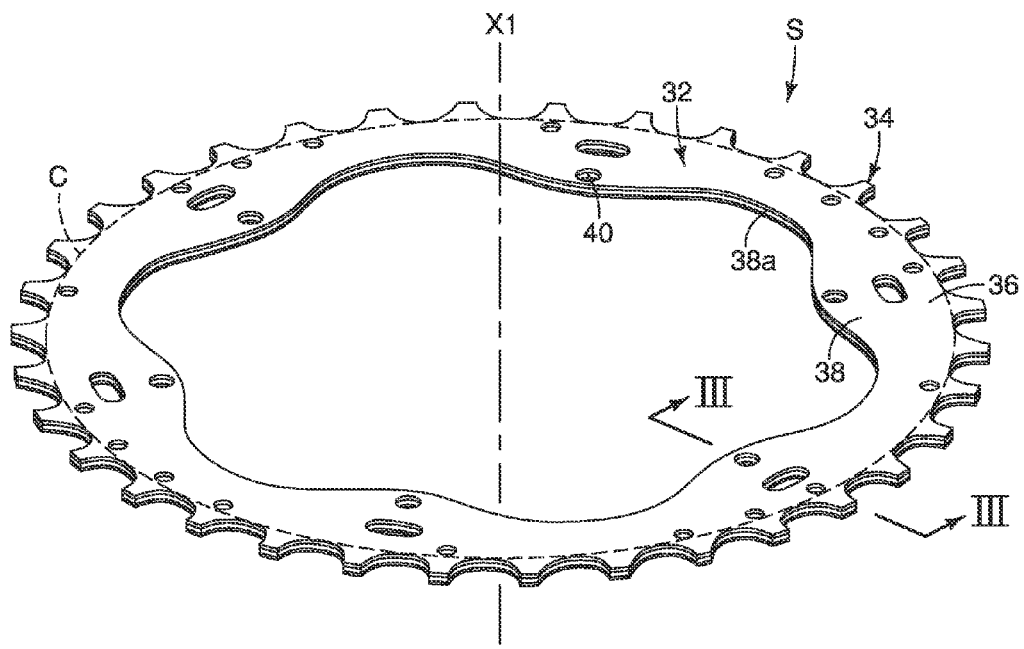
FIG. 2 is a perspective view of the bicycle sprocket of the bicycle illustrated in FIG. 1.
Figure 3:
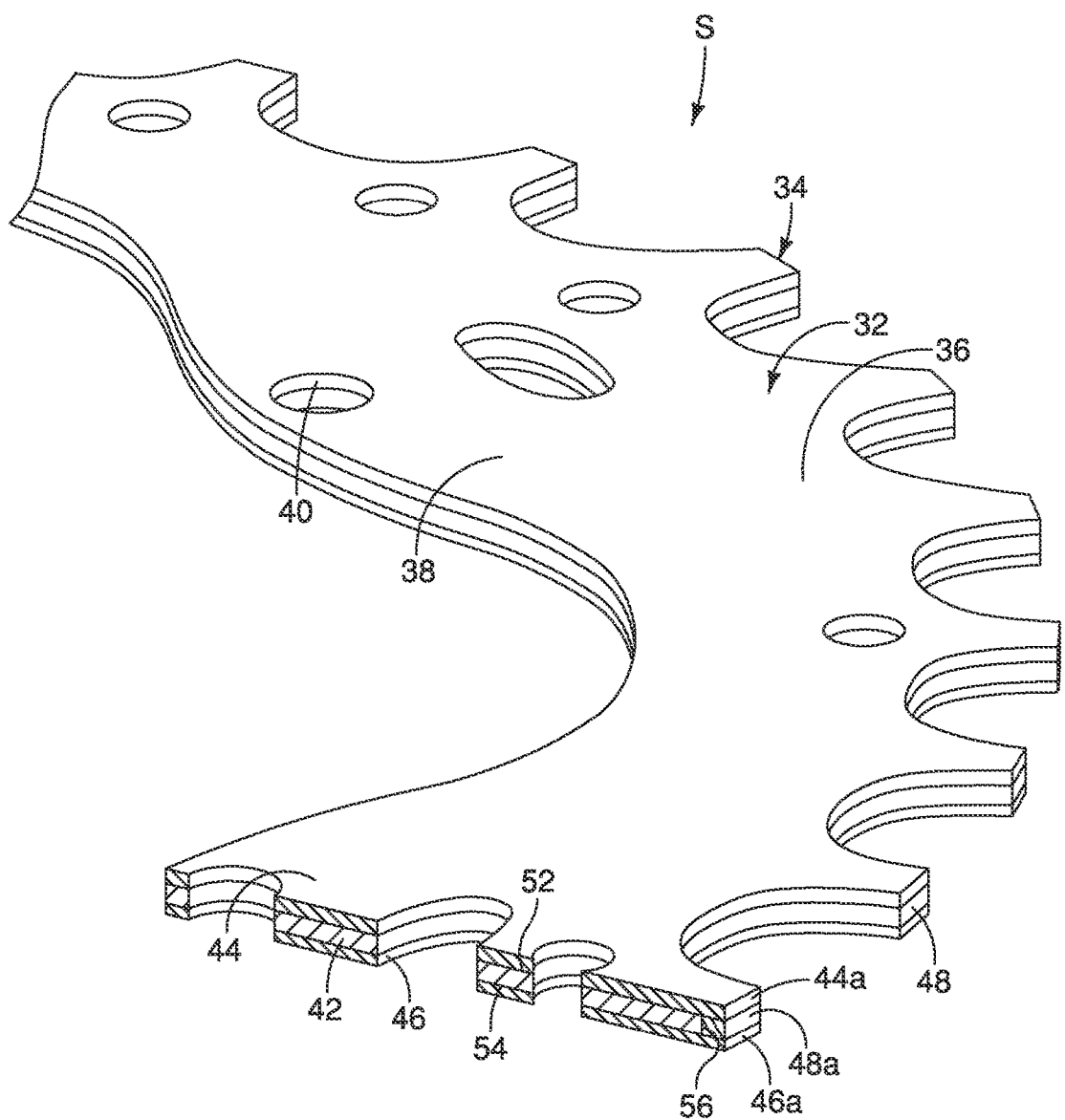
FIG. 3 is an enlarged, partial cross sectional view of the bicycle sprocket illustrated in FIG. 2 as seen along section line III-III of FIG. 2.

Referring now to FIGS. 2 and 3, the sprockets S of the rear sprocket assembly 12 will now be explained in more detail. As mentioned above, the rear sprocket assembly 12 includes ten (10) rear sprockets S that are mounted on the rear bicycle hub 11 with the spacers arranged between the sprockets S such that the sprockets S are spaced from each other at predetermined intervals. The spacers can have any conventional configuration as needed and/or desired. For example, the spacers can be each formed as a one-piece, unitary member that is made of suitable rigid and/or lightweight materials. For example, the spacers can be made of rigid resin materials or lightweight metallic materials such as aluminum. Since the spacers can be conventional, the spacers will not be discussed in detail herein. The sprockets S and the spacers are fixedly mounted on the rear bicycle hub 11 such that the sprockets S rotate together about a center hub rotation axis of the rear bicycle hub 11. The sprockets S typically rotate together in a forward rotational direction (e.g., in a clockwise direction as viewed in FIG. 1) when the rider is pedaling in a forward (clockwise) direction to propel the bicycle 10 in a forward direction as seen in FIG. 1.

In the illustrated embodiment, one of the sprockets S has a multi-layered structure as described below. Specifically, in the illustrated embodiment, as shown in FIG. 2, the largest one of the sprockets S (hereinafter merely referred as a "largest sprocket S" or "sprocket S") has the multi-layered structure. Of course, any one(s) of the sprockets S can have this multi-layered structure. However, in the illustrated embodiment, the other sprockets S other than the largest sprocket S have any conventional configuration as needed and/or desired. For example, these sprockets S other than the largest sprockets S can be each formed as a one-piece, unitary member from a metallic material that is suitable for a bicycle sprocket such as an iron or an iron alloy. Therefore, in the illustrated embodiment, the following disclosure will focus on the configuration of the largest sprocket S for the sake of brevity.

As shown in FIG. 2, the sprocket S (e.g., a bicycle sprocket) basically includes a sprocket body 32, and a plurality of sprocket teeth 34. The sprocket body 32 has a rotational axis X1. The sprocket body 32 includes an outer periphery 36 and an inner periphery 38. The sprocket S is radially straight as the sprocket S extends between the outer periphery 36 and the inner periphery 38. In other words, the sprocket S is generally a flat plate with opposite sprocket side surfaces being planar between the outer periphery 36 and the inner periphery 38 other than various holes and recesses. The inner periphery 38 defines an opening 38a that is free of any freewheel engaging splines. In the illustrated embodiment, the sprocket body 32 includes a plurality of fastener holes 40 for receiving outer rivets for fastening the sprocket S to the spacer. The sprocket teeth 34 extend radially outwardly from the outer periphery 36 of the sprocket body 32. In the illustrated embodiment, the sprocket body 32 is defined as a part of the sprocket S that is radially inwardly disposed with respect to an imaginary circle C (i.e., the root circle) connecting innermost positions of gaps circumferentially disposed between the sprocket teeth 34. As mentioned above, the sprocket S is larger than any other sprocket of the rear sprocket assembly 12. Since the sprocket S is the largest sprocket of the rear sprocket assembly 12, the total number of the sprocket teeth 34 is typically greater than the other sprockets of the rear sprocket assembly 12. In the illustrated embodiment, as shown in FIG. 2, the total number of the sprocket teeth 34 is thirty-four. Of course, the total number of the sprocket teeth 34 can be larger or smaller than thirty-four as needed and/or desired.

In the illustrated embodiment, as shown in FIG. 3, the sprocket S includes a first layered member 42, a second layered member 44, a third layered member 46, and a coating layer 48. In the illustrated embodiment, the first, second and third layered members 42, 44 and 46 extend radially outward from the inner periphery 38 of the sprocket body 32 to the sprocket teeth 34. Thus, in the illustrated embodiment, the plurality (e.g., all) of the sprocket teeth 34 includes the first layered member 42 and the second layered member 44. In the illustrated embodiment, the plurality of the sprocket teeth 34 further includes the third layered member 46. Furthermore, the plurality of the sprocket teeth 34 includes the coating layer 48. Alternatively or optionally, at least one (e.g., not all) of the sprocket teeth 34 can include the first layered member 42 and the second layered member 44. The at least one of the sprocket teeth 34 can also include the third layered member 46. Furthermore, the at least one of the sprocket teeth 34 can also include the coating layer 48.

On the other hand, in the illustrated embodiment, the sprocket body 32 includes the first layered member 42 and the second layered member 44. Furthermore, the sprocket body 32 includes the third layered member 46. Specifically, in the illustrated embodiment, the first, second and third layered members 42, 44 and 46 radially extend between the inner periphery 38 of the sprocket body 32 and the outer periphery 36 of the sprocket body 32 other than various holes and recesses.

As shown in FIG. 2, the first layered member 42 has a first axial surface 52 and a second axial surface 54 opposite to the first axial surface 52 with respect to the rotational axis X1. The second layered member 44 is attached to the first axial surface 52 of the first layered member 42. The third layered member 46 is attached to the second axial surface 54 of the first layered member 42. The coating layer 48 is formed on a radially end surface 56 of the first layered member 42. In the illustrated embodiment, the first, second and third layered members 42, 44 and 46 are flat layered members. Thus, the first and second layered members 42 and 44 overlap each other in an axial direction as viewed parallel to the rotational axis X1, while the first and second layered members 42 and 44 do not overlap each other in a radial direction as viewed perpendicularly to the rotational axis X1. Furthermore, the first and third layered members 42 and 46 overlap each other in the axial direction as viewed parallel to the rotational axis X1, while the first and third layered members 42 and 46 do not overlap each other in the radial direction as viewed perpendicularly to the rotational axis X1. In the illustrated embodiment, the first layered member 42 is axially disposed between the second and third layered members 44 and 46 such that the first layered member 42 is axially completely covered by the second and third layered members 44 and 46. Furthermore, the first layered member 42 is radially inwardly disposed relative to the coating layer 48 such that the radially end surface 56 of the first layered member 42 is radially completely covered by the coating layer 48. However, alternatively, the first layered member 42 can be partially exposed through the second and third layered members 44 and 46 in the axial direction, while the first layered member 42 can be partially exposed through the coating layer 48 in the radial direction. The coating layer 48 can be omitted as needed and/or desired so that the first layered member can be radially exposed and/or has the same outer contour as those of the second and third layered members.

The first layered member 42 has an axial thickness of preferably more than or equal to 0.1 mm. The first layered member 42 has a specific gravity that is less than that of the second layered member 44. Furthermore, in the illustrated embodiment, the first layered member 42 has a specific gravity that is less than that of the third layered member 46. The first layered member 42 is made of a material selected from the group consisting of aluminum, titanium, magnesium and beryllium. Specifically, in the illustrated embodiment, the first layered member 42 is made of quenched aluminum. However, alternatively, the first layered member 42 can be made of non-metallic material. Specifically, the non-metallic material of the first layered member 42 can includes resin. For example, the first layered member 42 can be made of hard plastic resin. Alternatively, the non-metallic material of the first layered member 42 can be fiber-reinforced material. For example, the first layered member 42 can be made of a carbon fiber-reinforced plastic or polymer (FRP).

The second layered member 44 has an axial thickness of preferably more than or equal to 0.1 mm. The second layered member 44 is made of metallic material. Specifically, in the illustrated embodiment, the second layered member 44 is made of iron. Of course, the second layered member 44 can be made of other metallic material. For example, the second layered member 44 can be made of stainless steel. In the illustrated embodiment, the second layered member 44 has a specific gravity that is equal to that of the third layered member 46. Specifically, in the illustrated embodiment, the second and third layered members 44 and 46 are made of the same material. However, of course, the second and third layered members 44 and 46 can be made of different materials as needed and/or desired. The second layered member 44 preferably has Vickers hardness larger than or equal to 400 (HV). The second layered member 44 is fixedly attached to the first layered member 42 in a suitable fixing manner. Specifically, in the illustrated embodiment, the first layered member 42 and the second layered member 44 are attached to each other by diffusion bonding. However, alternatively, the first layered member 42 and the second layered member 44 can be attached to each other with an adhesive. Furthermore, the first layered member 42 and the second layered member 44 can be attached to each other by an integral molding process. Specifically, when the first layered member 42 is made of metallic material, the first and second layered members 42 and 44 can be attached to each other by forming a clad structure. Furthermore, when the first layered member 42 is made of resin material, the first and second layered members 42 and 44 can be attached to each other by the integral molding process. In particular, the integral molding process can be performed such that the resin of the first layered member 42 can extend into dimples of the second layered member 44 during formation of the first layered member 42. In the illustrated embodiment, with this integral molding process, the first layered member 42, which is made of resin, is molded while simultaneously attaching the first layered member 42 to the second layered member 44, which includes dimples for receiving the resin.

The third layered member 46 has an axial thickness of preferably more than or equal to 0.1 mm. The third layered member 46 is made of metallic material. Specifically, in the illustrated embodiment, the third layered member 46 is made of iron. Of course, the third layered member 46 can be made of other metallic material. For example, the third layered member 46 can be made of stainless steel. The third layered member 46 preferably has Vickers hardness larger than or equal to 400 (HV). The third layered member 46 is fixedly attached to the first layered member 42 in a suitable fixing manner. Specifically, in the illustrated embodiment, the first layered member 42 and the third layered member 46 are attached to each other by diffusion bonding. However, alternatively, the first layered member 42 and the third layered member 46 can be attached to each other with an adhesive. Furthermore, the first layered member 42 and the third layered member 46 can be attached to each other by an integral molding process. Specifically, when the first layered member 42 is made of metallic material, the first and third layered members 42 and 46 can be attached to each other by forming a clad structure. Furthermore, when the first layered member 42 is made of resin material, the first and third layered members 42 and 46 can be attached to each other by the integral molding process. In particular, the integral molding process can be performed such that the resin of the first layered member 42 can extend into dimples of the third layered member 46 during formation of the first layered member 42. In the illustrated embodiment, with this integral molding process, the first layered member 42, which is made of resin, is molded while simultaneously attaching the first layered member 42 to the third layered member 46, which includes dimples for receiving the resin.

As shown in FIG. 3, the coating layer 48 is preferably formed on the radially end surface 56 of the first layered member 42. Specifically, in the illustrated embodiment, the coating layer 48 circumferentially extends along the radially end surface 56 of the first layered member 42 about the rotation axis X1. In the illustrated embodiment, the coating layer 48 is disposed axially between the second and third layered members 44 and 46 such that an radially end surface 48a of the coating layer 48 can be flush with radially end surfaces 44a and 46a of the second and third layered members 44 and 46. In other words, in this case, the first layered member 42 has the outermost diameter of the first layered member 42 that is smaller than those of the second and third layered members 44 and 46 such that the second and third layered members 44 and 46 defines an circumferential groove for receiving the coating layer 48 therebetween. Alternatively, the coating layer 48 can be formed on an radially end surface of the sprocket teeth 34 that is formed by the radially end surfaces 56, 44a and 46a of the first, second and third layered members 42, 44 and 46. In this case, the first, second and third layered members 42, 44 and 46 have the same outermost diameter. In the illustrated embodiment, the coating layer 48 is an intermetallic compound layer. Specifically, the intermetallic compound layer of the coating layer 48 is made of aluminum, and one of nickel and iron. In particular, in the illustrated embodiment, the coating layer 48 is plated layer. More specifically, the coating layer 48 is a nickel-plated layer. In the illustrated embodiment, the coating layer 48 is formed on the radially end surface 56 of the first layered member 42 such that the coating layer 48 protect the first layered member 42 from being wore away by the chain 23. The coating layer 48 can also be formed on the radially end surface 56 of the first layered member 42 in a conventional manner.

In the illustrated embodiment, the sprocket S includes the first layered member 42, the second layered member 44, the third layered member 46, and the coating layer 48. Thus, sprocket teeth 34 that contact with the chain 23 are all covered by metallic materials, which results in ensuring strength, rigidity, and abrasion resistance. On the other hand, the first layered member 42 is made from a material having a smaller specific gravity than the second and third layered members 44 and 46, which results in reducing the weight of the sprocket S. However, the multi-layered structure of the sprocket S is not limited to this. The sprocket S can only include the first layered member 42, the second layered member 44 and the coating layer 48 without the third layered member 46. The sprocket S can only include the first layered member 42, the third layered member 46 and the coating layer 48 without the second layered member 44. Furthermore, the sprocket S can only include the first layered member 42, the second layered member 44 and the third layered member 46 without the coating layer 48.

In the illustrated embodiment, the sprocket S is the largest sprocket of the rear sprocket assembly 12. However, any one(s) of the sprockets S of the rear sprocket assembly 12 can include the same configuration as the sprocket S illustrated in FIG. 2. Moreover, any one(s) of chain wheels or front sprocket of the front sprocket assembly 22 (FIG. 1) can also include the same configuration as the sprocket S illustrated in FIG. 2.

SECOND EMBODIMENT

Referring now to FIGS. 4 to 8, a rear sprocket assembly 112 (e.g., a multiple sprocket assembly) in accordance with a second embodiment will now be explained. The rear sprocket assembly 112 is basically identical to the rear sprocket assembly 12 in accordance with the first embodiment, except that a plurality of sprockets of the rear sprocket assembly 112 includes a pair of rear sprockets Sa and Sb (e.g., a plurality of bicycle sprockets) detachably coupled to each other, as explained below.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Figure 4:
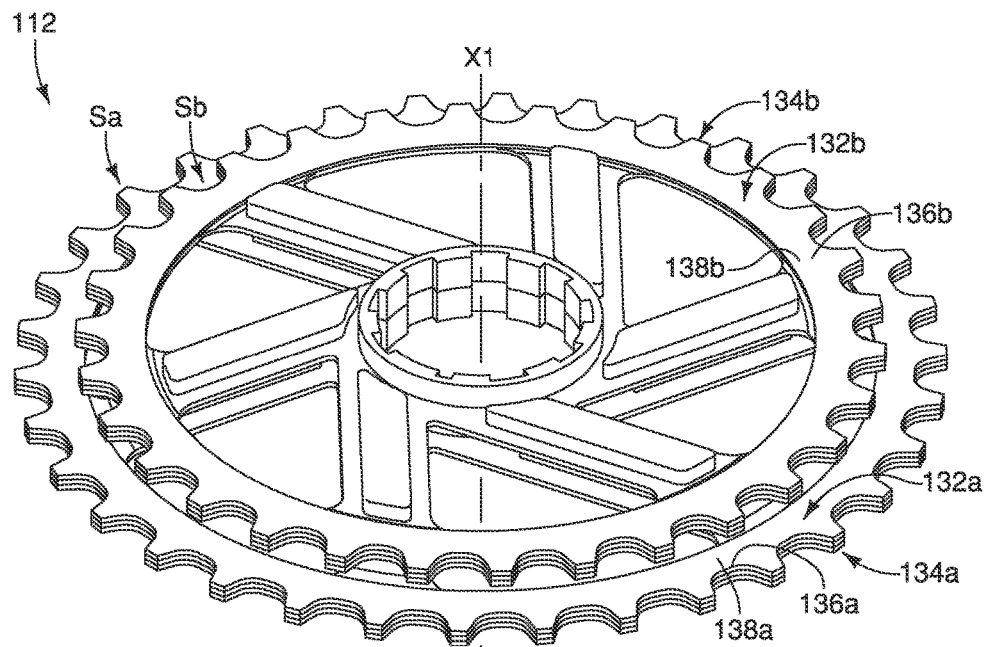
FIG. 4 is a perspective view of a pair of bicycle sprockets in accordance with a second embodiment, the bicycle sprockets detachably coupled to each other.
Figure 5:
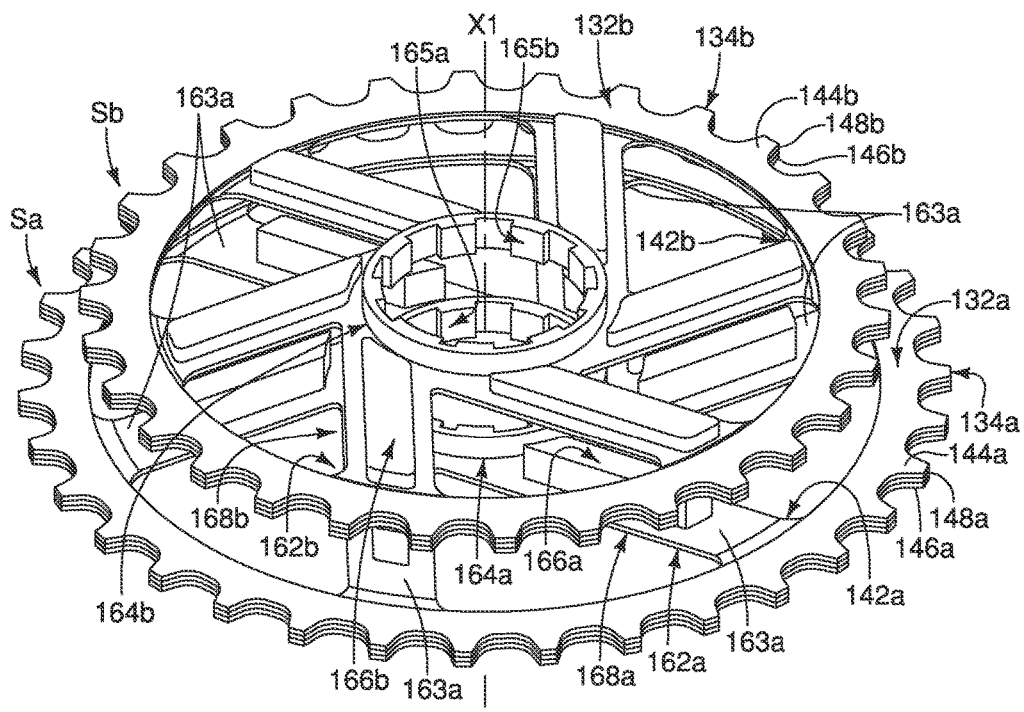
FIG. 5 is an exploded perspective view of the bicycle sprockets illustrated in FIG. 4.
Figure 6:
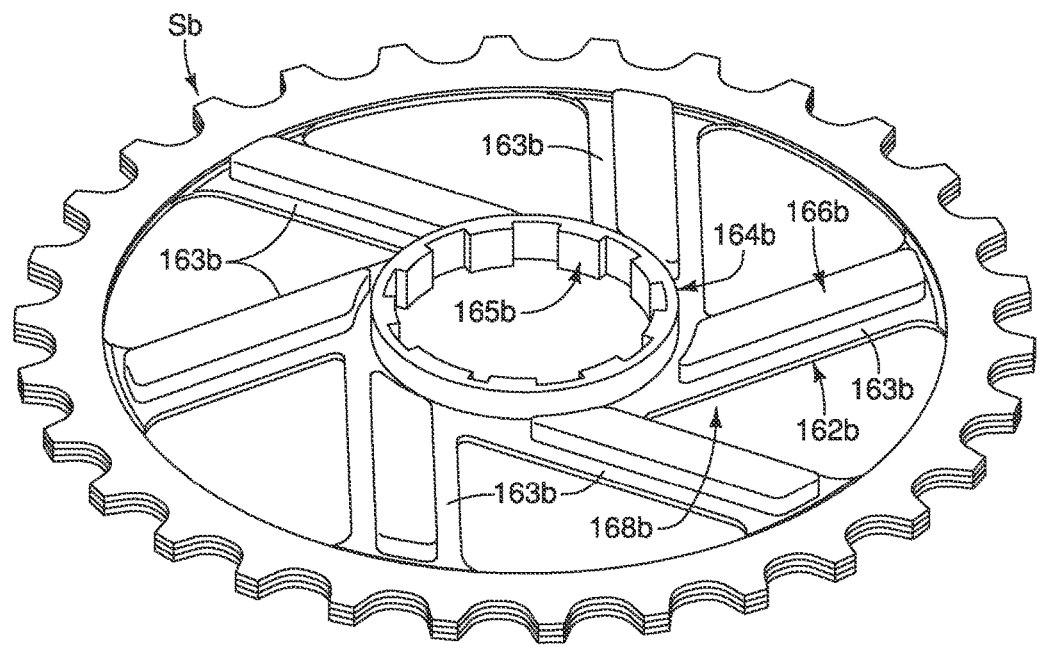
FIG. 6 is a perspective view of one of the bicycle sprockets illustrated in FIG. 4.

In the illustrated embodiment, the sprockets Sa and Sb have multi-layered structures, respectively, as described below. Specifically, in the illustrated embodiment, as shown in FIGS. 4 and 5, the sprocket Sa is the largest sprocket of the rear sprocket assembly 112, while the sprocket Sb is the second largest sprocket of the rear sprocket assembly 112. Of course, any one of adjacent pairs of the sprockets of the rear sprocket assembly 112 can have this multi-layered structure. However, in the illustrated embodiment, the other sprockets other than the sprockets Sa and Sb have any conventional configuration as needed and/or desired. For example, these sprockets other than the sprockets Sa and Sb can be each formed as a one-piece, unitary member from a metallic material that is suitable for a bicycle sprocket such as an iron or an iron alloy. Therefore, in the illustrated embodiment, the following disclosure will focus on the configuration of the sprockets Sa and Sb for the sake of brevity.

As shown in FIG. 4, the sprocket Sa (e.g., a bicycle sprocket) basically includes a sprocket body 132a, and a plurality of sprocket teeth 134a. The sprocket body 132a has a rotational axis X1. The sprocket body 132a includes an outer periphery 136a and an inner periphery 138a. The sprocket teeth 134a extend radially outwardly from the outer periphery 136a of the sprocket body 132a. On the other hand, the sprocket Sb (e.g., a bicycle sprocket) basically includes a sprocket body 132b, and a plurality of sprocket teeth 134b. The sprocket body 132b has the rotational axis X1. The sprocket body 132b includes an outer periphery 136b and an inner periphery 138b. The sprocket teeth 134b extend radially outwardly from the outer periphery 136b of the sprocket body 132b. In the illustrated embodiment, the sprocket Sa is the largest sprocket of the rear sprocket assembly 112. As shown in FIGS. 4 and 5, the total number of the sprocket teeth 134a is thirty-four. On the other hand, in the illustrated embodiment, the sprocket Sb is the second largest sprocket of the rear sprocket assembly 112. As shown in FIGS. 4 and 5, the total number of the sprocket teeth 134b is thirty. Of course, the total numbers of the sprocket teeth 134a and 134b can be different numbers as needed and/or desired.

Figure 7:
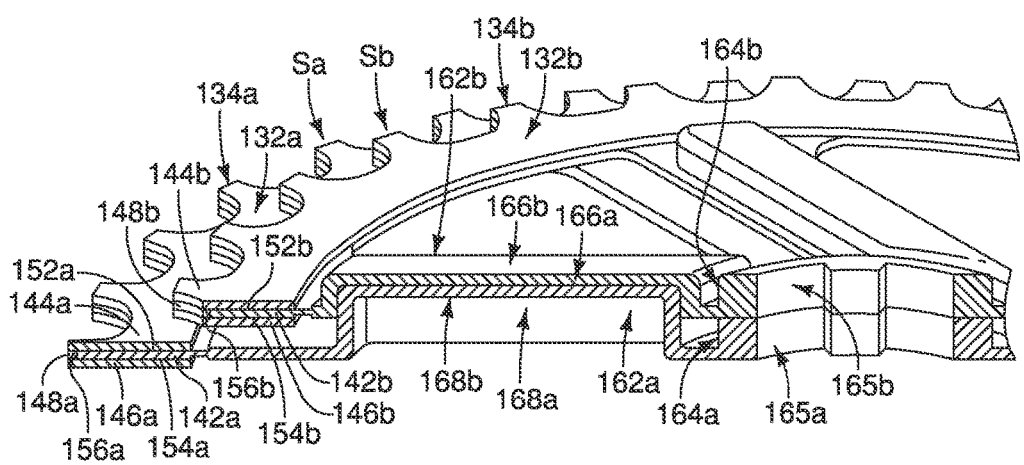
FIG. 7 is an enlarged, partial cross sectional view of the bicycle sprockets illustrated in FIG. 4.
Figure 8:
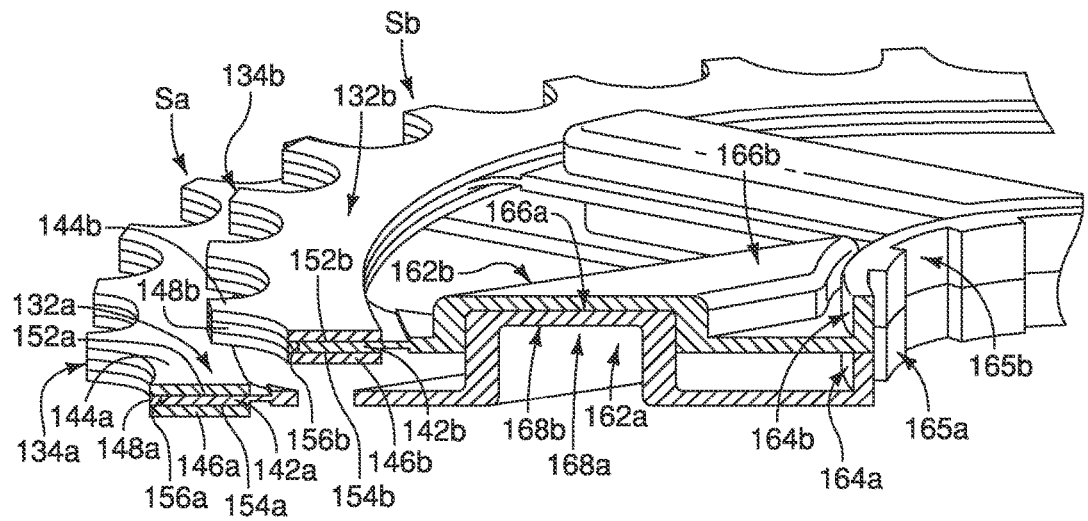
FIG. 8 is an enlarged, partial cross sectional view of the bicycle sprockets illustrated in FIG. 4.

In the illustrated embodiment, the sprockets Sa and Sb have multi-layered structures, respectively. Specifically, as shown in FIGS. 5, 7 and 8, the sprocket Sa includes a first layered member 142a, a second layered member 144a, a third layered member 146a, and a coating layer 148a. In the illustrated embodiment, the first, second and third layered members 142a, 144a and 146a extend radially outward from the inner periphery 138a of the sprocket body 132a to the sprocket teeth 134a. Furthermore, as shown in FIGS. 5, 7 and 8, the sprocket Sb includes a first layered member 142b, a second layered member 144b, a third layered member 146b, and a coating layer 148b. In the illustrated embodiment, the first, second and third layered members 142b, 144b and 146b extend radially outward from the inner periphery 138b of the sprocket body 132b to the sprocket teeth 134b. The multi-layered structures of the sprockets Sa and Sb are basically identical to that of the sprocket S in accordance with the first embodiment, except that the first layered members 142a and 142b extend radially inwardly from the inner peripheries 138a and 138b of the sprocket bodies 132a and 132b, respectively. Furthermore, the first layered members 142a and 142b, the second layered members 144a and 144b, the third layered members 146a and 146b, and the coating layers 148a and 148b can be made of the same material as the first layered member 42, the second layered member 44, the third layered member 146, and the coating layer 48 in accordance with the first embodiment, respectively. Furthermore, the first, second and third layered members 142a, 144a and 146a and the coating layer 148a are attached with respect to each other in the same fixing manner as discussed in the first embodiment, while the first, second and third layered members 142b, 144b and 146b and the coating layer 148b are attached with respect to each other in the same fixing manner as discussed in the first embodiment. Thus, the detailed description of the multi-layered structures of the sprockets Sa and Sb will be omitted for the sake of brevity. It will be apparent to those skilled in the art from this disclosure that the descriptions and illustrations of the parts of sprocket S in accordance with the first embodiment also apply to the parts of the sprockets Sa and Sb having the same name, except as discussed and/or illustrated herein.

As shown in FIGS. 7 and 8, in regards to the sprocket Sa, the first layered member 142a has a first axial surface 152a and a second axial surface 154a opposite to the first axial surface 152a with respect to the rotational axis X1. The second layered member 144a is attached to the first axial surface 152a of the first layered member 142a. The third layered member 146a is attached to the second axial surface 154a of the first layered member 142a. The coating layer 148a is formed on a radially end surface 156a of the first layered member 142a. In the illustrated embodiment, the first, second and third layered members 142a, 144a and 146a are flat layered members at the sprocket body 132a and the sprocket teeth 134a. Thus, in regards to the sprocket body 132a and the sprocket teeth 134a of the sprocket Sa, the first and second layered members 142a and 144a overlap each other in an axial direction as viewed parallel to the rotational axis X1, while the first and second layered members 142a and 144a do not overlap each other in a radial direction as viewed perpendicularly to the rotational axis X1. Furthermore, in regards to the sprocket body 132a and the sprocket teeth 134a of the sprocket Sa, the first and third layered members 142a and 146a overlap each other in the axial direction as viewed parallel to the rotational axis X1, while the first and third layered members 142a and 146a do not overlap each other in the radial direction as viewed perpendicularly to the rotational axis X1. In the illustrated embodiment, the first layered member 142a is axially disposed between the second and third layered members 144a and 146a at the sprocket body 132a and the sprocket teeth 134a such that the first layered member 142a is axially completely covered by the second and third layered members 144a and 146a at the sprocket body 132a and the sprocket teeth 134a. Furthermore, the first layered member 142a is radially inwardly disposed relative to the coating layer 148a such that the radially end surface 156a of the first layered member 142a is radially completely covered by the coating layer 148a. However, alternatively, the first layered member 142a can be partially exposed through the second and third layered members 144a and 146a in the axial direction, while the first layered member 142a can be partially exposed through the coating layer 148a in the radial direction. In the illustrated embodiment, the first layered member 142a has a specific gravity that is less than that of the second layered member 144a. Furthermore, in the illustrated embodiment, the first layered member 142a has a specific gravity that is less than that of the third layered member 146a.

Similarly, as shown in FIGS. 7 and 8, in regards to the sprocket Sb, the first layered member 142b has a first axial surface 152b and a second axial surface 154b opposite to the first axial surface 152b with respect to the rotational axis X1. The second layered member 144b is attached to the first axial surface 152b of the first layered member 142b. The third layered member 146b is attached to the second axial surface 154b of the first layered member 142b. The coating layer 148b is formed on a radially end surface 156b of the first layered member 142b. In the illustrated embodiment, the first, second and third layered members 142b, 144b and 146b are flat layered members at the sprocket body 132b and the sprocket teeth 134b. Thus, in regards to the sprocket body 132b and the sprocket teeth 134b of the sprocket Sb, the first and second layered members 142b and 144b overlap each other in an axial direction as viewed parallel to the rotational axis X1, while the first and second layered members 142b and 144b do not overlap each other in a radial direction as viewed perpendicularly to the rotational axis X1. Furthermore, in regards to the sprocket body 132b and the sprocket teeth 134b of the sprocket Sa, the first and third layered members 142b and 146b overlap each other in the axial direction as viewed parallel to the rotational axis X1, while the first and third layered members 142b and 146b do not overlap each other in the radial direction as viewed perpendicularly to the rotational axis X1. In the illustrated embodiment, the first layered member 142b is axially disposed between the second and third layered members 144b and 146b at the sprocket body 132b and the sprocket teeth 134b such that the first layered member 142b is axially completely covered by the second and third layered members 144b and 146b at the sprocket body 132b and the sprocket teeth 134b. Furthermore, the first layered member 142b is radially inwardly disposed relative to the coating layer 148b such that the radially end surface 156b of the first layered member 142b is radially completely covered by the coating layer 148b. However, alternatively, the first layered member 142b can be partially exposed through the second and third layered members 144b and 146b in the axial direction, while the first layered member 142b can be partially exposed through the coating layer 148b in the radial direction. In the illustrated embodiment, the first layered member 142b has a specific gravity that is less than that of the second layered member 144b. Furthermore, in the illustrated embodiment, the first layered member 142b has a specific gravity that is less than that of the third layered member 146b.

In the illustrated embodiment, as shown in FIGS. 5, 7 and 8, the first layered member 142a of the sprocket Sa extends radially inwardly from the inner periphery 138a of the sprocket body 132a. Specifically, the first layered member 142a of the sprocket Sa has a sprocket support member 162a. In the illustrated embodiment, the sprocket support member 162a has a plurality of (e.g., six in this embodiment) sprocket arms 163a radially connecting the inner periphery 138a of the first layered member 142a to a center boss 164a. Of course, it will be apparent to those skilled in the art from this disclosure that the number of the sprocket arms 163a can be more than or less than six as needed and/or desired. Specifically, in the illustrated embodiment, each of the sprocket arms 163a extends in a direction slanted relative to the radial direction of the rotational axis X1. The center boss 164a has a bicycle hub engaging profile 165a on an inner peripheral surface of the center boss 164a. In other words, the first layered member 142a has the bicycle hub engaging profile 165a at a location of a radially inner end of the sprocket support member 162a of the first layered member 142a. The bicycle hub engaging profile 165a defines a plurality of engaging splines that is dimensioned to be non-rotatably engage with splines of the freewheel (not shown) of the rear bicycle hub 11 in a relatively conventional manner. Preferably, the bicycle hub engaging profile 165a is configured so that the rear sprocket assembly 112 can only fit on the freewheel in a single orientation.

As shown in FIGS. 5, 7 and 8, each of the sprocket arms 163a of the first layered member 142a has an axially projecting portion 166a and an axially recessed portion 168a. The axially projecting portions 166a and the axially recessed portions 168a are positioned radially inwardly from the inner periphery 138a of the sprocket body 132a. As shown in FIGS. 7 and 8, the axially projecting portions 166a of the sprocket Sa axially bulge towards the sprocket Sb on the first axial surface 152a side, which define the axially recessed portions 168a of the sprocket Sa that are axially recessed towards the sprocket Sb on the second axial surface 154a side.

Similarly, in the illustrated embodiment, as shown in FIGS. 5 to 8, the first layered member 142b of the sprocket Sb extends radially inwardly from the inner periphery 138b of the sprocket body 132b. Specifically, the first layered member 142b of the sprocket Sb has a sprocket support member 162b. In the illustrated embodiment, the sprocket support member 162b has a plurality of (e.g., six in this embodiment) sprocket arms 163b radially connecting the inner periphery 138b of the first layered member 142b to a center boss 164b. Of course, it will be apparent to those skilled in the art from this disclosure that the number of sprocket arms 163b can be more than or less than six as needed and/or desired. Specifically, in the illustrated embodiment, each of the sprocket arms 163b extends in a direction slanted relative to the radial direction of the rotational axis X1. The center boss 164b has a bicycle hub engaging profile 165b on an inner peripheral surface of the center boss 164b. In other words, the first layered member 142b has the bicycle hub engaging profile 165b at a location of a radially inner end of the sprocket support member 162b of the first layered member 142b. The bicycle hub engaging profile 165b defines a plurality of engaging splines that is dimensioned to be non-rotatably engage with splines of the freewheel (not shown) of the rear bicycle hub 11 in a relatively conventional manner. Preferably, the bicycle hub engaging profile 165b is configured so that the rear sprocket assembly 112 can only fit on the freewheel in a single orientation.

As shown in FIGS. 5 to 8, each of the sprocket arms 163b of the first layered member 142b has an axially projecting portion 166b and an axially recessed portion 168b. The axially projecting portions 166b and the axially recessed portions 168b are positioned radially inwardly from the inner periphery 138b of the sprocket body 132b. As shown in FIGS. 7 and 8, the axially projecting portions 166b of the sprocket Sb axially bulge away from the sprocket Sa on the first axial surface 152b side, which defines the axially recessed portions 168b of the sprocket Sb that are axially recessed away from the sprocket Sa on the second axial surface 154b side.

As shown in FIGS. 7 and 8, the axially projecting portions 166a of the sprocket Sa (e.g., one of the bicycle sprockets) mates with the axially recessed portion 168b of the sprocket Sb (e.g., an adjacent one of the bicycle sprockets) adjacent to the sprocket Sa (e.g., one of the bicycle sprockets) while the sprockets Sa and Sb (e.g., bicycle sprockets) are attached to each other. Specifically, in the illustrated embodiment, while the sprockets Sa and Sb are attached to each other, the center bosses 164a and 164b are concentrically aligned relative to each other. In the illustrated embodiment, the center bosses 164a and 164b are identically formed relative to each other for receiving the freewheel of the rear bicycle hub 11 therethrough. Furthermore, in the illustrated embodiment, an outer profile of each of the axially projecting portions 166a of the sprocket Sa is dimensioned to match with an inner profile of respective one of the axially recessed portions 168b of the sprocket Sb. Thus, the sprockets Sa and Sb are fittedly and detachably coupled to each other. Furthermore, an axial height of the axially projecting portion 166a of the sprocket Sa and an axial depth of the axially recessed portion 168b of the sprocket Sb are dimensioned such that the sprocket bodies 132a and 132b and the sprocket teeth 134a and 134b of the sprockets Sa and Sb are axially spaced from each other at a predetermined interval.

In the illustrated embodiment, the first layered member 142a of the sprocket Sa is integrally formed as a one-piece, unitary member, while the first layered member 142b of the sprocket Sb is integrally formed as a one-piece, unitary member. The first layered members 142a and 142b of the sprockets Sa and Sb have the sprocket support members 162a and 162b, respectively, which support the sprockets Sa and Sb on the rear bicycle hub 11. In other words, the sprocket support members 162a and 162b form a sprocket support member to which the sprockets Sa and Sb (e.g., bicycle sprockets) are mounted. Thus, in the illustrated embodiment, the bicycle sprocket assembly 112 has the sprockets Sa and Sb (e.g., a plurality of the bicycle sprockets), and the sprocket support members 162a and 162b (e.g., a sprocket support member) to which the sprockets Sa and Sb are mounted.

Figure 9:
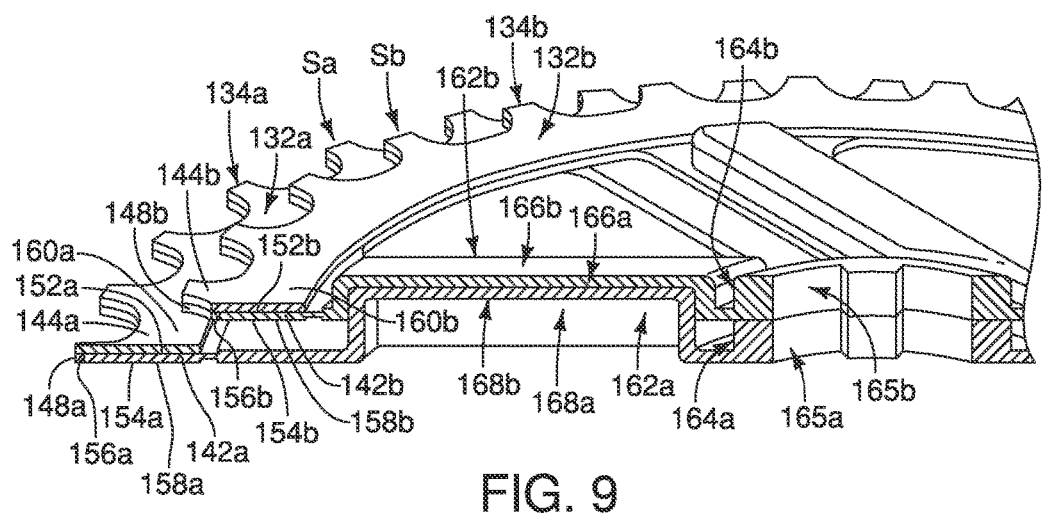
FIG. 9 is an enlarged, partial cross sectional view of a pair of modified bicycle sprockets in accordance with the second embodiment, the bicycle sprockets detachably coupled to each other.

In the illustrated embodiment, the sprockets Sa and Sb include the first layered members 142a and 142b, the second layered members 144a and 144b, the third layered members 146a and 146b, and the coating layers 148a and 148b, respectively. However, the multi-layered structure of the sprockets Sa and Sb are not limited to this. For example, the sprockets Sa and Sb can only include the first layered members 142a and 142b, the second layered members 144a and 144b and the third layered members 146a and 146b without the coating layers 148a and 148b, respectively. Furthermore, as illustrated in FIG. 9, the sprockets Sa and Sb can only include the first layered members 142a and 142b, the second layered members 144a and 144b and the coating layers 148a and 148b, without the third layered members 146a and 146b, respectively. Furthermore, the sprockets Sa and Sb can only include the first layered members 142a and 142b, the third layered members 146a and 146b and the coating layers 148a and 148b, without the second layered members 144a and 144b, respectively.

More specifically, as shown in FIG. 9, the sprocket body 132a and the sprocket teeth 134a (e.g., at least one of the sprocket teeth or the plurality of sprocket teeth) of the sprocket Sa includes the first layered member 142a and the second layered member 144a. Furthermore, as shown in FIG. 9, the sprocket teeth 134a further includes the coating layer 148a formed on the radially end surface 156a of the first layered member 142a. The first layered member 142a has the first axial surface 152a and the second axial surface 154a opposite to the first axial surface 152a. The second layered member 144a has a third axial surface 158a and a fourth axial surface 160a opposite to the third axial surface 158a. The third axial surface 158a of the second layered member 144a is attached to the first axial surface 152a of the first layered member 142a. In other words, the third axial surface 158a of the second layered member 144a directly contacts with and is directly attached to the first axial surface 152a of the first layered member 142a. The first and second layered members 142a and 144a overlap each other in the axial direction as viewed parallel to the rotational axis X1. The first and second layered members 142a and 144a do not overlap each other in the radial direction as viewed perpendicularly to the rotational axis X1. The second axial surface 154a of the first layered member 142a and the fourth axial surface 160a of the second layered member 144a are exposed. In other words, no layers are axially formed on the second axial surface 154a of the first layered member 142a and the fourth axial surface 160a of the second layered member 144a. In the illustrated embodiment, the first layered member 142a has a specific gravity that is less than that of the second layered member 144a. Each of the first and second layered members 142a and 144a has an axial thickness of preferably more than or equal to 0.1 mm. Other than the multi-layered structure at the sprocket body 132a and the sprocket teeth 134a, the sprocket Sa shown in FIG. 9 is identical to the sprocket Sa shown in FIGS. 4 to 8. Thus, the detailed configuration of the sprocket Sa will be omitted for the sake of brevity.

Similarly, as shown in FIG. 9, the sprocket body 132b and the sprocket teeth 134b (e.g., at least one of the sprocket teeth or the plurality of sprocket teeth) of the sprocket Sb includes the first layered member 142b and the second layered member 144b. Furthermore, as shown in FIG. 9, the sprocket teeth 134b further includes the coating layer 148b formed on the radially end surface 156b of the first layered member 142b. The first layered member 142b has the first axial surface 152b and the second axial surface 154b opposite to the first axial surface 152b. The second layered member 144b has a third axial surface 158b and a fourth axial surface 160b opposite to the third axial surface 158b. The third axial surface 158b of the second layered member 144b is attached to the first axial surface 152b of the first layered member 142b. In other words, the third axial surface 158b of the second layered member 144b directly contacts with and is directly attached to the first axial surface 152b of the first layered member 142b. The first and second layered members 142b and 144b overlap each other in the axial direction as viewed parallel to the rotational axis X1. The first and second layered members 142b and 144b do not overlap each other in the radial direction as viewed perpendicularly to the rotational axis X1. The second axial surface 154b of the first layered member 142b and the fourth axial surface 160b of the second layered member 144b are exposed. In other words, no layers are axially formed on the second axial surface 154b of the first layered member 142b and the fourth axial surface 160b of the second layered member 144b. In the illustrated embodiment, the first layered member 142b has a specific gravity that is less than that of the second layered member 144b. Each of the first and second layered members 142b and 144b has an axial thickness of preferably more than or equal to 0.1 mm. Other than the multi-layered structure at the sprocket body 132b and the sprocket teeth 134b, the sprocket Sb shown in FIG. 9 is identical to the sprocket Sb shown in FIGS. 4 to 8. Thus, the detailed configuration of the sprocket Sb will be omitted for the sake of brevity.

As shown in FIG. 9, the sprockets Sa and Sb includes the first layered members 142a and 142b, the second layered members 144a and 144b, and the coating layers 148a and 148b, respectively. However, the multi-layered structures of the sprockets Sa and Sb are not limited to this. The sprockets Sa and Sb can only include the first layered members 142a and 142b, the second layered members 144a and 144b without the coating layers 148a and 148b, respectively.

In the illustrated embodiment, as shown in FIGS. 4 to 9, the sprocket body 132a and the sprocket teeth 134a has the multi-layered structure. However, only the sprocket teeth 134a can have the multi-layered structure as shown in FIGS. 4 to 9. Furthermore, in the illustrated embodiment, all of the sprocket teeth 134a have the multi-layered structure as shown in FIGS. 4 to 9. However, only one(s) of the sprocket teeth 134a can have the multi-layered structure as shown in FIGS. 4 to 9. Similarly, in the illustrated embodiment, as shown in FIGS. 4 to 9, the sprocket body 132b and the sprocket teeth 134b has the multi-layered structure. However, only the sprocket teeth 134b can have the multi-layered structure as shown in FIGS. 4 to 9. Furthermore, in the illustrated embodiment, all of the sprocket teeth 134b have the multi-layered structure as shown in FIGS. 4 to 9. However, only one(s) of the sprocket teeth 134b can have the multi-layered structure as shown in FIGS. 4 to 9.

Figure 10:
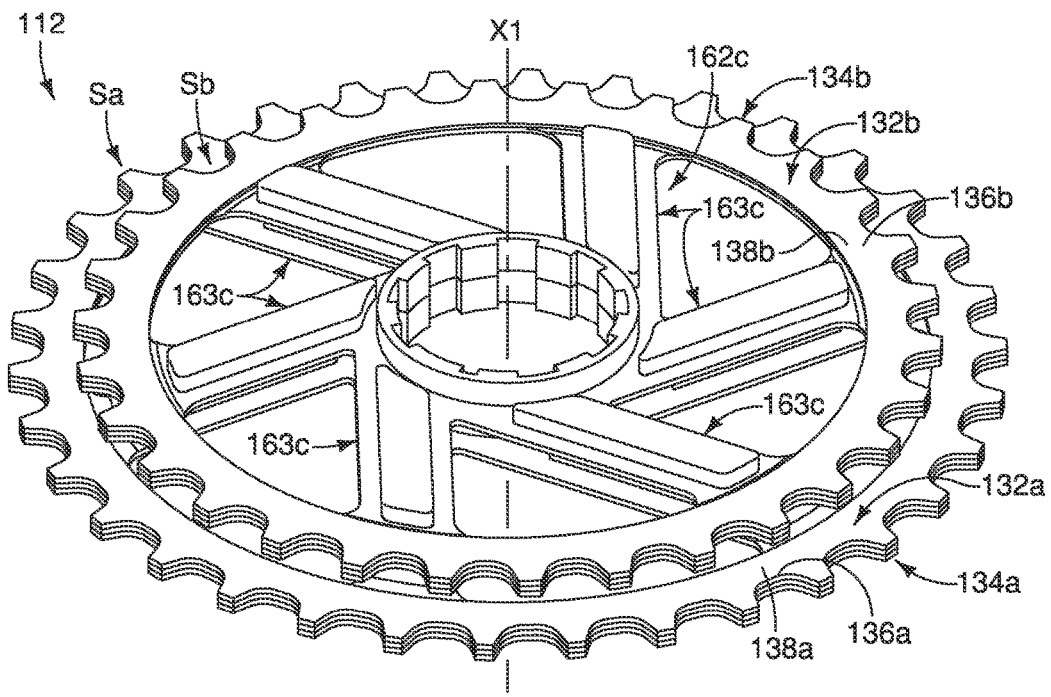
FIG. 10 is a perspective view of a pair of modified bicycle sprockets in accordance with the second embodiment, the bicycle sprockets non-detachably coupled to each other.
Figure 11:
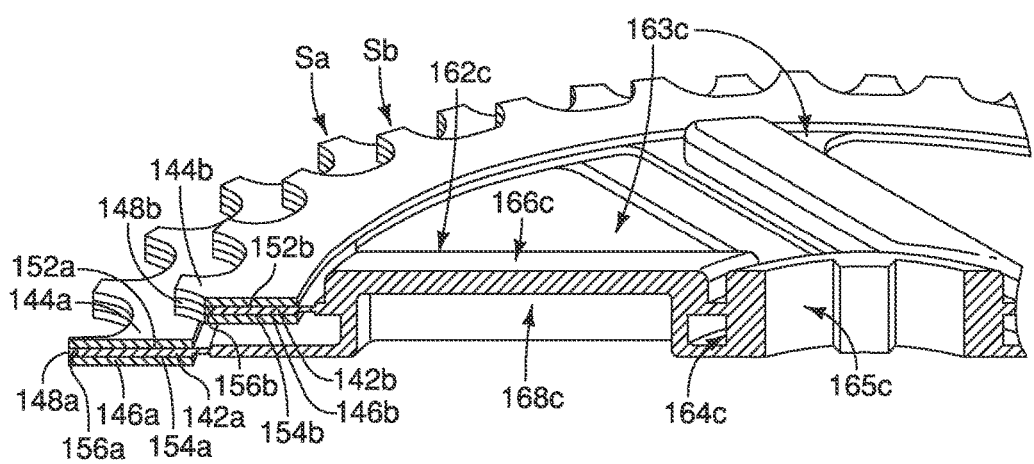
FIG. 11 is a cross sectional view of the bicycle sprockets illustrated in FIG. 10.

In the illustrated embodiment, as shown in FIGS. 4 to 8, the sprockets Sa and Sb are independently formed as separate members, and are detachably coupled to each other. However, the sprockets Sa and Sb can also be non-detachably coupled to each other. For example, as shown in FIGS. 10 and 11, the rear sprocket assembly 112 (e.g., a multiple sprocket assembly) includes the sprockets Sa and Sb (e.g., a plurality of the bicycle sprockets) and a sprocket support member 162c to which the sprockets Sa and Sb are mounted. In other words, in the illustrated embodiment, the sprockets Sa and Sb include the sprocket support member 162c as a common sprocket support member. The sprocket support member 162c has a unitary one-piece structure. In particular, in the illustrated embodiment, the sprocket support member 162c is identical to an integral combination of the sprocket support members 162a and 162b as shown in FIG. 7. In other words, in the illustrated embodiment, the sprockets Sa and Sb have the first layered members 142a and 142b that are integrally coupled to each other at the sprocket support member 162c. Furthermore, in the illustrated embodiment, the sprocket support member 162c has a plurality of (six in this embodiment) sprocket arms 163c radially connecting the inner peripheries 138a and 138b of the first layered members 142a and 142b to a center boss 164c. Specifically, in the illustrated embodiment, each of the sprocket arms 163c extends in a direction slanted relative to the radial direction of the rotational axis X1. The center boss 164c has a bicycle hub engaging profile 165c on an inner peripheral surface of the center boss 164c. In other words, the first layered members 142a and 142b have the bicycle hub engaging profile 165c at a location of a radially inner end of the sprocket support member 162c. The bicycle hub engaging profile 165c defines a plurality of engaging splines that is dimensioned to be non-rotatably engage with splines of the freewheel (not shown) of the rear bicycle hub 11 (FIG. 1) in a relatively conventional manner. Preferably, the bicycle hub engaging profile 165c is configured so that the rear sprocket assembly 112 can only fit on the freewheel in a single orientation.

Furthermore, as shown in FIG. 11, each of the sprocket arms 163c has an axially projecting portion 166c and an axially recessed portion 168c. The axially projecting portions 166c and the axially recessed portions 168c are positioned radially inwardly from the inner peripheries 138a and 138b of the sprocket bodies 132a and 132b. As shown in FIG. 11, the axially projecting portions 166c axially bulge towards a first axial side, which define the axially recessed portions 168c that are axially recessed towards the first axial side. Of course, it will be apparent to those skilled in the art from this disclosure that each of the sprocket arms 163c does not need to have the axially recessed portions 168c when the sprocket Sa is the largest sprocket of the rear sprocket assembly 112.

In the illustrated embodiment, the sprocket Sa is the largest sprocket of the rear sprocket assembly 112. However, any one(s) of adjacent pairs of the sprockets S of the rear sprocket assembly 112 can include the same configuration as the sprockets Sa and Sb. Moreover, any one(s) of adjacent pairs of chain wheels or front sprockets of the front sprocket assembly 22 (FIG. 1) can also include the same configuration as the sprockets Sa and Sb.

THIRD EMBODIMENT

Referring now to FIGS. 12 to 15, a front sprocket assembly 222 (e.g., a multiple sprocket assembly) in accordance with a third embodiment will now be explained. The front sprocket assembly 222 is basically identical to the front sprocket assembly 22 shown in FIG. 1, except that a sprocket S of the front sprocket assembly 222 includes a multi-layered structure, as explained below.

In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "200" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

In the illustrated embodiment, the sprocket S has a multi-layered structure, as described below. The sprocket S is fixedly coupled to a crank arm (not shown) in a conventional manner. As shown in FIGS. 12 to 15, the sprocket S basically includes a sprocket ring part 270, a body part 271 and a plurality of (e.g., four) attachment parts 272. Of course, it will be apparent to those skilled in the art from this disclosure that the number of the attachment parts 272 can be more than or less than four as needed and/or desired. The body part 271 is integrally formed onto the sprocket ring part 270 and the attachment parts 272 such that the sprocket ring part 270 and the attachment parts 272 are at least partially embedded within the body part 271. In the illustrated embodiment, the sprocket ring part 270 is made of titanium or stainless steel (SUS), while the body part 271 is made of synthetic resin. However, the sprocket ring part 270 can be made of the same material as the second layered member 44 or the third layered member 46 of the sprocket S in accordance with the first embodiment, while the body part 271 is made of the same material as the first layered member 42 of the sprocket S in accordance with the first embodiment. Thus, detailed description of the material of the sprocket ring part 270 and the body part 271 will be omitted for the sake of brevity.

Figure 12:
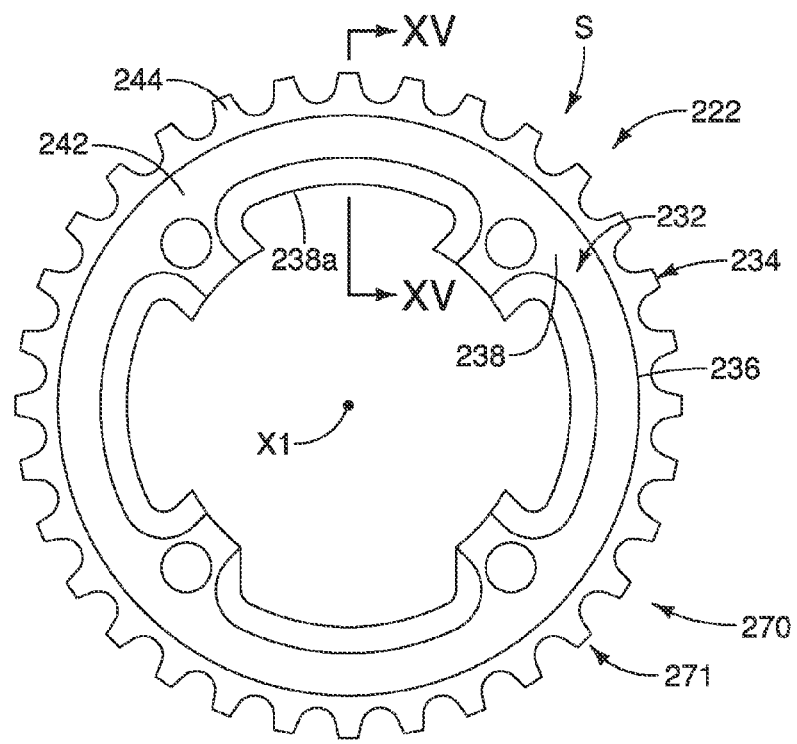
FIG. 12 is an outside elevational view of a bicycle sprocket in accordance with a third embodiment.
Figure 13:
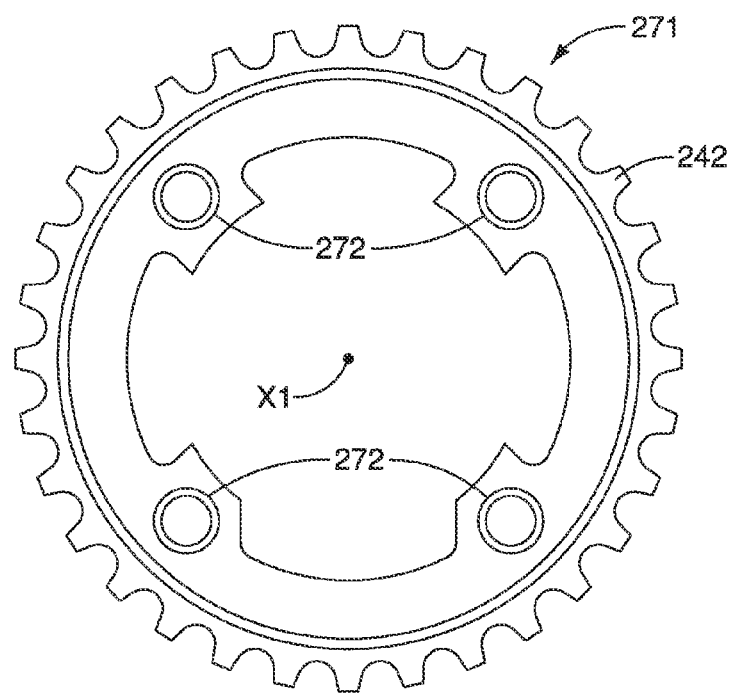
FIG. 13 is an inside elevational view of the bicycle sprocket illustrated in FIG. 12.

In the illustrated embodiment, the body part 271 is molded onto the sprocket ring part 270 and the attachment parts 272 by, for example, insert molding or outsert molding. In this embodiment, the attachment parts 272 are spaced radially inward of the sprocket ring part 270. More specifically, as shown in FIG. 12, the sprocket S (e.g., a bicycle sprocket) basically includes a sprocket body 232, and a plurality of sprocket teeth 234. The sprocket body 232 has a rotational axis X1. The sprocket body 232 includes an outer periphery 236 and an inner periphery 238. The inner periphery 238 defines an opening 238a for attaching the crank arm thereto. The sprocket teeth 234 extend radially outwardly from the outer periphery 236 of the sprocket body 232. In the illustrated embodiment, the sprocket body 232 is defined as a part of the sprocket S that is radially inwardly disposed with respect to an imaginary circle connecting innermost positions of gaps defined circumferentially between the sprocket teeth 234. The sprocket S is the largest sprocket of the front sprocket assembly 222. Thus, the total number of the sprocket teeth 234 is typically greater than the other sprockets of the front sprocket assembly 222. In the illustrated embodiment, as shown in FIG. 12, the total number of the sprocket teeth 234 is thirty-two. Of course, the total number of the sprocket teeth 234 can be different number as needed and/or desired.

Figure 15:
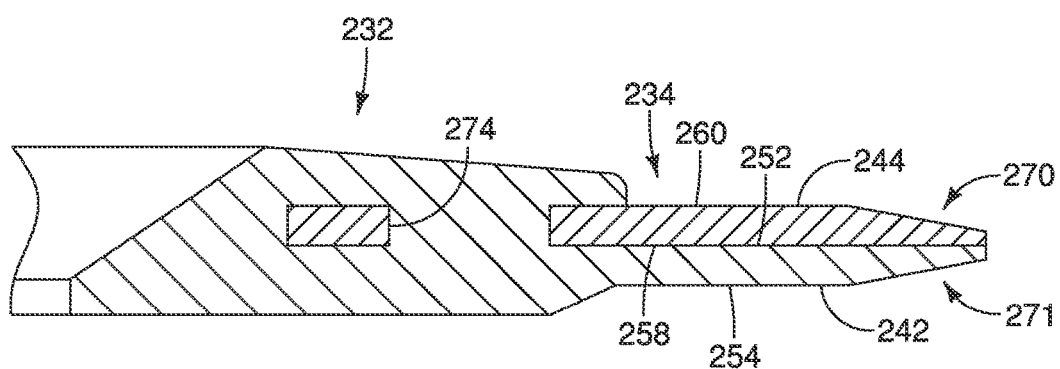
FIG. 15 is an enlarged, partial cross sectional view of the bicycle sprocket illustrated in FIG. 12 as seen along section line XV-XV of FIG. 12.

In the illustrated embodiment, as shown in FIG. 15, the sprocket ring part 270 and the body part 271 form a multi-layered structure at the sprocket teeth 234 of the sprocket S. In particular, as shown in FIG. 15, the sprocket teeth 234 including a first layered member 242 and a second layered member 244. In the illustrated embodiment, the first layered member 242 is formed by the body part 271, while the second layered member 244 is formed by the sprocket ring part 270. Specifically, as shown in FIG. 15, the sprocket ring part 270 and the body part 271 are arranged such that they form the multi-layered structure with the first and second layered members 242 and 244 at the sprocket teeth 234 of the sprocket S, and such that the sprocket ring part 270 is embedded within the body part 271 at the sprocket body 232 of the sprocket S. In the illustrated embodiment, the sprocket ring part 270 radially inwardly extends with respect to the outer periphery 236 of the sprocket body 232. Thus, the sprocket body 232 of the sprocket S partially includes the multi-layered structure with the first and second layered members 242 and 244. In other words, in the illustrated embodiment, the sprocket body 232 also includes the first layered member 242 and the second layered member 244. The first layered member 242 has a first axial surface 252 and a second axial surface 254 opposite to the first axial surface 252. The second layered member 244 has a third axial surface 258 and a fourth axial surface 260 opposite to the third axial surface 258. The third axial surface 258 of the second layered member 244 is attached to the first axial surface 252 of the first layered member 242. In other words, the third axial surface 258 of the second layered member 244 directly contacts with and is directly attached to the first axial surface 252 of the first layered member 242. The first and second layered members 242 and 244 are attached with respect to each other in the same fixing manner as discussed in the first embodiment. The first and second layered members 242 and 244 overlap each other in the axial direction as viewed parallel to the rotational axis X1 at the sprocket teeth 234 of the sprocket S. The first and second layered members 242 and 244 do not overlap each other in the radial direction as viewed perpendicularly to the rotational axis X1 at the sprocket teeth 234 of the sprocket S. The second axial surface 254 of the first layered member 242 and the fourth axial surface 260 of the second layered member 244 are exposed. In other words, no layers are axially formed on the second axial surface 254 of the first layered member 242 and the fourth axial surface 260 of the second layered member 244. In the illustrated embodiment, the first layered member 242 has a specific gravity that is less than that of the second layered member 244. Each of the first and second layered members 242 and 244 has an axial thickness of preferably more than or equal to 0.1 mm.

Figure 14:
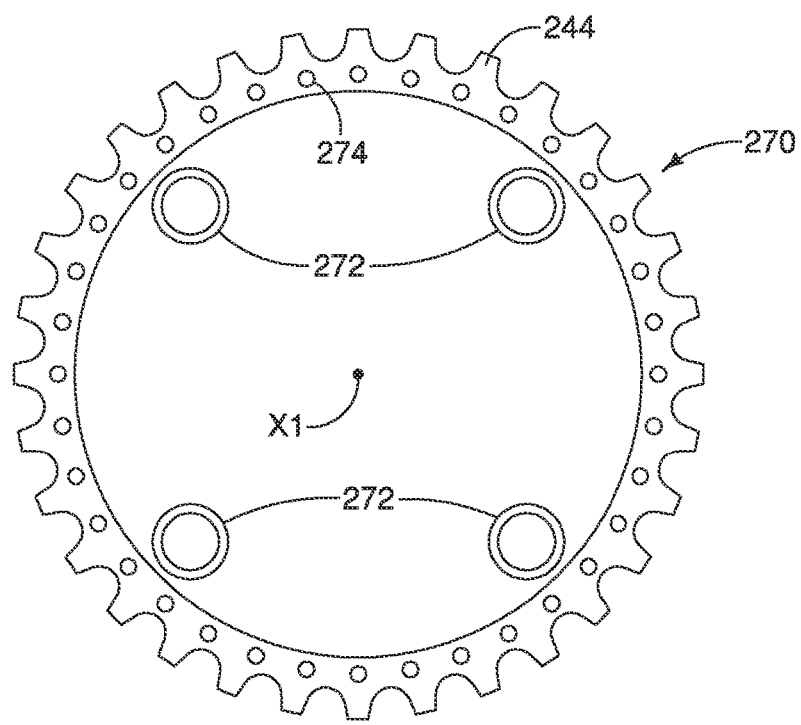
FIG. 14 is a second layered member of the bicycle sprocket illustrated in FIG. 12.

As shown in FIGS. 14 and 15, the sprocket ring part 270 has a plurality of through-holes 274 at the sprocket body 232 of the sprocket S. The through-holes 274 of the sprocket ring part 270 extend between the third and fourth axial surfaces 258 and 260. As shown in FIG. 15, the body part 271 extends through the through-holes 274 of the sprocket ring part 270. The through-holes 274 are formed preferably at equally spaced apart intervals in the circumferential direction of the sprocket ring part 270. These through-holes 274 act as anchor structures for facilitating the non-rotatable connection of the body part 271 to the sprocket ring part 270.

The attachment parts 272 are each formed as a separate member from the body part 271 and the sprocket ring part 270. The attachment parts 272 are at least partially embedded within the synthetic resin body part 271. In this embodiment, the attachment parts 272 are almost completely embedded within the body part 271. The attachment parts 272 are preferably one-piece, unitary members that are formed of a hard rigid material that is more rigid and/or harder than the synthetic resin body part 271. More preferably, the attachment parts 272 are formed of a material that is the same as the sprocket ring part 270.

In the illustrated embodiment, the sprocket S has a multi-layered structure with the first layered member 242 and the second layered member 244 at the sprocket teeth 234. However, the multi-layered structure of the sprocket S is not limited to this. For example, the sprocket teeth 234 can further include a coating layer. The coating layer of the sprocket teeth 234 can include an identical configuration to the coating layer 48 as shown in FIG. 3 or the coating layers 148a and 148b as shown in FIG. 9. Thus, detailed description of the coating layer will be omitted for the sake of brevity. The coating layer can be formed on a radially end surface of the first layered member 242.

FOURTH EMBODIMENT

Referring now to FIGS. 16 to 18A, a rear sprocket assembly 312 (e.g., a multiple sprocket assembly) in accordance with a fourth embodiment will now be explained. The rear sprocket assembly 312 is basically identical to the rear sprocket assembly 12 in accordance with the first embodiment, except for a configuration of a sprocket body 332, as explained below.

In view of the similarity between the first and fourth embodiments, the parts of the fourth embodiment that are identical to the parts of the first embodiment will be given the same reference numerals as the parts of the first embodiment. Also, parts of this fourth embodiment that are functionally identical and/or substantially identical to parts of the first embodiment will be given the same reference numerals but with "300" added thereto. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

Figure 16:
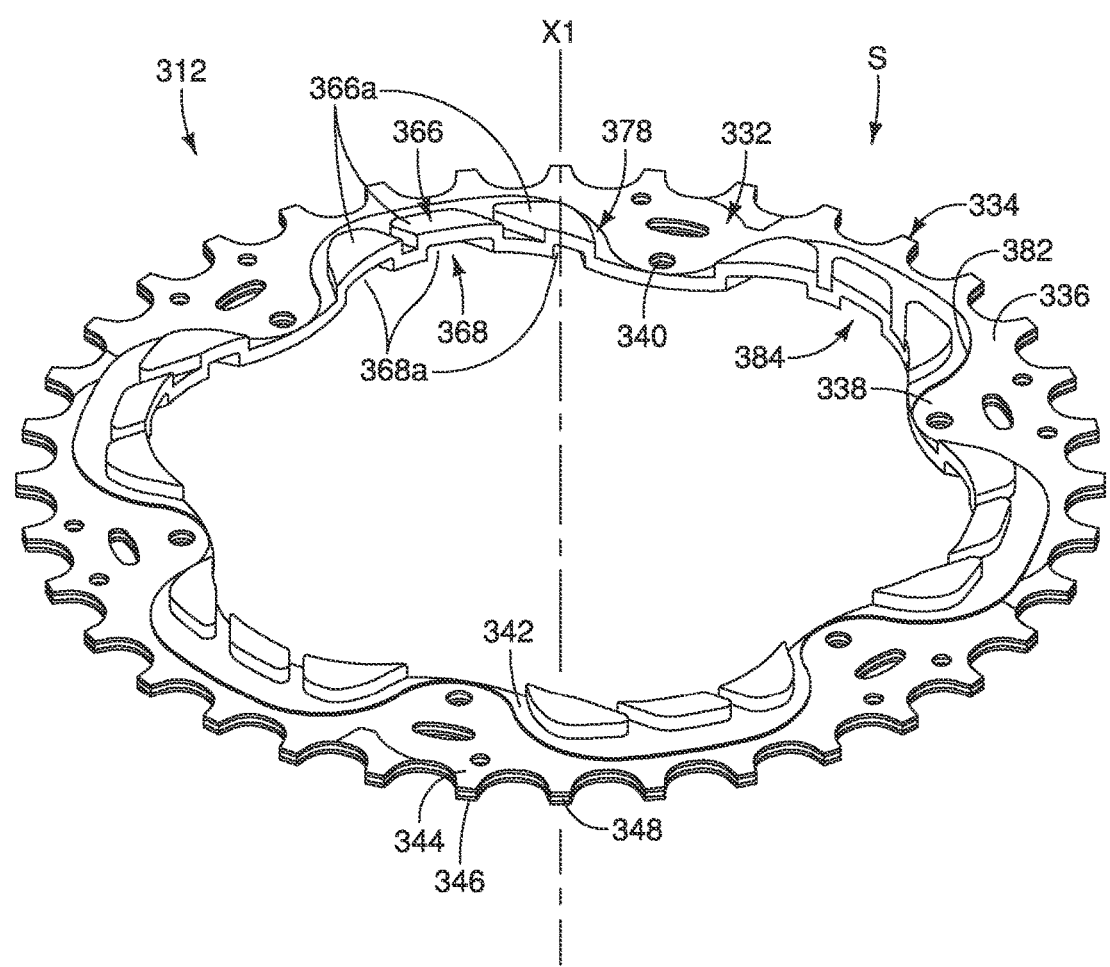
FIG. 16 is a perspective view of a bicycle sprocket in accordance with a fourth embodiment.

In the illustrated embodiment, a plurality of sprockets (e.g., a plurality of bicycle sprockets) of the rear sprocket assembly 312 includes a sprocket S with a multi-layered structure, as described below. Specifically, in the illustrated embodiment, as shown in FIG. 16, the sprocket S is the largest sprocket of the rear sprocket assembly 312. Of course, any one of the sprockets of the rear sprocket assembly 312 can have this multi-layered structure. For example, in the illustrated embodiment, an adjacent sprocket S' (e.g., an adjacent one of the bicycle sprockets) (FIG. 18B) adjacent to the sprocket S can also have this multi-layered structure. In the illustrated embodiment, since the sprocket S is the largest sprocket, the adjacent sprocket S' is the second largest sprocket of the rear sprocket assembly 312. On the other hand, in the illustrated embodiment, the other sprockets other than the sprockets S and S' can have any conventional configuration as needed and/or desired. For example, these sprockets other than the sprockets S and S' can be each formed as a one-piece, unitary member from a metallic material that is suitable for a bicycle sprocket such as an iron or an iron alloy. Furthermore, the configuration of the sprockets S and S' are basically identical to each other except for the dimensions of the sprockets S and S' and the number of sprocket teeth. Therefore, in the illustrated embodiment, the following disclosure will basically focus on the configuration of the sprocket S for the sake of brevity, and detailed description of the adjacent sprocket S' will be omitted for the sake of brevity.

Figure 17:
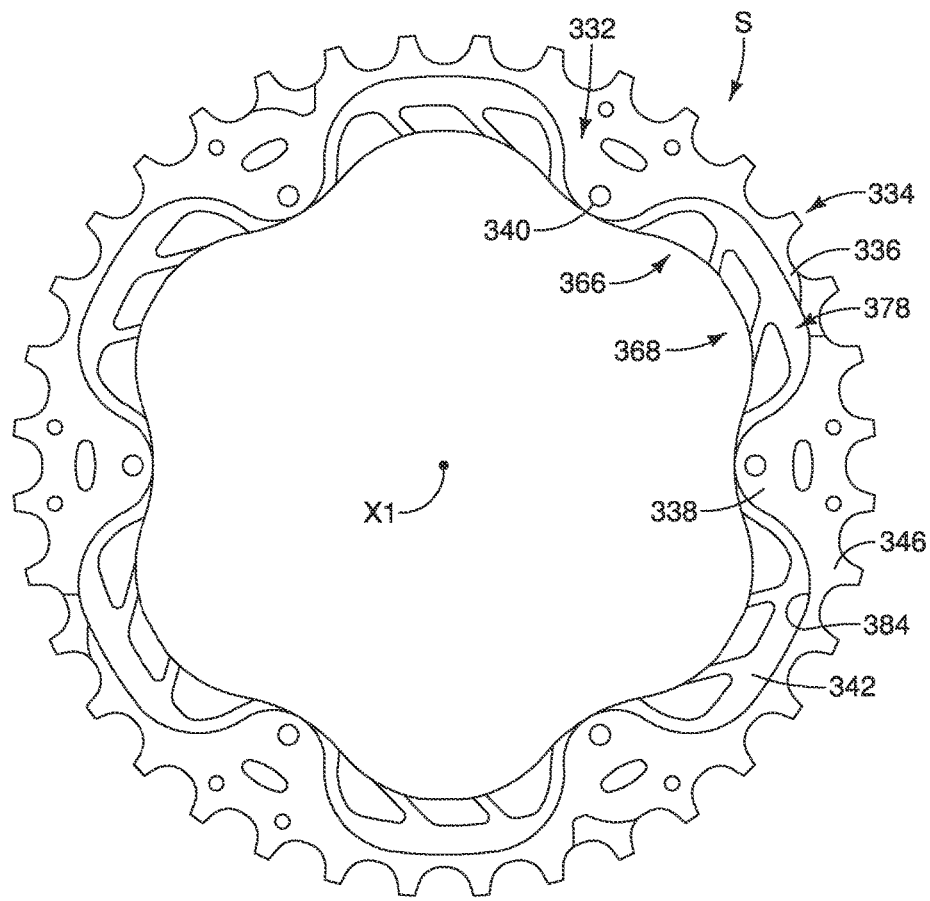
FIG. 17 is an inside elevational view of the bicycle sprocket illustrated in FIG. 16.

As shown in FIGS. 16 and 17, the sprocket S (e.g., a bicycle sprocket) basically includes a sprocket body 332, and a plurality of sprocket teeth 334. The sprocket body 332 has a rotational axis X1. The sprocket body 332 includes an outer periphery 336 and an inner periphery 338. The sprocket teeth 334 extend radially outwardly from the outer periphery 336 of the sprocket body 332. In the illustrated embodiment, the sprocket S is the largest sprocket of the rear sprocket assembly 312. As shown in FIGS. 16 and 17, the total number of the sprocket teeth 334 is thirty-six. Of course, the total number of the sprocket teeth can be different number as needed and/or desired.

In the illustrated embodiment, the sprocket S has a multi-layered structure. Specifically, as shown in FIGS. 16 to 18A, the sprocket S includes a first layered member 342, a second layered member 344, a third layered member 346, and a coating layer 348. In the illustrated embodiment, the first, second and third layered members 342, 344 and 346 extend radially outward from the inner periphery 338 of the sprocket body 332 to the sprocket teeth 334. The multi-layered structure of the sprocket S is basically identical to that of the sprocket S in accordance with the first embodiment, except that the sprocket body 332 has a plurality of (e.g., six) axially projecting portions 366 and a plurality of (e.g., six) axially recessed portions 368. Of course, it will be apparent to those skilled in the art from this disclosure that the number of the axially projecting portions 366 can be more than or less than six as needed and/or desired, and that the number of the axially recessed portions 368 can be more than or less than six as needed and/or desired. The axially projecting portions 366 and the axially recessed portion 368 are positioned at the sprocket body 332. In other words, the multi-layered structure of the sprocket teeth 334 of the sprocket S is identical to that of the sprocket S in accordance with the first embodiment. Specifically, the configurations of the first, second and third layered members 342, 344 and 346 and the coating layer 348 at the sprocket teeth 334 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 342, 344 and 346 and the coating layer 348 of the sprocket S are the same as those of the first, second and third layered members 42, 44 and 46 and the coating layer 48 of the sprocket S in accordance with the first embodiment, respectively. For example, the first layered member 342 has a specific gravity that is less than those of the second layered member 344 and the third layered member 346. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

Figure 18A:
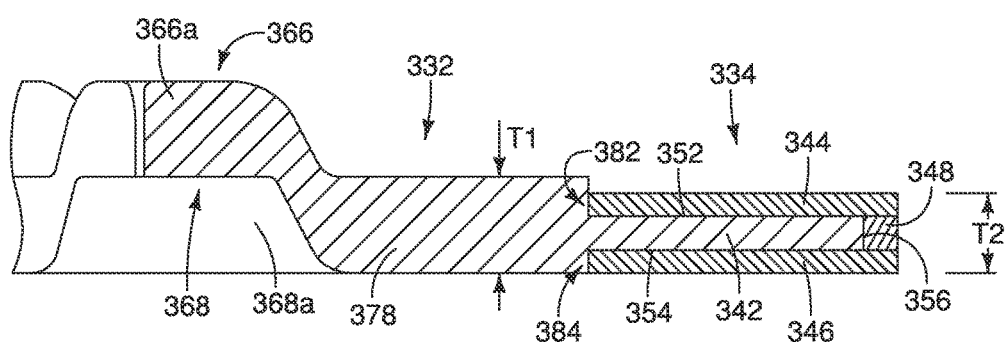
FIG. 18A is an enlarged, partial cross sectional view of the bicycle sprocket illustrated in FIG. 16.

As illustrated in FIG. 18A, the first layered member 342 has a first axial surface 352 and a second axial surface 354 opposite to the first axial surface 352. The second layered member 344 is attached to the first axial surface 352 of the first layered member 342. The third layered member 346 is attached to the second axial surface 354 of the first layered member 342. The coating layer 348 is formed on a radially end surface 356 of the first layered member 342. The first, second and third layered members 342, 344 and 346 and the coating layer 348 are attached with respect to each other in the same fixing manner as discussed in the first embodiment. Thus, the detailed description will be omitted for the sake of brevity.

In the illustrated embodiment, the first layered member 342 has a plurality of table portions 378. The table portions 378 are circumferentially spaced from each other at predetermined interval about the inner periphery 338 of the sprocket body 332. The axially projecting portions 366 and the axially recessed portions 368 are formed on the table portions 378, respectively. Specifically, each of the axially projecting portions 366 has a plurality of (e.g., three) projections 366a that is formed on one axial side of respective one of the table portions 378, while each of the axially recessed portions 368 has a plurality of (e.g., three) recesses 368a that is formed on the other axial side of the respective one of the table portions 378. In particular, as shown in FIG. 18A, each of the axially projecting portions 366 bulges towards the first axial surface 352 side at the respective one of the table portions 378, which defines the axially recessed portions 368 on the second axial surface 354 side at the respective one of the table portions 378. In the illustrated embodiment, the first layered member 342 is integrally formed as a one-piece, unitary member. Of course, it will be apparent to those skilled in the art from this disclosure that the number of the projections 366a of each of the axially projecting portions 366 can be more than or less than three as needed and/or desired, and that the number of the recesses 368a of each of the axially recessed portions 368 can be more than or less than three as needed and/or desired.

As shown in FIG. 18A, the first and second layered members 342 and 344 overlap each other in an axial direction as viewed parallel to the rotational axis X1. Specifically, the first and second layered members 342 and 344 overlap each other in the axial direction at an area except for the table portions 378. As shown in FIG. 18A, the table portions 378 are integrally formed with the first layered member 342 as a one-piece, unitary member. Thus, as shown in FIG. 16, the first layered member 342 is axially exposed at the table portions 378 through notches 382 of the second layered member 344 in the axial direction as viewed parallel to the rotational axis X1. Furthermore, as shown in FIG. 18A, the first and second layered members 342 and 344 do not overlap each other in a radial direction as viewed perpendicularly to the rotational axis X1 at least at the sprocket teeth 334 of the sprocket S. On the other hand, the first and third layered members 342 and 346 overlap each other in the axial direction as viewed parallel to the rotational axis X1. Specifically, the first and third layered members 342 and 346 overlap each other in the axial direction at an area except for the table portions 378. Furthermore, the first and third layered members 342 and 346 do not overlap each other in the radial direction as viewed perpendicularly to the rotational axis X1 at least at the sprocket teeth 334 of the sprocket S. As shown in FIG. 18A, the first layered member 342 is also axially exposed at the table portions 378 through notches 384 of the third layered member 346 in the axial direction as viewed parallel to the rotational axis X1. Thus, in the illustrated embodiment, the sprocket body 332 partially includes the first layered member 342, the second layered member 344 and the third layered member 346 at the area except for the table portions 378. In other words, as shown in FIG. 18A, the sprocket body 332 only includes the first layered member 342 at the table portions 378. In the illustrated embodiment, the axial dimension or thickness T1 of the first layered member 342 at the table portions 378 is larger than the axial dimension or thickness T2 of the sprocket teeth 334. Thus, as shown in FIG. 18A, the table portions 378 of the first layered member 342 radially contact with inner surfaces of the notches 382 of the second layered member 344 and inner surfaces of the notches 384 of the third layered member 346. Furthermore, in the illustrated embodiment, the second and third layered members 344 and 346 have an identical shape.

Figure 18B:
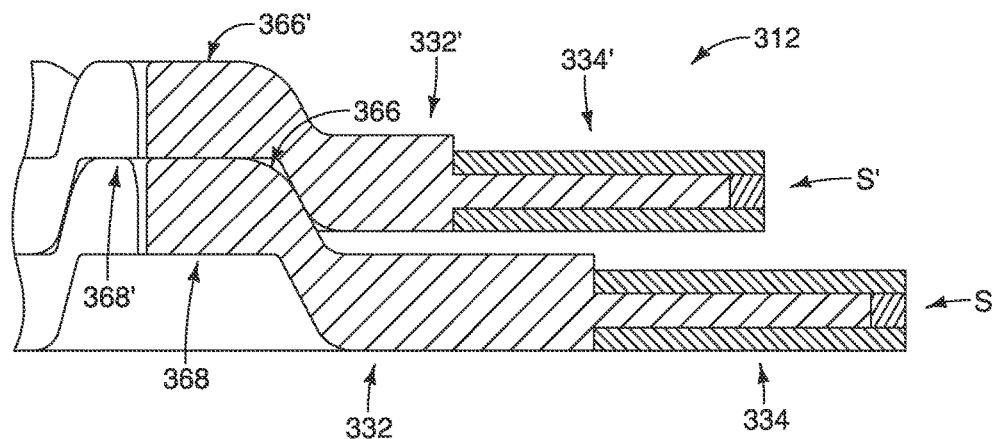
FIG. 18B is an enlarged, partial cross sectional view of the bicycle sprocket illustrated in FIG. 16, with the bicycle sprocket detachably coupled to an adjacent sprocket.

As shown in FIG. 18B, the rear sprocket assembly 312 includes the sprocket S and the adjacent sprocket S' (e.g., a plurality of bicycle sprockets). The sprocket S and the adjacent sprocket S' are detachably coupled to each other. Specifically, as shown in FIG. 18B, similar to the sprocket S, the adjacent sprocket S' has a plurality of axially projecting portions 366' and a plurality of axially recessed portions 368'. The axially projecting portions 366 of the sprocket S (e.g., one of the bicycle sprockets) mates with axially recessed portions 368' of the adjacent sprocket S' (e.g., an adjacent one of the bicycle sprockets) adjacent to the sprocket S (e.g., one of the bicycle sprockets) while the sprockets S and S' (e.g., bicycle sprockets) are attached to each other. Specifically, in the illustrated embodiment, an outer profile of each of the axially projecting portions 366 of the sprocket S is dimensioned to match with an inner profile of respective one of the axially recessed portions 368' of the adjacent sprocket S'. Thus, the sprockets S and S' are fittedly and detachably coupled to each other. Furthermore, an axial height of the axially projecting portion 366 of the sprocket S and an axial depth of the axially recessed portion 368' of the adjacent sprocket S' are dimensioned such that the sprocket bodies 332 and 332' and the sprocket teeth 334 and 334' of the sprockets S and S' are axially spaced from each other at a predetermined interval.

In the illustrated embodiment, the sprocket S includes the first layered member 342, the second layered member 344, the third layered member 346, and the coating layer 348. However, the multi-layered structure of the sprocket S is not limited to this. The sprocket S can only include the first layered member 342, the second layered member 344 and the third layered member 346 without the coating layer 348. Furthermore, the sprocket S can only include the first layered member 342, the second layered member 344 and the coating layer 348 without the third layered member 346. In this case, a third axial surface of the second layered member 344 is attached to the first axial surface 352 of the first layered member 342. However, the second axial surface 354 of the first layered member 342 and a fourth axial surface of the second layered member 344 that is opposite the third axial surface are exposed. Furthermore, the sprocket S can only include the first layered member 342, the third layered member 346 and the coating layer 348 without the second layered member 344. In this case, the first axial surface 352 of the first layered member 342 is axially exposed.

FIFTH EMBODIMENT

Figure 19:
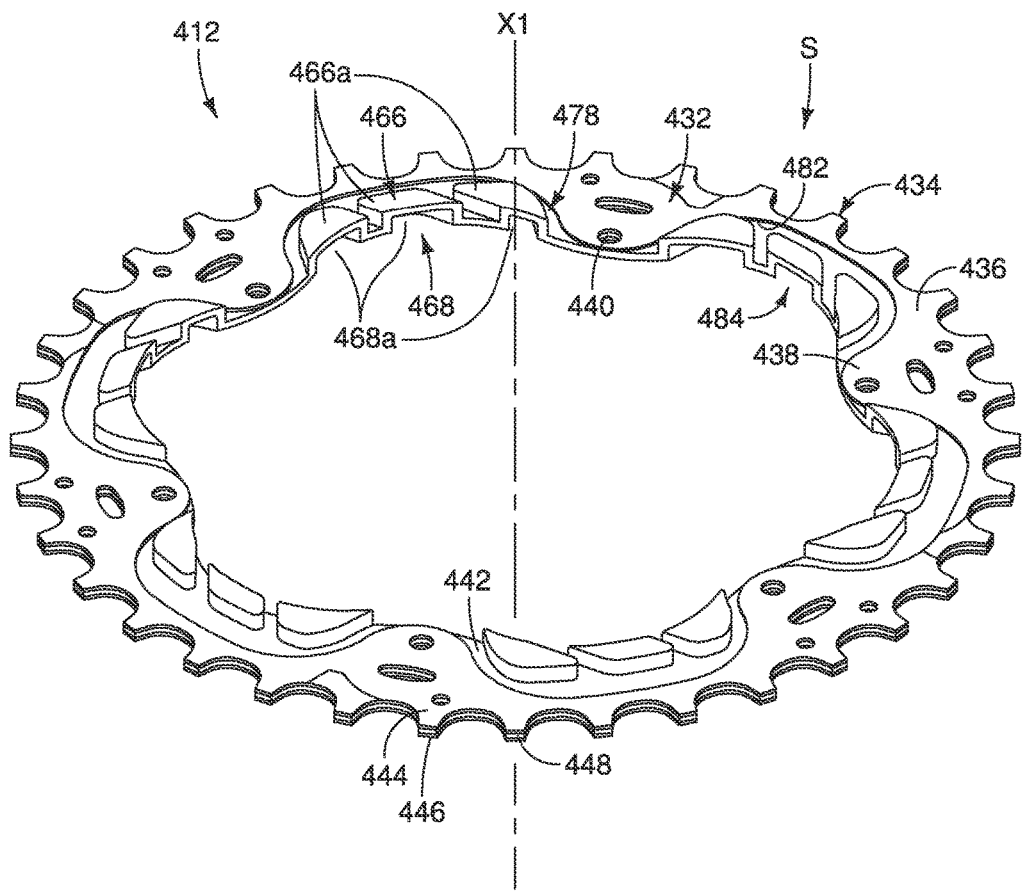
FIG. 19 is a perspective view of a bicycle sprocket in accordance with a fifth embodiment.
Figure 20:
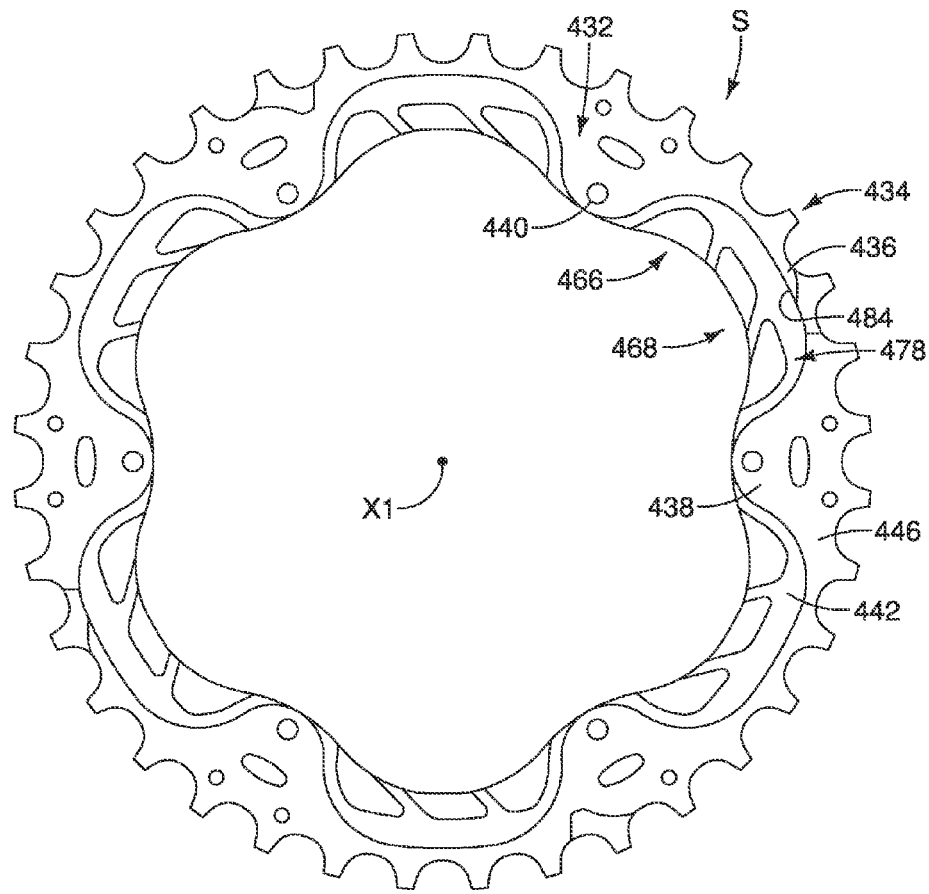
FIG. 20 is an inside elevational view of the bicycle sprocket illustrated in FIG. 19.
Figure 21:
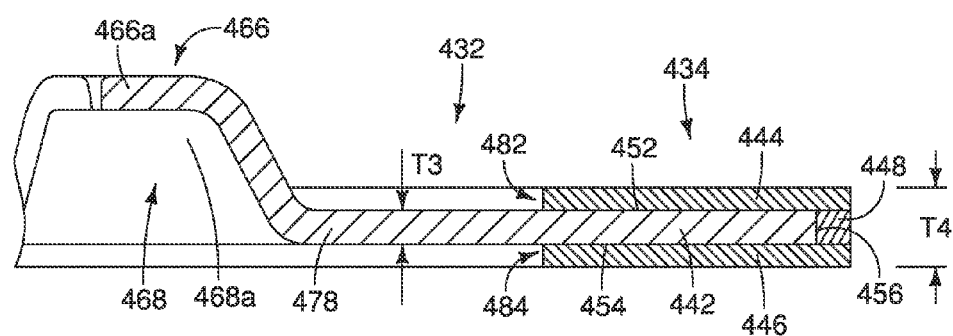
FIG. 21 is an enlarged, partial cross sectional view of the bicycle sprocket illustrated in FIG. 19.

Referring now to FIGS. 19 to 21, a rear sprocket assembly 412 (e.g., a multiple sprocket assembly) in accordance with a fifth embodiment will now be explained. The rear sprocket assembly 412 is basically identical to the rear sprocket assembly 12 in accordance with the first embodiment, except for a configuration of a sprocket body 432, as explained below.

In view of the similarity between the first and fifth embodiments, the parts of the fifth embodiment that are identical to the parts of the first embodiment will be given the same reference numerals as the parts of the first embodiment. Also, parts of this fifth embodiment that are functionally identical and/or substantially identical to parts of the first embodiment will be given the same reference numerals but with "400" added thereto. In any event, the descriptions of the parts of the fifth embodiment that are substantially identical to the parts of the first embodiment may be omitted for the sake of brevity. However, it will be apparent to those skilled in the art from this disclosure that the descriptions and illustrations of the first embodiment also apply to this fifth embodiment, except as discussed and/or illustrated herein.

In the illustrated embodiment, a plurality of sprockets (e.g., a plurality of bicycle sprockets) of the rear sprocket assembly 412 includes a sprocket S with a multi-layered structure, as described below. Specifically, in the illustrated embodiment, as shown in FIG. 19, the sprocket S is the largest sprocket of the rear sprocket assembly 412. Of course, any one of the sprockets of the rear sprocket assembly 412 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 412. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 19 and 20, the sprocket S (e.g., a bicycle sprocket) basically includes a sprocket body 432, and a plurality of sprocket teeth 434. The sprocket body 432 has a rotational axis X1. The sprocket body 432 includes an outer periphery 436 and an inner periphery 438. The sprocket teeth 434 extend radially outwardly from the outer periphery 436 of the sprocket body 432. In the illustrated embodiment, the sprocket S is the largest sprocket of the rear sprocket assembly 412. As shown in FIGS. 19 and 20, the total number of the sprocket teeth 434 is thirty-six. Of course, the total number of the sprocket teeth can be different number as needed and/or desired.

In the illustrated embodiment, the sprocket S has a multi-layered structure. Specifically, as shown in FIGS. 19 to 21, the sprocket S includes a first layered member 442, a second layered member 444, a third layered member 446, and a coating layer 448. In the illustrated embodiment, the first, second and third layered members 442, 444 and 446 extend radially outward from the inner periphery 438 of the sprocket body 432 to the sprocket teeth 434. The multi-layered structure of the sprocket S is basically identical to that of the sprocket S in accordance with the first embodiment, except that the sprocket body 432 has a plurality of (e.g., six) axially projecting portions 466 and a plurality of (e.g., six) axially recessed portions 468. Of course, it will be apparent to those skilled in the art from this disclosure that the number of the axially projecting portions 466 can be more than or less than six as needed and/or desired, and that the number of the axially recessed portions 468 can be more than or less than six as needed and/or desired. The axially projecting portions 466 and the axially recessed portion 468 are positioned at the sprocket body 432. In other words, the multi-layered structure of the sprocket teeth 434 of the sprocket S is identical to that of the sprocket S in accordance with the first embodiment. Specifically, the configurations of the first, second and third layered members 442, 444 and 446 and the coating layer 448 at the sprocket teeth 434 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 442, 444 and 446 and the coating layer 448 of the sprocket S are same as those of the first, second and third layered members 42, 44 and 46 and the coating layer 48 of the sprocket S in accordance with the first embodiment, respectively. For example, the first layered member 442 has a specific gravity that is less than those of the second layered member 444 and the third layered member 446. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

As illustrated in FIG. 21, the first layered member 442 has a first axial surface 452 and a second axial surface 454 opposite to the first axial surface 452. The second layered member 444 is attached to the first axial surface 452 of the first layered member 442. The third layered member 446 is attached to the second axial surface 454 of the first layered member 442. The coating layer 448 is formed on a radially end surface 456 of the first layered member 442. The first, second and third layered members 442, 444 and 446 and the coating layer 448 are attached with respect to each other in the same fixing manner as discussed in the first embodiment. Thus, the detailed description will be omitted for the sake of brevity.

In the illustrated embodiment, the first layered member 442 has a plurality of table portions 478. The table portions 478 are circumferentially spaced from each other at predetermined interval about the inner periphery 438 of the sprocket body 432. The axially projecting portions 466 and the axially recessed portions 468 are formed on the table portions 478, respectively. Specifically, each of the axially projecting portions 466 has a plurality of (e.g., three) projections 466a that is formed on one axial side of respective one of the table portions 478, while each of the axially recessed portions 468 has a plurality of (e.g., three) recesses 468a that is formed on the other axial side of the respective one of the table portions 478. In particular, as shown in FIG. 21, each of the axially projecting portions 466 bulges towards the first axial surface 452 side at the respective one of the table portions 478, which defines the axially recessed portions 468 on the second axial surface 454 side at the respective one of the table portions 478. In the illustrated embodiment, the first layered member 442 is integrally formed as a one-piece, unitary member. Of course, it will be apparent to those skilled in the art from this disclosure that the number of the projections 466a of each of the axially projecting portions 466 can be more than or less than three as needed and/or desired, and that the number of the recesses 468a of each of the axially recessed portions 468 can be more than or less than three as needed and/or desired.

As shown in FIG. 21, the first and second layered members 442 and 444 overlap each other in an axial direction as viewed parallel to the rotational axis X1. Specifically, the first and second layered members 442 and 444 overlap each other in the axial direction at an area except for the table portions 478. As shown in FIG. 21, the table portions 478 are integrally formed with the first layered member 442 as a one-piece, unitary member. Thus, as shown in FIG. 19, the first layered member 442 is axially exposed at the table portions 478 through notches 482 of the second layered member 444 in the axial direction as viewed parallel to the rotational axis X1. Furthermore, as shown in FIG. 21, the first and second layered members 442 and 444 do not overlap each other in a radial direction as viewed perpendicularly to the rotational axis X1 at least at the sprocket teeth 434 of the sprocket S. On the other hand, the first and third layered members 442 and 446 overlap each other in the axial direction as viewed parallel to the rotational axis X1. Specifically, the first and third layered members 442 and 446 overlap each other in the axial direction at an area except for the table portions 478. Furthermore, the first and third layered members 442 and 446 do not overlap each other in the radial direction as viewed perpendicularly to the rotational axis X1 at least at the sprocket teeth 434 of the sprocket S. As shown in FIG. 21, the first layered member 442 is also axially exposed at the table portions 478 through notches 484 of the third layered member 446 in the axial direction as viewed parallel to the rotational axis X1. Thus, in the illustrated embodiment, the sprocket body 432 partially includes the first layered member 442, the second layered member 444 and the third layered member 446 at the area except for the table portions 478. In other words, as shown in FIG. 21, the sprocket body 432 only includes the first layered member 442 at the table portions 478. In the illustrated embodiment, the axial dimension or thickness T3 of the first layered member 442 at the table portions 478 is smaller than the axial dimension or thickness T4 of the sprocket teeth 434. Thus, as shown in FIG. 21, the table portions 478 of the first layered member 442 is axially recessed relative to the second layered member 444 and relative to the third layered member 446. Specifically, the table portions 478 have the same axial dimension T3 as the axial dimension or thickness of the first layered member 442 at the sprocket teeth 434. Furthermore, in the illustrated embodiment, the second and third layered members 444 and 446 have an identical shape.

As mentioned above, the rear sprocket assembly 412 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 466 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 466 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 466 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 442, the second layered member 444, the third layered member 446, and the coating layer 448. However, the multi-layered structure of the sprocket S is not limited to this. The sprocket S can only include the first layered member 442, the second layered member 444 and the third layered member 446 without the coating layer 448. Furthermore, the sprocket S can only include the first layered member 442, the second layered member 444 and the coating layer 448 without the third layered member 446. In this case, a third axial surface of the second layered member 444 is attached to the first axial surface 452 of the first layered member 442. However, the second axial surface 454 of the first layered member 442 and a fourth axial surface of the second layered member 444 that is opposite the third axial surface are exposed. Furthermore, alternatively, the sprocket S can only include the first layered member 442, the third layered member 446 and the coating layer 448 without the second layered member 444. In this case, the first axial surface 452 of the first layered member 442 is axially exposed.

SIXTH EMBODIMENT

Figure 22:
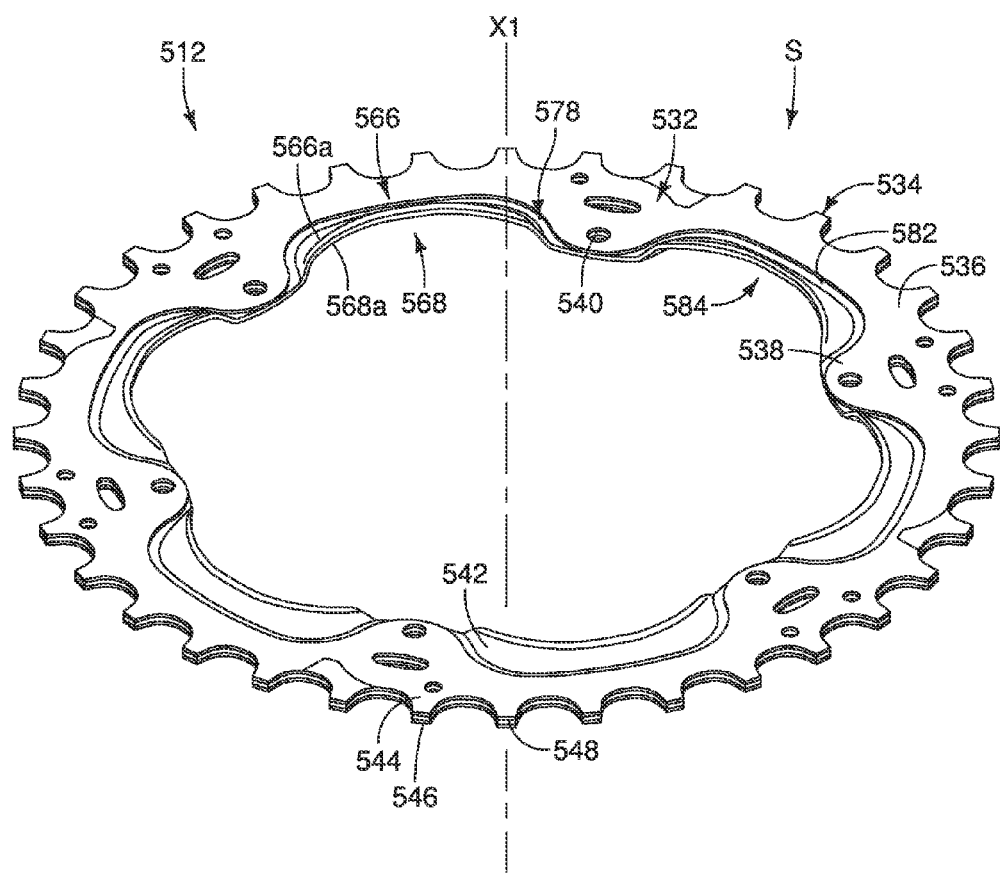
FIG. 22 is a perspective view of a bicycle sprocket in accordance with a sixth embodiment.
Figure 23:
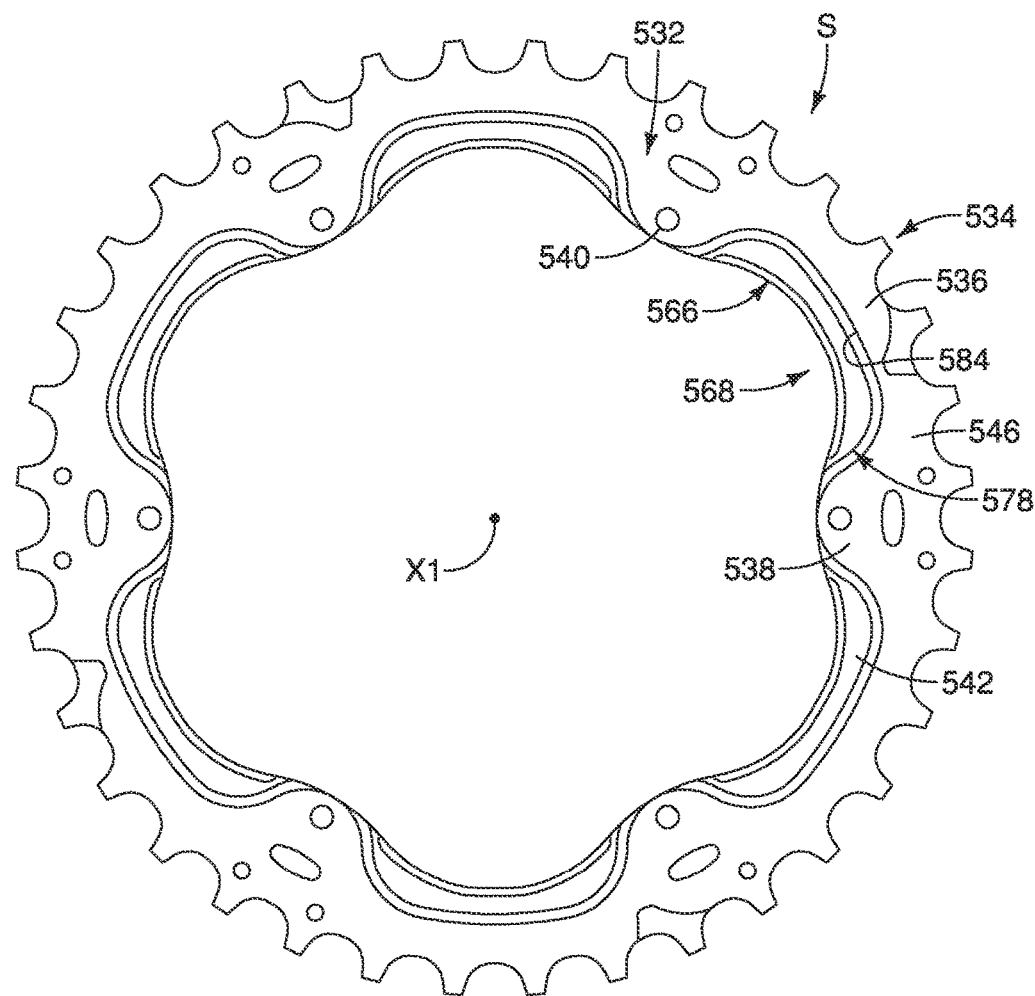
FIG. 23 is an inside elevational view of the bicycle sprocket illustrated in FIG. 22.

Referring now to FIGS. 22 and 23, a rear sprocket assembly 512 (e.g., a multiple sprocket assembly) in accordance with a sixth embodiment will now be explained. The rear sprocket assembly 512 is basically identical to the rear sprocket assembly 12 in accordance with the first embodiment, except for a configuration of a sprocket body 532, as explained below.

In view of the similarity between the first and sixth embodiments, the parts of the sixth embodiment that are identical to the parts of the first embodiment will be given the same reference numerals as the parts of the first embodiment. Also, parts of this sixth embodiment that are functionally identical and/or substantially identical to parts of the first embodiment will be given the same reference numerals but with "500" added thereto. In any event, the descriptions of the parts of the sixth embodiment that are substantially identical to the parts of the first embodiment may be omitted for the sake of brevity. However, it will be apparent to those skilled in the art from this disclosure that the descriptions and illustrations of the first embodiment also apply to this sixth embodiment, except as discussed and/or illustrated herein.

In the illustrated embodiment, a plurality of sprockets (e.g., a plurality of bicycle sprockets) of the rear sprocket assembly 512 includes a sprocket S with a multi-layered structure, as described below. Specifically, in the illustrated embodiment, as shown in FIG. 22, the sprocket S is the largest sprocket of the rear sprocket assembly 512. Of course, any one of the sprockets of the rear sprocket assembly 512 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 512. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 22 and 23, the sprocket S (e.g., a bicycle sprocket) basically includes a sprocket body 532, and a plurality of sprocket teeth 534. The sprocket body 532 has a rotational axis X1. The sprocket body 532 includes an outer periphery 536 and an inner periphery 538. The sprocket teeth 534 extend radially outwardly from the outer periphery 536 of the sprocket body 532. In the illustrated embodiment, the sprocket S is the largest sprocket of the rear sprocket assembly 512. As shown in FIGS. 22 and 23, the total number of the sprocket teeth 534 is thirty-six. Of course, the total number of the sprocket teeth can be different number as needed and/or desired.

In the illustrated embodiment, the sprocket S has a multi-layered structure. Specifically, as shown in FIGS. 22 and 23, the sprocket S includes a first layered member 542, a second layered member 544, a third layered member 546, and a coating layer 548. In the illustrated embodiment, the first, second and third layered members 542, 544 and 546 extend radially outward from the inner periphery 538 of the sprocket body 532 to the sprocket teeth 534. The multi-layered structure of the sprocket S is basically identical to that of the sprocket S in accordance with the first embodiment, except that the sprocket body 532 has a plurality of (e.g., six) axially projecting portions 566 and a plurality of (e.g., six) axially recessed portions 568. Of course, it will be apparent to those skilled in the art from this disclosure that the number of the axially projecting portions 566 can be more than or less than six as needed and/or desired, and that the number of the axially recessed portions 568 can be more than or less than six as needed and/or desired. The axially projecting portions 566 and the axially recessed portions 568 are positioned at the sprocket body 532. In other words, the multi-layered structure of the sprocket teeth 534 of the sprocket S is identical to that of the sprocket S in accordance with the first embodiment. Specifically, the configurations of the first, second and third layered members 542, 544 and 546 and the coating layer 548 at the sprocket teeth 534 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 542, 544 and 546 and the coating layer 548 of the sprocket S are same as those of the first, second and third layered members 42, 44 and 46 and the coating layer 48 of the sprocket S in accordance with the first embodiment, respectively. For example, the first layered member 542 has a specific gravity that is less than those of the second layered member 544 and the third layered member 546. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

In the illustrated embodiment, the first layered member 542 has a first axial surface and a second axial surface opposite to the first axial surface. The second layered member 544 is attached to the first axial surface of the first layered member 542. The third layered member 546 is attached to the second axial surface of the first layered member 542. The coating layer 548 is formed on a radially end surface of the first layered member 542. The first, second and third layered members 542, 544 and 546 and the coating layer 548 are attached with respect to each other in the same fixing manner as discussed in the first embodiment. Thus, the detailed description will be omitted for the sake of brevity.

In the illustrated embodiment, the first layered member 542 has a plurality of (e.g., six) table portions 578. The table portions 578 are circumferentially spaced from each other at predetermined interval about the inner periphery 538 of the sprocket body 532. The axially projecting portions 566 and the axially recessed portions 568 are formed on the table portions 578, respectively. Specifically, each of the axially projecting portions 566 has a single projection 566a that is formed on one axial side of respective one of the table portions 578, while each of the axially recessed portions 568 has a single recess 568a that is formed on the other axial side of the respective one of the table portions 578. In particular, in the illustrated embodiment, each of the axially projecting portions 566 bulges towards the first axial surface side at the respective one of the table portions 578, which defines the axially recessed portions 568 on the second axial surface side at the respective one of the table portions 578. In the illustrated embodiment, the first layered member 542 is integrally formed as a one-piece, unitary member.

As shown in FIG. 22, the first and second layered members 542 and 544 overlap each other in an axial direction as viewed parallel to the rotational axis X1. Specifically, the first and second layered members 542 and 544 overlap each other in the axial direction at an area except for the table portions 578. As shown in FIG. 22, the table portions 578 are integrally formed with the first layered member 542 as a one-piece, unitary member. Thus, as shown in FIG. 22, the first layered member 542 is axially exposed at the table portions 578 through notches 582 of the second layered member 544 in the axial direction as viewed parallel to the rotational axis X1. Furthermore, in the illustrated embodiment, the first and second layered members 542 and 544 do not overlap each other in a radial direction as viewed perpendicularly to the rotational axis X1 at least at the sprocket teeth 534 of the sprocket S. On the other hand, as shown in FIG. 23, the first and third layered members 542 and 546 overlap each other in the axial direction as viewed parallel to the rotational axis X1. Specifically, the first and third layered members 542 and 546 overlap each other in the axial direction at an area except for the table portions 578. Furthermore, the first and third layered members 542 and 546 do not overlap each other in the radial direction as viewed perpendicularly to the rotational axis X1 at least at the sprocket teeth 534 of the sprocket S. As shown in FIG. 23, the first layered member 542 is also axially exposed at the table portions 578 through notches 584 of the third layered member 546 in the axial direction as viewed parallel to the rotational axis X1. Thus, in the illustrated embodiment, the sprocket body 532 partially includes the first layered member 542, the second layered member 544 and the third layered member 546 at the area except for the table portions 578. In other words, as shown in FIGS. 22 and 23, the sprocket body 532 only includes the first layered member 542 at the table portions 578. In the illustrated embodiment, the axial dimension or thickness of the first layered member 542 at the table portions 578 is smaller than the axial dimension or thickness of the sprocket teeth 534. Thus, as shown in FIGS. 22 and 23, the table portions 578 of the first layered member 542 is axially recessed relative to the second layered member 544 and relative to the third layered member 546. Specifically, the table portions 578 have the same axial dimension as the axial dimension or thickness of the first layered member 542 at the sprocket teeth 534. Furthermore, in the illustrated embodiment, the second and third layered members 544 and 546 have an identical shape.

As mentioned above, the rear sprocket assembly 512 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 566 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 566 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 566 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 542, the second layered member 544, the third layered member 546, and the coating layer 548. However, the multi-layered structure of the sprocket S is not limited to this. The sprocket S can only include the first layered member 542, the second layered member 544 and the third layered member 546 without the coating layer 548. Furthermore, the sprocket S can only include the first layered member 542, the second layered member 544 and the coating layer 548 without the third layered member 546. In this case, a third axial surface of the second layered member 544 is attached to the first axial surface of the first layered member 542. However, the second axial surface of the first layered member 542 and a fourth axial surface of the second layered member 544 that is opposite the third axial surface are exposed. Furthermore, alternatively, the sprocket S can only include the first layered member 542, the third layered member 546 and the coating layer 548 without the second layered member 544. In this case, the first axial surface of the first layered member 542 is axially exposed.

SEVENTH EMBODIMENT

Figure 24:
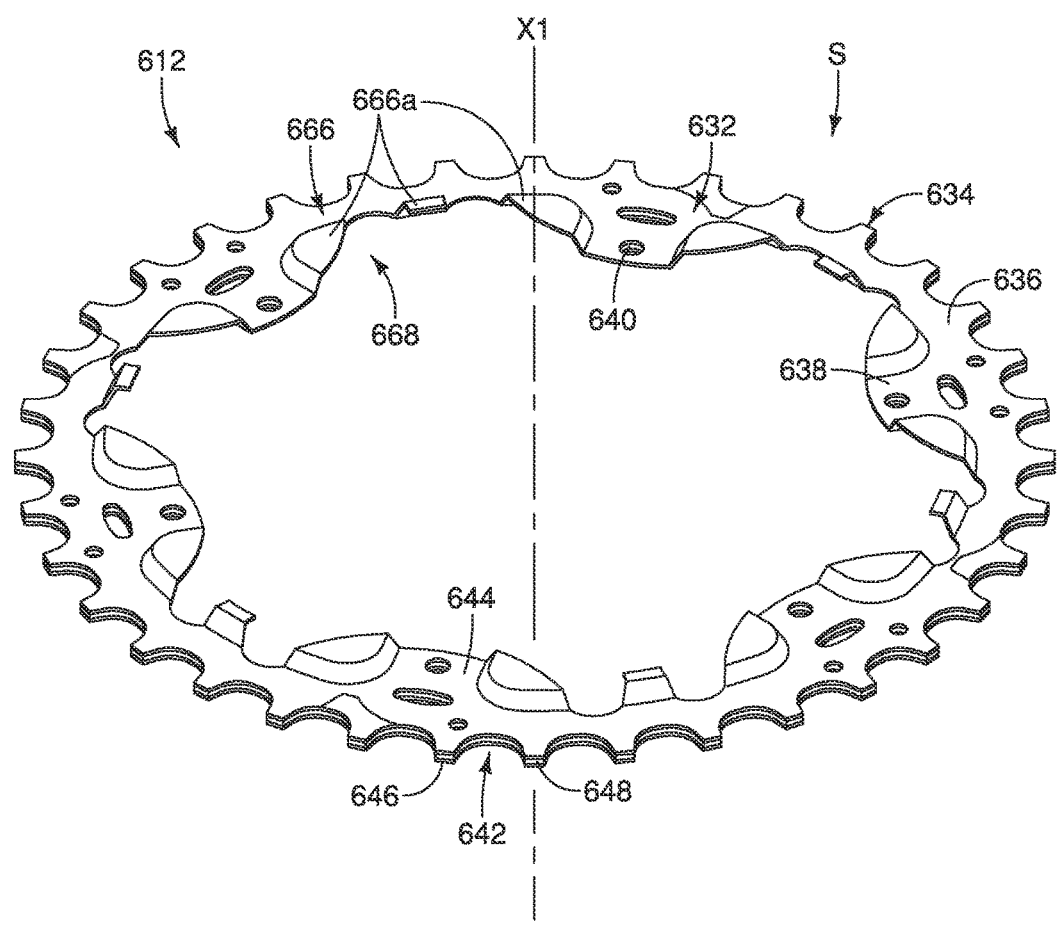
FIG. 24 is a perspective view of a bicycle sprocket in accordance with a seventh embodiment.
Figure 25:
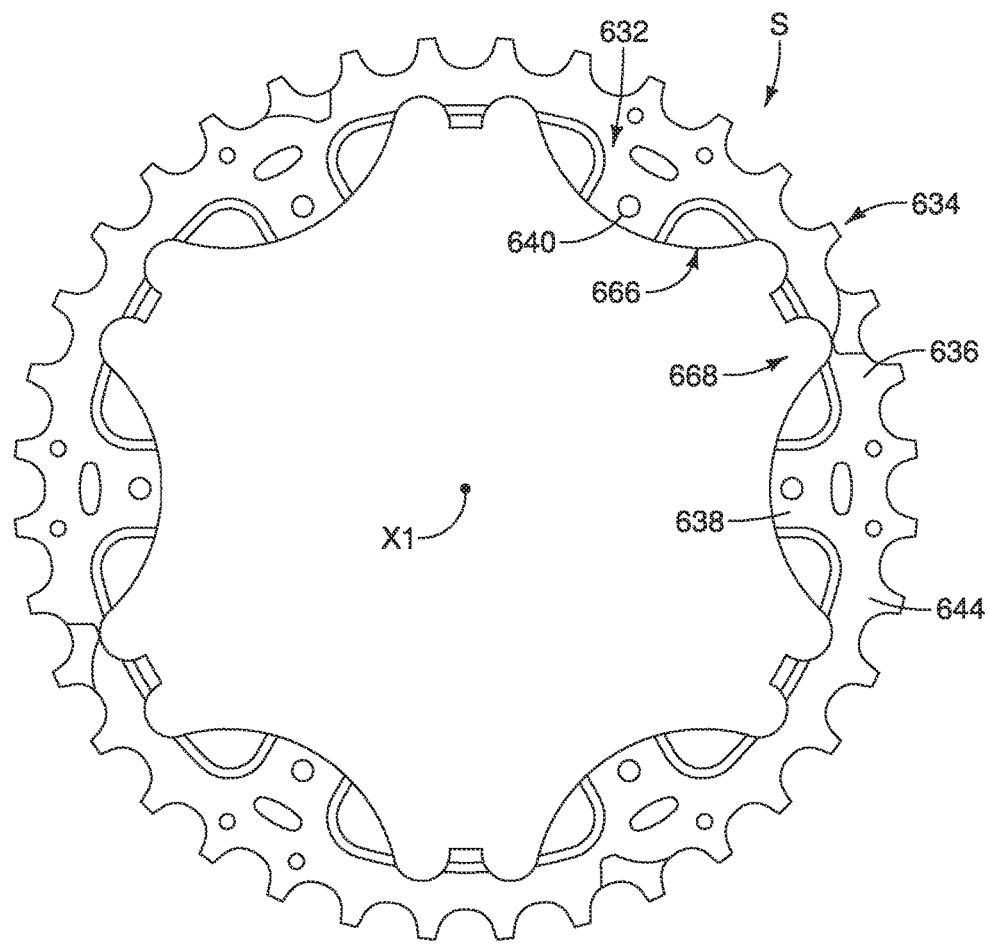
FIG. 25 is an inside elevational view of the bicycle sprocket illustrated in FIG. 24.
Figure 26:
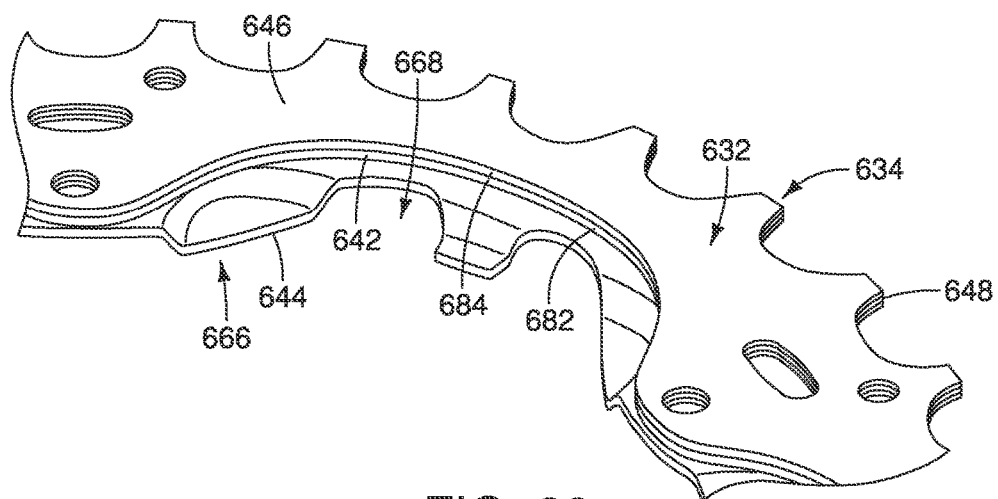
FIG. 26 is an enlarged, partial perspective view of the bicycle sprocket illustrated in FIG. 24.

Referring now to FIGS. 24 to 26, a rear sprocket assembly 612 (e.g., a multiple sprocket assembly) in accordance with a seventh embodiment will now be explained. The rear sprocket assembly 612 is basically identical to the rear sprocket assembly 12 in accordance with the first embodiment, except for a configuration of a sprocket body 632, as explained below.

In view of the similarity between the first and seventh embodiments, the parts of the seventh embodiment that are identical to the parts of the first embodiment will be given the same reference numerals as the parts of the first embodiment. Also, parts of this seventh embodiment that are functionally identical and/or substantially identical to parts of the first embodiment will be given the same reference numerals but with "600" added thereto. In any event, the descriptions of the parts of the seventh embodiment that are substantially identical to the parts of the first embodiment may be omitted for the sake of brevity. However, it will be apparent to those skilled in the art from this disclosure that the descriptions and illustrations of the first embodiment also apply to this seventh embodiment, except as discussed and/or illustrated herein.

In the illustrated embodiment, a plurality of sprockets (e.g., a plurality of bicycle sprockets) of the rear sprocket assembly 612 includes a sprocket S with a multi-layered structure, as described below. Specifically, in the illustrated embodiment, as shown in FIG. 24, the sprocket S is the largest sprocket of the rear sprocket assembly 612. Of course, any one of the sprockets of the rear sprocket assembly 612 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 612. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 24 and 25, the sprocket S (e.g., a bicycle sprocket) basically includes a sprocket body 632, and a plurality of sprocket teeth 634. The sprocket body 632 has a rotational axis X1. The sprocket body 632 includes an outer periphery 636 and an inner periphery 638. The sprocket teeth 634 extend radially outwardly from the outer periphery 636 of the sprocket body 632. In the illustrated embodiment, the sprocket S is the largest sprocket of the rear sprocket assembly 612. As shown in FIGS. 24 and 25, the total number of the sprocket teeth 634 is thirty-six. Of course, the total number of the sprocket teeth can be different number as needed and/or desired.

In the illustrated embodiment, the sprocket S has a multi-layered structure. Specifically, as shown in FIGS. 24 to 26, the sprocket S includes a first layered member 642, a second layered member 644, a third layered member 646, and a coating layer 648. In the illustrated embodiment, the first, second and third layered members 642, 644 and 646 extend radially outward from the inner periphery 638 of the sprocket body 632 to the sprocket teeth 634. The multi-layered structure of the sprocket S is basically identical to that of the sprocket S in accordance with the first embodiment, except that the sprocket body 632 has a plurality of (e.g., six) axially projecting portions 666 and a plurality of (e.g., six) axially recessed portions 668. Of course, it will be apparent to those skilled in the art from this disclosure that the number of the axially projecting portions 666 can be more than or less than six as needed and/or desired, and that the number of the axially recessed portions 668 can be more than or less than six as needed and/or desired. The axially projecting portions 666 and the axially recessed portions 668 are positioned at the sprocket body 632. In other words, the multi-layered structure of the sprocket teeth 634 of the sprocket S is identical to that of the sprocket S in accordance with the first embodiment. Specifically, the configurations of the first, second and third layered members 642, 644 and 646 and the coating layer 648 at the sprocket teeth 634 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 642, 644 and 646 and the coating layer 648 of the sprocket S are same as those of the first, second and third layered members 42, 44 and 46 and the coating layer 48 of the sprocket S in accordance with the first embodiment, respectively. For example, the first layered member 642 has a specific gravity that is less than those of the second layered member 644 and the third layered member 646. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

In the illustrated embodiment, the first layered member 642 has a first axial surface and a second axial surface opposite to the first axial surface. The second layered member 644 is attached to the first axial surface of the first layered member 642. The third layered member 646 is attached to the second axial surface of the first layered member 642. The coating layer 648 is formed on a radially end surface of the first layered member 642. The first, second and third layered members 642, 644 and 646 and the coating layer 648 are attached with respect to each other in the same fixing manner as discussed in the first embodiment. Thus, the detailed description will be omitted for the sake of brevity.

As shown in FIG. 26, the first and third layered members 642 and 646 are generally a flat plate with planer opposite surfaces being planar between the inner periphery 638 of the sprocket body 632 to the sprocket teeth 634 other than various holes and recesses. On the other hand, the second layered member 644 has the axially projecting portions 666 and the axially recessed portions 668. The axially projecting portions 666 and the axially recessed portions 668 are formed at locations circumferentially spaced from each other at predetermined interval about the inner periphery 638 of the sprocket body 632. Each of the axially projecting portions 666 has a plurality of projections 666a that is formed on one axial side of the second layered member 644. The projections 666a of the axially projecting portions 666 define the axially recessed portions 668 on the other axial side of the second layered member 644. In particular, in the illustrated embodiment, as shown in FIG. 26, each of the axially projecting portions 666 bulges away from the first and third layered members 642 and 646, which defines the axially recessed portions 668 that are recessed away from the first and third layered members 642 and 646. In the illustrated embodiment, the second layered member 644 is integrally formed as a one-piece, unitary member.

As shown in FIG. 24 to 26, the first and second layered members 642 and 644 overlap each other in an axial direction as viewed parallel to the rotational axis X1. Furthermore, in the illustrated embodiment, the first and second layered members 642 and 644 do not overlap each other in a radial direction as viewed perpendicularly to the rotational axis X1. On the other hand, the first and third layered members 642 and 646 overlap each other in the axial direction as viewed parallel to the rotational axis X1. Furthermore, the first and third layered members 642 and 646 do not overlap each other in the radial direction as viewed perpendicularly to the rotational axis X1 at least at the sprocket teeth 634 of the sprocket S. As shown in FIG. 26, the first layered member 642 includes a plurality of (e.g., six) notches 682 that is circumferentially spaced from each other at predetermined interval about the inner periphery 638 of the sprocket body 632. Furthermore, the third layered member 646 includes a plurality of (e.g., six) notches 684 that is circumferentially spaced from each other at predetermined interval about the inner periphery 638 of the sprocket body 632. Of course, it will be apparent to those skilled in the art from this disclosure that the numbers of the notches 682 and 684 can be more than or less than six as needed and/or desired. The notches 682 of the first layered member 642 are formed at locations corresponding to the notches 684 of the third layered member 646. Specifically, in the illustrated embodiment, the first and third layered members 642 and 646 have an identical shape. Thus, inner surfaces of the axially recessed portions 668 of the second layered member 644 are axially exposed through the notches 682 of the first layered member 642 and through the notches 684 of the third layered member 646, respectively, in the axial direction as viewed parallel to the rotational axis X1. In other words, in the illustrated embodiment, the sprocket body 632 includes the first layered member 642, the second layered member 644 and the third layered member 646 at the area except for the axially recessed portions 668. Thus, as shown in FIGS. 24 to 26, the sprocket body 632 only includes the second layered member 644 at the axially recessed portions 668.

As mentioned above, the rear sprocket assembly 612 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 666 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 666 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 666 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 642, the second layered member 644, the third layered member 646, and the coating layer 648. However, the multi-layered structure of the sprocket S is not limited to this. The sprocket S can only include the first layered member 642, the second layered member 644 and the third layered member 646 without the coating layer 648. Furthermore, the sprocket S can only include the first layered member 642, the second layered member 644 and the coating layer 648 without the third layered member 646. In this case, a third axial surface of the second layered member 644 is attached to the first axial surface of the first layered member 642. However, the second axial surface of the first layered member 642 and a fourth axial surface of the second layered member 644 that is opposite the third axial surface are exposed.

In the illustrated embodiment, the second layered member 644 has the axially projecting portions 666 and the axially recessed portions 668. However, alternatively, the third layered member 646 can have the axially projecting portions and the axially recessed portions. In this case, the axially projecting portions of the third layered member extend through the notches of the first and second layered members 642 and 644, respectively, and protrude beyond the second layered member 644.

EIGHTH EMBODIMENT

Figure 27:
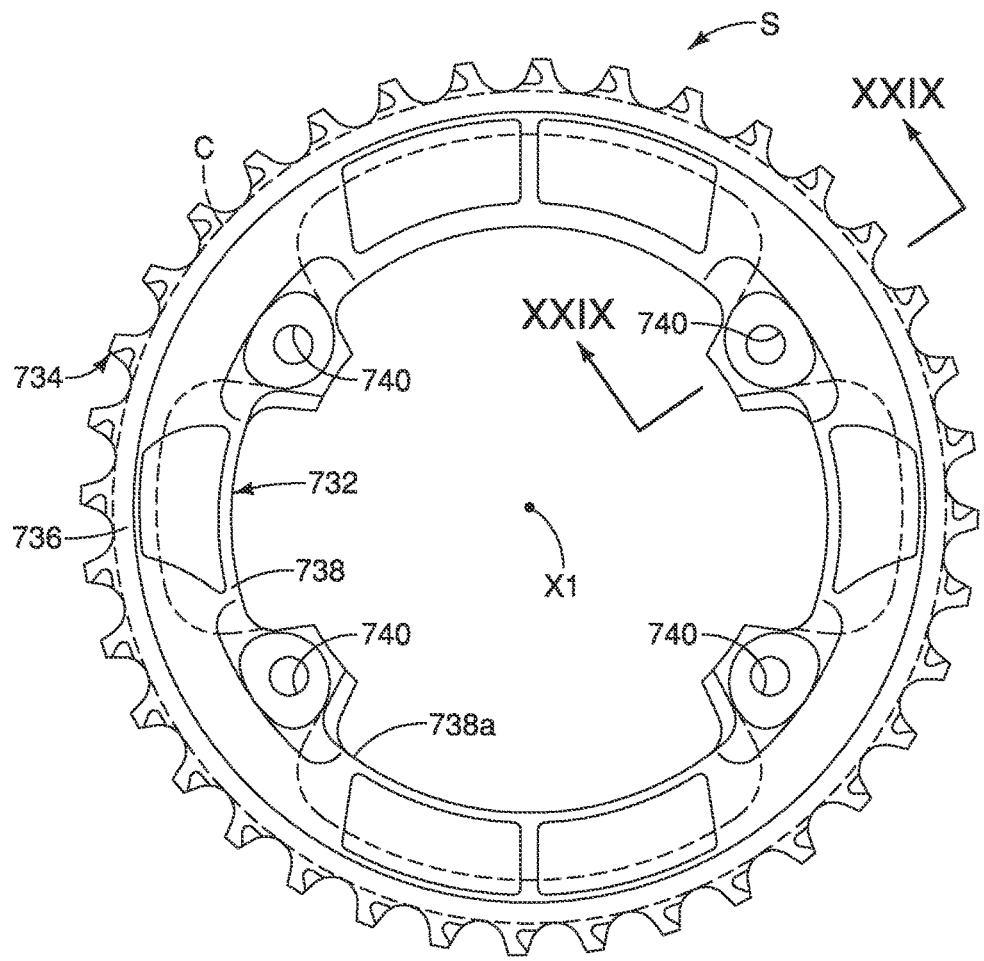
FIG. 27 is a side elevational view of a bicycle sprocket in accordance with an eighth embodiment.
Figure 28:
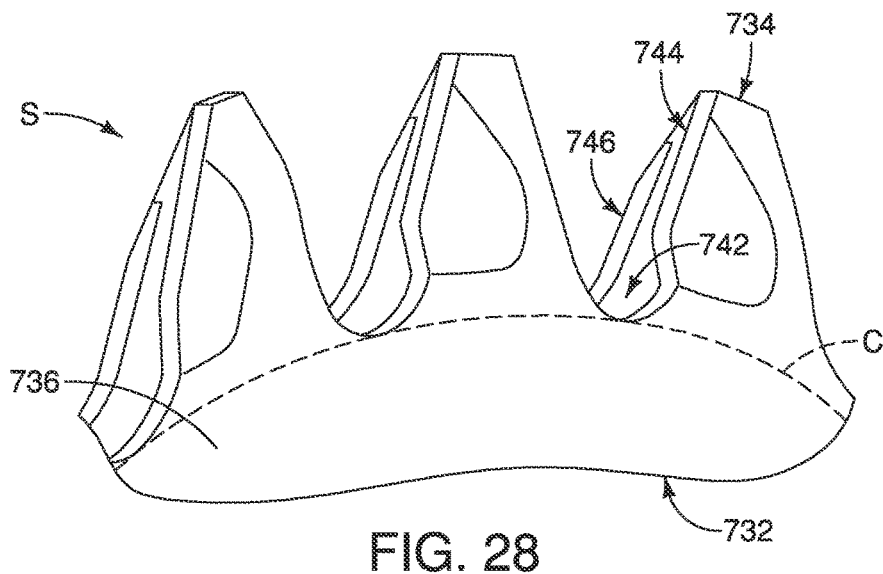
FIG. 28 is an enlarged, partial perspective view of the bicycle sprocket in illustrated in FIG. 27.

Referring now to FIGS. 27 to 31, a front sprocket S is illustrated in accordance with an eighth embodiment. As shown in FIG. 27, the sprocket S (e.g., a bicycle sprocket) basically includes a sprocket body 732, and a plurality of sprocket teeth 734. The sprocket body 732 has a rotational axis X1. The sprocket body 732 includes an outer periphery 736 and an inner periphery 738. Similar to the prior embodiments, the front sprocket S illustrated in FIGS. 27 to 31 has a multi-layered structure. The front sprocket S illustrated in FIGS. 27 to 31 can be part of a crank arm assembly:

The inner periphery 738 defines an opening 738a. In the eighth embodiment, the sprocket body 732 includes a plurality of fastener holes 740 for attaching the sprocket S to a crank arm. The sprocket teeth 734 extend radially outwardly from the outer periphery 736 of the sprocket body 732. In the eighth embodiment, the sprocket body 732 is defined as a part of the sprocket S that is radially inwardly disposed with respect to an imaginary circle C (i.e., the root circle) connecting innermost positions of gaps circumferentially disposed between the sprocket teeth 734.

In the eighth embodiment, as shown in FIG. 27, the total number of the sprocket teeth 734 is thirty-six. Of course, the total number of the sprocket teeth 734 can be larger or smaller than thirty-six as needed and/or desired. Moreover, any one of a rear sprocket of the rear sprocket assembly can also include the same configuration as the sprocket S illustrated in FIGS. 27 to 31.

In the eighth embodiment, as shown in FIGS. 28 to 31, the sprocket S includes a first layered member 742, a second layered member 744 and a third layered member 746. Preferably, a metallic reinforcement member 748 is provided around each of the fastener holes 740 as seen in FIG. 29. The metallic reinforcement members 748 are disposed between the second and third layered members 744 and 746. The first layered member 742 surrounds the metallic reinforcement members 748 for retaining the metallic reinforcement members 748 in place.

In the eighth embodiment, the first, second and third layered members 742, 744 and 746 extend radially outwardly from the inner periphery 738 of the sprocket body 732 to the sprocket teeth 734. Thus, in the eighth embodiment, all of the sprocket teeth 734 include the first layered member 742 and the second layered member 744. In the eighth embodiment, all of the sprocket teeth 734 further include the third layered member 746. Alternatively or optionally, at least one (e.g., not all) of the sprocket teeth 734 can include the first layered member 742 and the second layered member 744. Likewise, the at least one of the sprocket teeth 734 can also include the third layered member 746. On the other hand, in the eighth embodiment, the sprocket body 732 includes the first layered member 742 and the second layered member 744. Furthermore, the sprocket body 732 includes the third layered member 746. Specifically, in the illustrated embodiment, the first, second and third layered members 742, 744 and 746 radially extend between the inner periphery 738 of the sprocket body 732 and the outer periphery 736 of the sprocket body 732 other than various holes and recesses.

As shown in FIG. 29, the first layered member 742 has a first axial surface 752 and a second axial surface 754 opposite to the first axial surface 752 with respect to the rotational axis X1. The second layered member 744 is attached to the first axial surface 752 of the first layered member 742. The third layered member 746 is attached to the second axial surface 754 of the first layered member 742. In the eighth embodiment, the first, second and third layered members 742, 744 and 746 overlap each other in an axial direction as viewed parallel to the rotational axis X1, while the second and third layered members 744 and 746 do not overlap each other in a radial direction as viewed perpendicularly to the rotational axis X1. In the eighth embodiment, the first layered member 742 is partially exposed with respect to the second and third layered members 744 and 746 in the axial direction. Notwithstanding, the first layered member 742 can be completely covered by the second and third layered members 744 and 746 in the axial direction.

The first layered member 742 has an axial thickness of preferably more than or equal to 0.1 mm. The first layered member 742 has a specific gravity that is less than that of the second and third layered members 744 and 746. The first layered member 42 is made of non-metallic material. Specifically, the non-metallic material of the first layered member 742 can includes resin. For example, the first layered member 742 can be made of a hard plastic resin. Alternatively, the non-metallic material of the first layered member 742 can be a fiber-reinforced resin. For example, the first layered member 742 can be made of a carbon fiber-reinforced plastic or polymer (FRP).

Each of the second and third layered members 744 and 746 has an axial thickness of preferably more than or equal to 0.1 mm. The second and third layered members 744 and 746 are made of metallic material such as a stainless steel alloy, a titanium alloy or an aluminum alloy. Of course, the second and third layered members 744 and 746 can be made of other metallic material such as iron. Preferably, in the eighth embodiment, the second and third layered members 744 and 746 are made of the same material. However, of course, the second and third layered members 744 and 746 can be made of different materials as needed and/or desired.

The second and third layered members 744 and 746 are fixedly attached to the first layered member 742 in a suitable fixing manner. Preferably, at least one of the second and third layered members 744 and 746 is attached to the first layered member 742 by an integral molding process. In other words, the third layered member 746 and/or the second layered member 744 is attached to the first layered member 742 by an integral molding process. More preferably, in the illustrated embodiment, the first layered member 742 is attached to the second and third layered members 744 and 746 by an integral molding process without using an adhesive so that a process for applying an adhesive can be omitted. In particular, as seen in FIG. 30, the second layered member 744 has an axial surface 756 with a plurality of dimples 756a to aid in the binding between the first and second layered members 742 and 744. Likewise, as seen in FIG. 31, the third layered member 746 has an axial surface 758 with a plurality of dimples 758a to aid in the binding between the first and third layered members 742 and 746. The dimples 756a create a textured portion 760 on the axial surface 756 of the second layered member 744, while the dimples 758a create a textured portion 762 on the axial surface 758 of the third layered member 746. Thus, at least one of the second and third layered members 744 and 746 includes a textured portion that contacts a corresponding one of the first and second axial surfaces 752 and 754 of the first layered member 742. More preferably, as in the eighth embodiment, each of the second and third layered members 744 and 746 includes a textured portion that contacts the first and second axial surfaces 752 and 754 of the first layered member 742, respectively. Thus, the integral molding process can be performed such that the resin of the first layered member 742 can extend into the dimples 756a and 758a of the second and third layered members 744 and 746 during formation of the first layered member 742. In the eighth embodiment, with this integral molding process, the first layered member 742, which is made of resin, is molded while simultaneously attaching the first layered member 742 to the second and third layered members 744 and 746, which include the dimples 756a and 758a for receiving the resin. Such dimples 756a and 758a can be formed by a mechanical process, e.g. such as a shot blasting, a chemical process such as etching and/or an optical process, e.g. such as a laser processing.

NINTH EMBODIMENT

Figure 32:
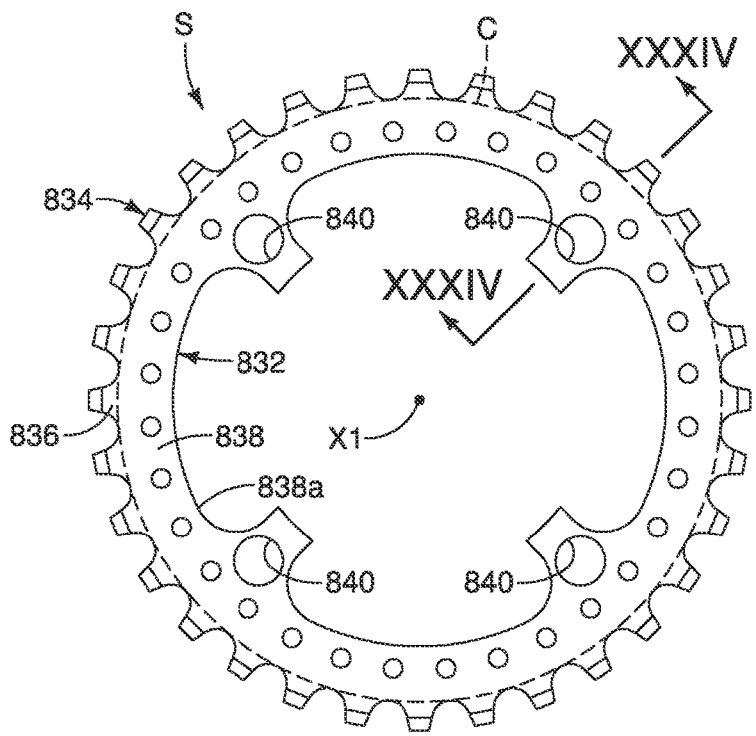
FIG. 32 is a side elevational view of a bicycle sprocket in accordance with a ninth embodiment.
Figure 34:
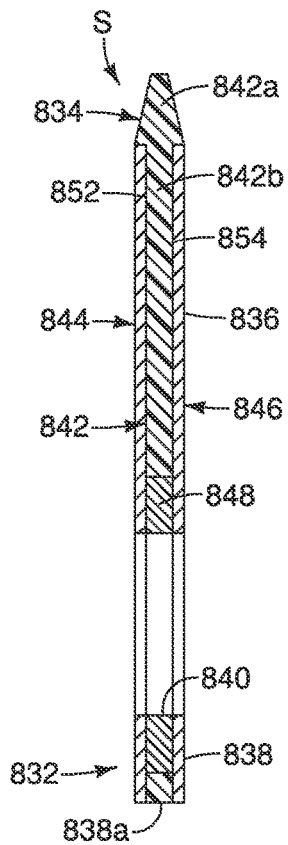
FIG. 34 is a partial cross sectional profile view of a portion of the bicycle sprocket illustrated in FIG. 32 as seen along section line XXXIV-XXXIV of FIG. 32.
Figure 33:
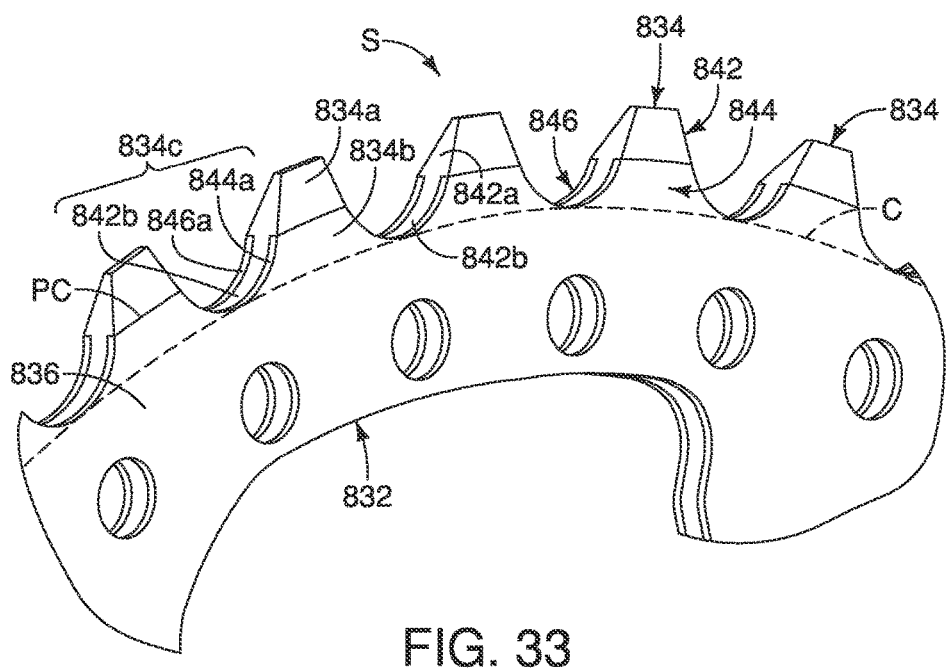
FIG. 33 is an enlarged, partial perspective view of the bicycle sprocket in illustrated in FIG. 32.

Referring now to FIGS. 32 to 34, a front sprocket S is illustrated in accordance with a ninth embodiment. As shown in FIG. 32, the sprocket S (e.g., a bicycle sprocket) basically includes a sprocket body 832, and a plurality of sprocket teeth 834. The sprocket body 832 has a rotational axis X1. The sprocket body 832 includes an outer periphery 836 and an inner periphery 838. Similar to the prior embodiments, the front sprocket S illustrated in FIGS. 32 to 34 has a multi-layered structure. The front sprocket S illustrated in FIGS. 32 to 34 can be part of a crank arm assembly.

The inner periphery 838 defines an opening 838a. In the ninth embodiment, the sprocket body 832 includes a plurality of fastener holes 840 for attaching the sprocket S to a crank arm. The sprocket teeth 834 extend radially outwardly from the outer periphery 836 of the sprocket body 832. In the ninth embodiment, the sprocket body 832 is defined as a part of the sprocket S that is radially inwardly disposed with respect to an imaginary circle C (i.e., the root circle) connecting innermost positions of gaps circumferentially disposed between the sprocket teeth 834.

In ninth embodiment, as shown in FIG. 32, the total number of the sprocket teeth 834 is thirty-two. Of course, the total number of the sprocket teeth 834 can be larger or smaller than thirty-two as needed and/or desired. Moreover, any one of a rear sprocket of the rear sprocket assembly can also include the same configuration as die sprocket S illustrated in FIGS. 32 to 34.

In the ninth embodiment, as shown in FIG. 33, the sprocket S includes a first layered member 842, a second layered member 844 and a third layered member 846. Preferably, a metallic reinforcement member 848 is provided around each of the fastener holes 840 as seen in FIG. 34. The metallic reinforcement members 848 are disposed between the second and third layered members 844 and 846. The first layered member 842 surrounds the metallic reinforcement members 848 for retaining the metallic reinforcement members 848 in place.

In the ninth embodiment, the first, second and third layered members 842, 844 and 846 extend radially outwardly from the inner periphery 838 of the sprocket body 832 to the sprocket teeth 834. Thus, in the ninth embodiment, all of the sprocket teeth 834 include the first layered member 842 and the second layered member 844. In the ninth embodiment, all of the sprocket teeth 834 further include the third layered member 846. Alternatively or optionally, at least one (e.g., not all) of the sprocket teeth 834 can include the first layered member 842 and the second layered member 844. Likewise, the at least one of the sprocket teeth 834 can also include the third layered member 846. On the other hand, in the ninth embodiment, the sprocket body 832 includes the first layered member 842 and the second layered member 844. Furthermore, the sprocket body 832 includes the third layered member 846. Specifically, in the illustrated embodiment, the first, second and third layered members 842, 844 and 846 radially extend between the inner periphery 838 of the sprocket body 832 and the outer periphery 836 of the sprocket body 832 other than various holes and recesses.

As shown in FIG. 34, the first layered member 842 has a first axial surface 852 and a second axial surface 854 opposite to the first axial surface 852 with respect to the rotational axis X1. The second layered member 844 is attached to the first axial surface 852 of the first layered member 842. The third layered member 846 is attached to the second axial surface 854 of the first layered member 842. In the ninth embodiment, the first, second and third layered members 842, 844 and 846 overlap each other in an axial direction as viewed parallel to the rotational axis X1, while the second and third layered members 844 and 846 do not overlap each other in a radial direction as viewed perpendicularly to the rotational axis X1. In the ninth embodiment, the first layered member 842 is partially exposed with respect to the second and third layered members 844 and 846 in the axial direction.

The first layered member 842 has a plurality of outer portions 842a and an inner portion 842b. The outer portions 842a project radially outward from the second and third layered members 844 and 846 at each of the sprocket teeth 834. The inner portion 842b is sandwiched between the second and third layered members 844 and 846. The outer portions 842a taper to a tip from the inner portion 842b. The inner portion 842b has an axial thickness of preferably more than or equal to 0.2 mm. The first layered member 842 has a specific gravity that is less than that of the second and third layered members 844 and 846. In the ninth embodiment, the inner portion 842b is generally a planar member. The first layered member 42 is made of non-metallic material. Specifically, the non-metallic material of the first layered member 842 can include resin. For example, the first layered member 842 can be made of a hard plastic resin. Alternatively, the non-metallic material of the first layered member 842 can be a fiber-reinforced resin. For example, the first layered member 842 can be made of a carbon fiber-reinforced plastic or polymer (FRP).

Each of the second and third layered members 844 and 846 has an axial thickness of preferably more than or equal to 0.1 mm. The second and third layered members 844 and 846 are made of metallic material such as a stainless steel alloy, a titanium alloy or an aluminum alloy. Of course, the second and third layered members 844 and 846 can be made of other metallic material such as iron. Preferably, in the ninth embodiment, the second and third layered members 844 and 846 are made of the same material. However, of course, the second and third layered members 844 and 846 can be made of different materials as needed and/or desired.

The second and third layered members 844 and 846 are fixedly attached to the first layered member 842 in a suitable fixing manner. Specifically, in the illustrated embodiment, the first layered member 842 is attached to the second and third layered members 844 and 846 by an integral molding process without using an adhesive so that a process for applying an adhesive can be omitted. Preferably, the second and third layered members 844 and 846 are provided with textured portions (e.g., a plurality of dimples) to aid in the binding the second and third layered members 844 and 846 to the first layered member 842 in the same manner as seen in FIGS. 30 and 31 of the eighth embodiment. Alternatively, the second and third layered members 844 and 846 can be made without textured portions.

Here, in the ninth embodiment, each of the sprocket teeth 834 has a tip portion 834a and a base portion 834b. Preferably, the tip portion 834a and the base portion 834b meet at a pitch circle line PC of the sprocket S in the ninth embodiment. In other words, in the illustrated ninth embodiment, the tip portions 834a correspond to the addendums of the sprocket teeth 834 and the base portion 834b correspond to the dedendums of the sprocket teeth 834. The tip portions 834a are solely formed by the first layered member 842, while the base portion 834b are formed by the first, second and third layered members 842, 844 and 846. In the way, during chain engagement, less noise will occur when a chain first contacts the resin material of the tip portions 834a of the sprocket teeth 834 while keeping necessary rigidity of a tooth to resist pedaling force by the base portion 834b.

While all of the sprocket teeth 834 are illustrated with this tooth construction shown in FIGS. 33 and 34, only at least one (e.g., not all) of the sprocket teeth 834 can be provided with the tooth construction shown in FIGS. 33 and 34. Thus, in illustrated ninth embodiment, the at least one of the sprocket teeth 834 includes a tip portion having the first and second axial surfaces 852 and 854 exposed in the axial direction, and a base portion having the first and second axial surfaces 852 and 854 covered by the second and third layered members 844 and 846 in the axial direction. Also the second and third layered members 844 and 846 form an edge portion of a tooth flank 834c of the at least one of the sprocket teeth 834. In other words, the second and third layered members 844 and 846 have outer peripheral edges 844a and 846a, respectively, which define the tooth flank 834c. In the way, the metal material of the second and third layered members 844 and 846 will contact a chain roller during use. At the tip portions 834a of each of the sprocket teeth 834, the outer peripheral edges 844a and 846a are covered by an outer part 842a of the first layered member 842. Thus, the outer part 842a of the first layered member 842 is has a larger width than an inner portion 842b of the first layered member 842.

Preferably, at least one of the second and third layered members 844 and 846 includes a textured portion that contacts a corresponding one of the first and second axial surfaces 852 and 854 of the first layered member 842 in the same manner as seen in FIGS. 30 and 31 of the eighth embodiment. The second and third layered members 844 and 846 are fixedly attached to the first layered member 842 in a suitable fixing manner. Preferably, at least one of the second and third layered members 844 and 846 is attached to the first layered member 842 by an integral molding process. In other words, the third layered member 846 and/or the second layered member 844 is attached to the first layered member 842 by an integral molding process. More preferably, in the illustrated embodiment, the first layered member 842 is attached to the second and third layered members 844 and 846 by an integral molding process without using an adhesive so that a process for applying an adhesive can be omitted. Alternatively, the second and third layered members 844 and 846 can be made without textured portions.

TENTH EMBODIMENT

Figure 35:
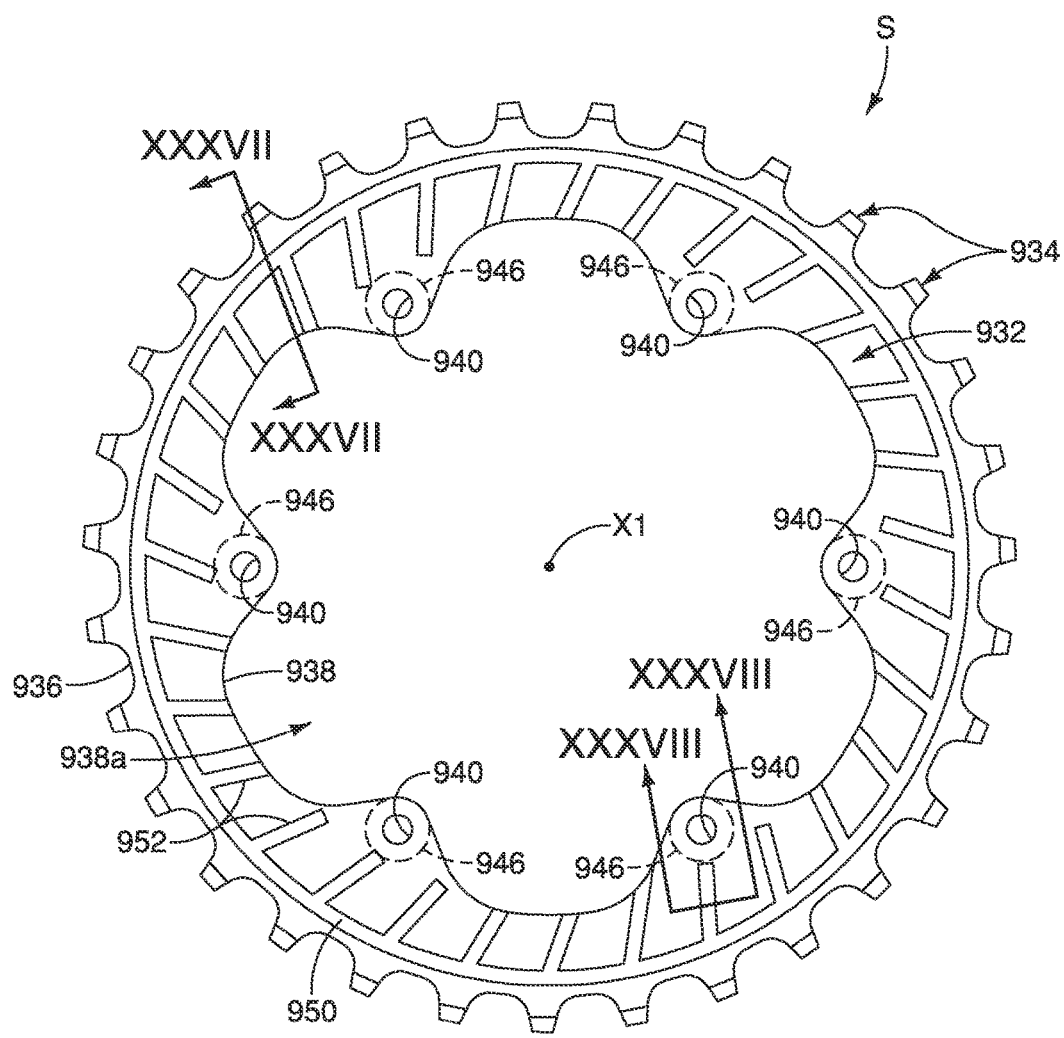
FIG. 35 is a side elevational view of a bicycle sprocket in accordance with a tenth embodiment.

Referring now to FIGS. 35 to 38, a front bicycle sprocket S is illustrated in accordance with a tenth embodiment. As shown in FIG. 35, the bicycle sprocket S comprises a sprocket body 932 and a plurality of sprocket teeth 934. The sprocket body 932 has a rotational axis X1. The sprocket body 932 includes an outer periphery 936 and an inner periphery 938. The sprocket teeth 934 extend radially outwardly from the outer periphery 936 of the sprocket body 932. The inner periphery 938 defines an opening 938a. The sprocket body 932 includes a plurality of fastener holes 940 for attaching the sprocket S to a crank arm. In the tenth embodiment, as shown in FIG. 35, the total number of the sprocket teeth 934 is thirty-one. Of course, the total number of the sprocket teeth 934 can be larger or smaller than thirty-one as needed and/or desired. Moreover, any one of a rear sprocket of the rear sprocket assembly can also include the same configuration as the sprocket S illustrated in FIGS. 35 to 38.

Similar to the prior embodiments, the bicycle sprocket S illustrated in FIGS. 35 to 38 has a multi-layered structure. Specifically, the sprocket body 932 includes a first layered member 941, a second layered member 942 and a third layered member 943. Here, in this tenth embodiment, the first layered member 941 is made of a first non-metallic material. Specifically, the non-metallic material of the first layered member 941 can include resin. For example, the non-metallic material of the first layered member 941 can be made of a hard plastic resin such as a thermoplastic resin (e.g., polyamide-based synthetic resin), or a fiber-reinforced resin such as a carbon fiber-reinforced plastic or polymer (FRP). The second layered member 942 is made of a second metallic material such as a stainless steel alloy, a titanium alloy or an aluminum alloy. The third layered member 943 is made of a third metallic material such as a stainless steel alloy, a titanium alloy or an aluminum alloy. Of course, the second and third layered members 942 and 943 can be made of other metallic material such as iron. Thus, preferably the first layered member 941 has a specific gravity that is less than those of the second layered member 942 and the third layered member 943. Preferably, in the tenth embodiment, the second and third layered members 942 and 943 are made of the same material. However, of course, the second and third layered members 942 and 943 can be made of different materials as needed and/or desired. Each of the second and third layered members 942 and 943 has an axial thickness of preferably more than or equal to 0.1 mm.

The second and third layered members 942 and 943 are fixedly attached to the first layered member 941 in a suitable fixing manner. Specifically, in the tenth embodiment, the first layered member 941 is attached to the second and third layered members 942 and 943 by an integral molding process without using an adhesive so that a process for applying an adhesive can be omitted. Preferably, the second and third layered members 942 and 943 are provided with textured portions (e.g., a plurality of dimples) to aid in the binding the second and third layered members 942 and 943 to the first layered member 941 in the same manner as seen in FIGS. 30 and 31 of the eighth embodiment. Alternatively, the second and third layered members 942 and 943 can be made without textured portions. Alternatively, only at least one of the second and third layered members 942 and 943 is attached to the first layered member 941 by an integral molding process. More preferably, both of the second and third layered members 942 and 943 are attached to the first layered member 941 by an integral molding process.

Preferably, a metallic reinforcement member 946 is provided around each of the fastener holes 940 as seen in FIG. 35. The metallic reinforcement members 946 are disposed between the second and third layered members 942 and 943. The first layered member 941 substantially surrounds the metallic reinforcement members 946 for retaining the metallic reinforcement members 946 in place.

In the tenth embodiment, the first, second and third layered members 941, 942 and 943 extend radially outwardly from the inner periphery 938 of the sprocket body 932 to the tips of the sprocket teeth 934 other than at the fastener holes 940. Thus, in the tenth embodiment, all of the sprocket teeth 934 include the first, second and third layered members 941, 942 and 942. Alternatively or optionally, only at least one (e.g., not all) of the sprocket teeth 934 includes the first layered member 941, the second layered member 942 and the third layered member 943. Also alternatively or optionally, none of the sprocket teeth 934 includes all of the first, second and third layered members 941, 942 and 943. In other words, while all of the sprocket teeth 934 are illustrated as all having the same tooth construction as shown in FIGS. 35 to 38, none or only at least one (e.g., not all) of the sprocket teeth 934 can be provided with the tooth construction shown in FIGS. 35 to 38.

Figure 37:
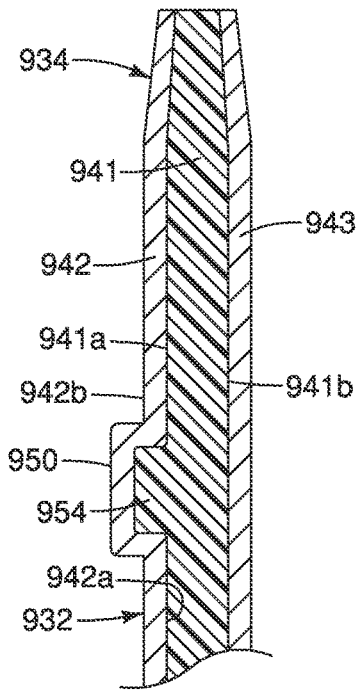
FIG. 37 is a partial cross sectional profile view of a portion of the bicycle sprocket illustrated in FIGS. 35 and 36 as seen along section line XXXVII-XXXVII of FIG. 35.
Figure 38:
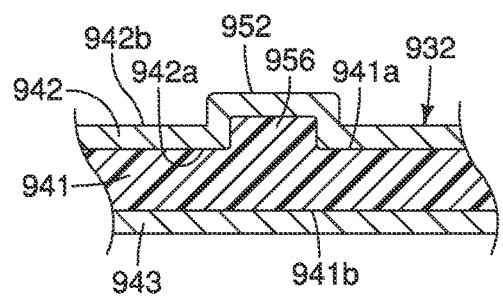
FIG. 38 is a partial cross sectional profile view of a portion of the bicycle sprocket illustrated in FIGS. 35 to 37 as seen along section line XXXVIII-XXXVIII of FIG. 35.

As shown in FIGS. 37 and 38, the first layered member 941 has a first axial surface 941a and a second axial surface 941b. The second axial surface 941b faces in an opposite axial direction from the first axial surface 941a with respect to the rotational axis X1. The second axial surface 941b is opposite to the first axial surface 941a. The second layered member 942 is attached to the first axial surface 941a such that the first and second layered members 941 and 942 overlap each other in an axial direction as viewed parallel to the rotational axis X1. The third layered member 943 is attached to the second axial surface 941b such that the first and third layered members 941 and 943 overlap each other in the axial direction as viewed parallel to the rotational axis X1.

In the tenth embodiment, the second layered member 942 includes a first (annular) concavo-convex portion 950 and a plurality of second (non-annular) concavo-convex portions 952. The concavo-convex portions 950 and 952 are provided only along the sprocket body 932 so as to not interfere with a chain engaging the sprocket teeth 934. In other words, the concavo-convex portions 950 and 952 are positioned radially inwardly from each of the sprocket teeth 934. The first concavo-convex portion 950 extends in a circumferential direction with respect to the rotational axis X1 of the sprocket body 932. The first concavo-convex portion 950 defines an annular recess on an interior axial surface 942a of the second layered member 942 and an annular projection on an exterior axial surface 942b of the second layered member 942. Preferably, the first concavo-convex portion 950 is circular with a center coinciding with the rotational axis X1 of the sprocket body 932. Each of the second concavo-convex portions 952 forms a straight elongated recess on the interior axial surface 942a of the second layered member 942 and a straight elongated projection on the exterior axial surface 942b of the second layered member 942. The number of the second concavo-convex portions 952 is preferably equal to a total number of the sprocket teeth 934. The second concavo-convex portions 952 interconnect with the first concavo-convex portion 950. In the tenth embodiment, each of the second concavo-convex portions 952 extends generally in a radial direction with respect to the rotational axis X1 of the sprocket body 932. The phrase "extends generally in a radial direction" as used herein refers to an inclination in a range of zero degrees to thirty-five degrees with respect to a radial line from the rotational axis X1. In the tenth embodiment, each of the second concavo-convex portions 952 is inclined with respect to the radial direction with respect to the rotational axis X1 of the sprocket body 932.

In the tenth embodiment, the first layered member 941 includes a first (annular) convex portion 954 projecting from the first axial surface 941a and a plurality of second (non-annular) convex portions 956 projecting from the first axial surface 941a. The first convex portion 954 extends into and completely fills the annular recess in the interior axial surface 942a as formed by the first concavo-convex portion 950. The second convex portions 956 extend into and completely fill the non-annular recesses in the interior axial surface 942a as formed by the second concavo-convex portions 952. In other words, the convex portions 954 and 956 mate with the concavo-convex portions 950 and 952, respectively. Preferably, no gap exists at the interfaces between the convex portions 954 and 956 and the concavo-convex portions 950 and 952.

Figure 36:
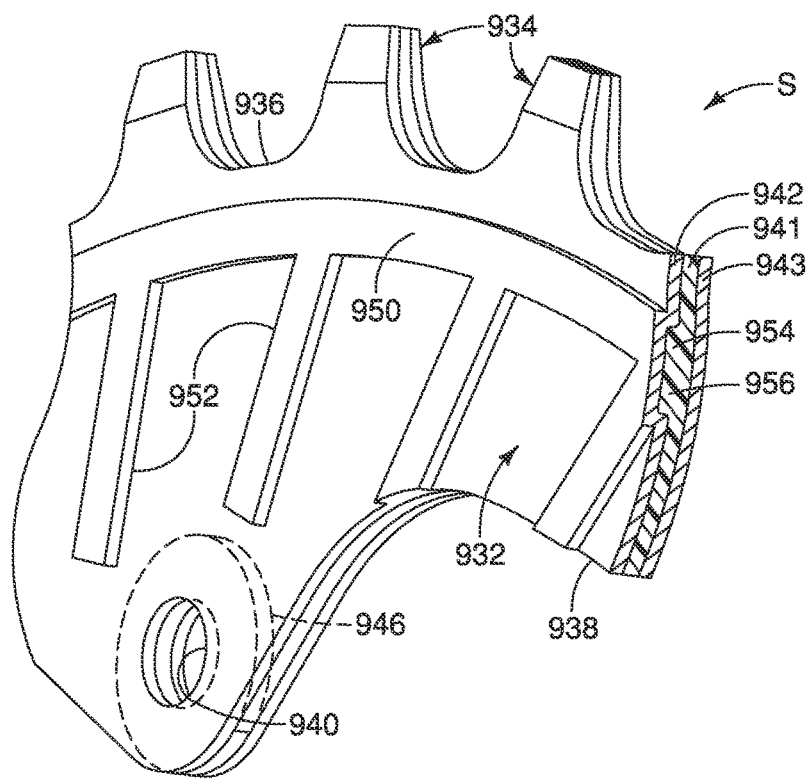
FIG. 36 is a partial perspective view of the bicycle sprocket illustrated in FIG. 35 showing the layers of the sprocket body.

While the concavo-convex portions 950 and 952 are only formed on the second layered member 942, it wilt be apparent from this disclosure that at least one of the second and third layered members 942 and 943 has at least one concavo-convex portion, and more preferably, at least one of the second and third layered members 942 and 943 has a plurality of concavo-convex portions such as shown in FIGS. 35 and 36. In other words, one or more concavo-convex portions can be formed on either or both of the second and third layered members 942 and 943. Moreover, while the concavo-convex portions 950 and 952 are shown in a particular configuration, it will be apparent from this disclosure that alternative configurations can be used so long as they do not depart from the this disclosure. For example, the sprocket body 932 can be provided with only at least one concavo-convex portion that extends in a circumferential direction with respect to the rotational axis X1 of the sprocket body 932, or only at least one concavo-convex portion that extends generally in a radial direction with respect to the rotational axis X1 of the sprocket body 932. However, preferably, the sprocket body 932 includes a plurality of concavo-convex portions that includes a first concavo-convex portion extending in a circumferential direction with respect to the rotational axis of the sprocket body 932 and a second concavo-convex portion extending generally in a radial direction with respect to the rotational axis X1 of the sprocket body 932. Also, while the first layered member 941 has a plurality of convex portions that mate with a plurality of concavo-convex portions of the second layered member 942, it will be apparent from this disclosure that only at least one of the first and second axial surfaces 941a and 941b of the first layered member 941 has a convex portion that mates with the at least one concavo-convex portion of one or both of the second and third layered members 942 and 943. Preferably, no gap exists at an interface between the at least one concavo-convex portion and the convex portion, The at least one concavo-convex portion preferably inclines with respect to the radial direction with respect to the rotational axis X1 of the sprocket body 932, The at least one concavo-convex portion is preferably positioned radially inwardly from each of the sprocket teeth 934. Each of the at least one concavo-convex portion preferably includes a plurality of concavo-convex portions equaling to a total number of the sprocket teeth 934. By forming such a concavo-convex portion, it is possible to effectively enhance rigidity of a bicycle sprocket.

ELEVENTH EMBODIMENT

Referring now to FIGS. 39 to 41, a front bicycle sprocket S is illustrated in accordance with an eleventh embodiment. As shown in FIG. 39, the bicycle sprocket S includes a sprocket body 1032 and a plurality of sprocket teeth 1034. The sprocket body 1032 has a rotational axis X1. The sprocket body 1032 includes an outer periphery 1036 and an inner periphery 1038. The sprocket teeth 1034 extend radially outwardly from the outer periphery l036 of the sprocket body 1032. Tie inner periphery 1038 defines an opening 1038a. The sprocket body 1032 includes a plurality of fastener holes 1040 for attaching the sprocket S to a crank arm. In the eleventh embodiment, as shown in FIG. 39, the total number of the sprocket teeth 1034 is thirty-one. Of course, the total number of the sprocket teeth 1034 can be larger or smaller than thirty-one as needed and/or desired. Moreover, any one of a rear sprocket of the rear sprocket assembly can also include the same configuration as the sprocket S illustrated in FIGS. 39 to 41.

Similar to the prior embodiments, the bicycle sprocket S illustrated in FIGS. 39 to 41 has a multi-layered structure. Specifically, the sprocket body 1032 includes a first layered member 1041, a second layered member 1042 and a third layered member 1043. Here, in this eleventh embodiment, the first layered member 1041 is made of a first non-metallic material. Specifically, the non-metallic material of the first layered member 1041 can include resin. For example, the non-metallic material of the first layered member 1041 can be made of a hard plastic resin such as a thermoplastic resin (e.g., polyamide-based synthetic resin), or a fiber-reinforced resin such as a carbon fiber-reinforced plastic or polymer (FRP). The second layered member 1042 is made of a second metallic material such as a stainless steel alloy, a titanium alloy or an aluminum alloy. The third layered member 1043 is made of a third metallic material such as a stainless steel alloy, a titanium alloy or an aluminum alloy. Of course, the second and third layered members 1042 and 1043 can be made of other metallic material such as iron. Thus, preferably the first layered member 1041 has a specific gravity that is less than those of the second layered member 1042 and the third layered member 1043. Preferably, in the eleventh embodiment, the second and third layered members 1042 and 1043 are made of the same material. However, of course, the second and third layered members 1042 and 1043 can be made of different materials as needed and/or desired. Each of the second and third layered members 1042 and 1043 has an axial thickness of preferably more than or equal to 0.1 mm.

In the eleventh embodiment, at least one of the second and third layered members 1042 and 1043 is attached to the first layered member 1041 by adhesive 1044 (illustrated by "XXXX" in FIGS. 40 and 41), In particular, both the second and third layered members 1042 and 1043 are attached to the first layered member 1041 by the adhesive 1044. Preferably, the second and third layered members 1042 and 1043 are provided with textured portions (e.g., a plurality of dimples) to aid in the binding the second and third layered members 1042 and 1043 to the first layered member 1041 in the same manner as seen in FIGS. 30 and 31 of the eighth embodiment. Alternatively, the second and third layered members 1042 and 1043 can be made without textured portions.

Preferably, a metallic reinforcement member 1046 is provided around each of the fastener holes 1040 as seen in FIG. 39. The metallic reinforcement members 1046 are disposed between the second and third layered members 1042 and 1043. The first layered member 1041 substantially surrounds the metallic reinforcement members 1046 for retaining the metallic reinforcement members 1046 in place.

As shown in FIG. 41, the first layered member 1041 has a first axial surface 1041a and a second axial surface 1041b. The second axial surface 1041b faces in an. opposite axial direction from the first axial surface 1041a with respect to the rotational axis X1. The second layered member 1042 is attached to the first axial surface 1041a such that the first and second layered members 1041 and 1042 overlap each other in an axial direction as viewed parallel to the rotational axis X1. The third layered member 1043 is attached to the second axial surface 1041b such that the first and third layered members 1041 and 1043 overlap each other in the axial direction as viewed parallel to the rotational axis X1.

In the eleventh embodiment, the second layered member 1042 includes a first (annular) concavo-convex portion 1050 and a plurality of second (non-annular) concavo-convex portions 1052. The first concavo-convex portion 1050 defines an annular recess on an interior axial surface 1042a of the second layered member 1042 and an annular projection on an exterior axial surface 1042b of the second layered member 1042. Preferably, the first concavo-convex portion 1050 is circular with a center coinciding with the rotational axis X1 of the sprocket body 1032. Each of the second concavo-convex portions 1052 forms a straight elongated recess on the interior axial surface 1042a of the second layered member 1042 and a straight elongated projection on the exterior axial surface 1042b of the second layered member 1042. The patterns and configurations of the concavo-convex portions 1050 and 1052 are the same as the tenth embodiment, and thus, they will not be discussed further herein. However, unlike the tenth embodiment, the first layered member 1041 does not completely fill the recesses formed by the concavo-convex portions 1050 and 1052. As a result, the first layered member 1041 can be a preformed member that the second and third layered members 1042 and 1043 are attached to the first layered member 1041 by the adhesive 1044.

TWELFTH EMBODIMENT

Figure 42:
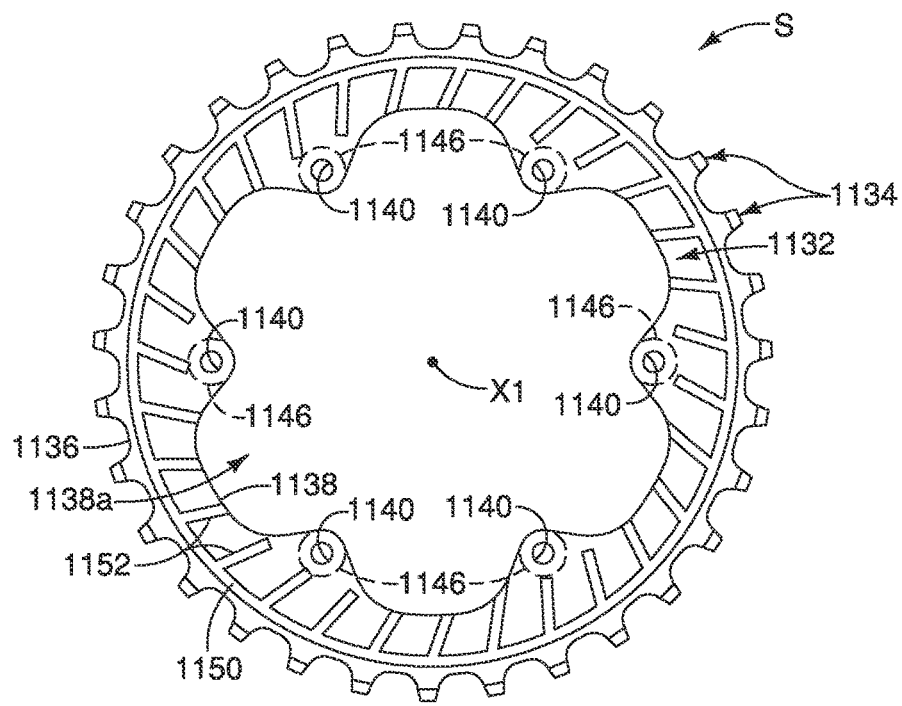
FIG. 42 is a first side elevational view of a bicycle sprocket in accordance with a twelfth embodiment.
Figure 43:
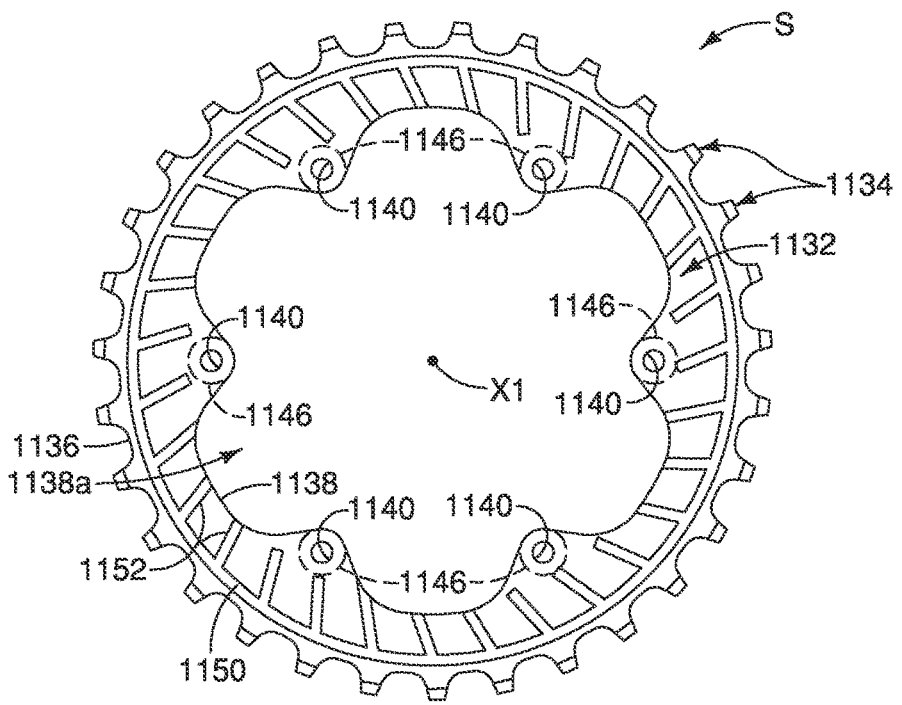
FIG. 43 is a second side elevational view of the bicycle sprocket illustrated in FIG. 42.

Referring now to FIGS. 42 to 46, a front bicycle sprocket S is illustrated in accordance with a twelfth embodiment. As shown in FIGS. 42 and 43, the bicycle sprocket S includes a sprocket body 1132 and a plurality of sprocket teeth 1134. The sprocket body 1132 has a rotational axis X1. The sprocket body 1132 includes an outer periphery 1136 and an inner periphery 1138. The sprocket teeth 1134 extend radially outwardly from the outer periphery 1136 of the sprocket body 1132. The inner periphery 1138 defines an opening 1138a. The sprocket body 1132 includes a plurality of fastener holes 1140 for attaching the sprocket S to a crank arm. In the twelfth embodiment, as shown in FIGS. 42 and 43, the total number of the sprocket teeth 1134 is thirty-one. Of course, the total number of the sprocket teeth 1134 can be larger or smaller than thirty-one as needed and/or desired. Moreover, any one of a rear sprocket of the rear sprocket assembly can also include the same configuration as the sprocket S illustrated in FIGS. 12 to 46.

Similar to the prior embodiments, the bicycle sprocket S illustrated in FIGS. 42 to 46 has a multi-layered structure. Specifically, the sprocket body 1132 includes a first layered member 1141, a second layered member 1142 and a third layered member 1143. Here, in this twelfth embodiment, the first layered member 1141 is made of a first non-metallic material. Specifically, the non-metallic material of the first layered member 1141 can include resin. For example, the non-metallic material of the first layered member 1141 can be made of a hard plastic resin such as a thermoplastic resin (e.g., polyamide-based synthetic resin), or a fiber-reinforced resin such as a carbon fiber-reinforced plastic or polymer (FRP). The second layered member 1142 is made of a second metallic material such as a stainless steel alloy, a titanium alloy or an aluminum alloy. The third layered member 1143 is made of a third metallic material such as a stainless steel alloy, a titanium alloy or an aluminum alloy. Of course, the second and third layered members 1142 and 1143 can be made of other metallic material such as iron. Thus, preferably the first layered member 1141 has a specific gravity that is less than those of the second layered member 1142 and the third layered member 1143. Preferably, in the twelfth embodiment, the second and third layered members 1142 and 1143 are made of the same material. However, of course, the second and third layered members 1142 and 1143 can be made of different materials as needed and/or desired. Each of the second and third layered members 1142 and 1143 has an axial thickness of preferably more than or equal to 0.1 mm.

In the twelfth embodiment, the first layered member 1141 is attached to the second and third layered members 1142 and 1143 by an integral molding process without using an adhesive so that a process for applying an adhesive can be omitted. Preferably, the second and third layered members 1142 and 1143 are provided with textured portions (e.g., a plurality of dimples) to aid in the binding the second and third layered members 1142 and 1143 to the first layered member 1141 in the same manner as seen in FIGS. 30 and 31 of the eighth embodiment. Alternatively, the second and third layered members 1142 and 1143 can be made without textured portions. Alternatively, only at least one of the second and third layered members 1142 and 1143 is attached to the first layered member 1141 by an integral molding process. More preferably, both of the second and third layered members 1142 and 1143 are attached to the first layered member 1141 by an integral molding process.

Preferably, a metallic reinforcement member 1146 is provided around each of the fastener holes 1140 as seen in FIGS. 42 and 43. The metallic reinforcement members 1146 are disposed between the second and third layered members 1142 and 1143. The first layered member 1141 substantially surrounds the metallic reinforcement members 1146 for retaining the metallic reinforcement members 1146 in place.

As shown in FIGS. 45 and 46, the first layered member 1141 has a first axial surface 1141a and a second axial surface 1141b. The second axial surface 1141b faces in an opposite axial direction from the first axial surface 1141a with respect to the rotational axis X1. The second layered member 1142 is attached to the first axial surface 1141a such that the first and second layered members 1141 and 1142 overlap each other in an axial direction as viewed parallel to the rotational axis X1. The third layered member 1143 is attached to the second axial surface 1141b such that the first and third layered members 1141 and 1143 overlap each other in the axial direction as viewed parallel to the rotational axis X1.

In the twelfth embodiment, each of the second and third layered members 1142 and 1143 includes a first (annular) concavo-convex portion 1150 and a plurality of second (non-annular) concavo-convex portions 1152. The first concavo-convex portions 1150 extends in a circumferential direction with respect to the rotational axis X1 of the sprocket body 1132. The first concavo-convex portions 1150 defines annular recesses on interior surfaces 1142a and 1143a of the second and third layered members 1142 and 1143 and annular projections on exterior surfaces 1142b and 1143b of the second and third layered members 1142 and 1143. Preferably, the first concavo-convex portions 1150 are circular with centers coinciding with the rotational axis X1 of the sprocket body 1132.

In the twelfth embodiment, the first layered member 1141 includes a first (annular) convex portion 1154 projecting from each of the first and second axial surfaces 1141a and 1141b. Also, the first layered member 1141 includes a plurality of second (non-annular) convex portions 1156 projecting from each of the first and second axial surfaces 1141a and 1141b. The first convex portions 1154 extend into and completely fill the annular recesses in the interior surfaces 1142a and 1143a as formed by the first concavo-convex portions 1150. The second convex portions 1156 extend into and completely fill the non-annular recesses in the interior surfaces 1142a and 1143a as formed by the second concavo-convex portions 1152. In other words, the convex portions 1154 and 1156 mate with the concavo-convex portions 1150 and 1152, respectively. Preferably, no gap exists at the interfaces between the convex portions 1154 and 1156 and the concavo-convex portions 1150 and 1152.

Preferably, the interior surfaces 1142a and 1143a of the second and third layered members 1142 and 1143 are provided with textured portions (e.g., a plurality of dimples) to aid in the binding the second and third layered members 1142 and 1143 to the first layered member 1141 in the same manner as seen in FIGS. 30 and 31 of the eighth embodiment. Alternatively, the second and third layered members 1142 and 1143 can be made without textured portions.

Preferably, a metallic reinforcement member 1146 is provided around each of the fastener holes 1140 as seen in FIG. 44. The metallic reinforcement members 1146 are disposed between the second and third layered members 1142 and 1143. The first layered member 1141 substantially surrounds the metallic reinforcement members 1146 for retaining the metallic reinforcement members 1146 in place.

THIRTEENTH EMBODIMENT

Figure 47:
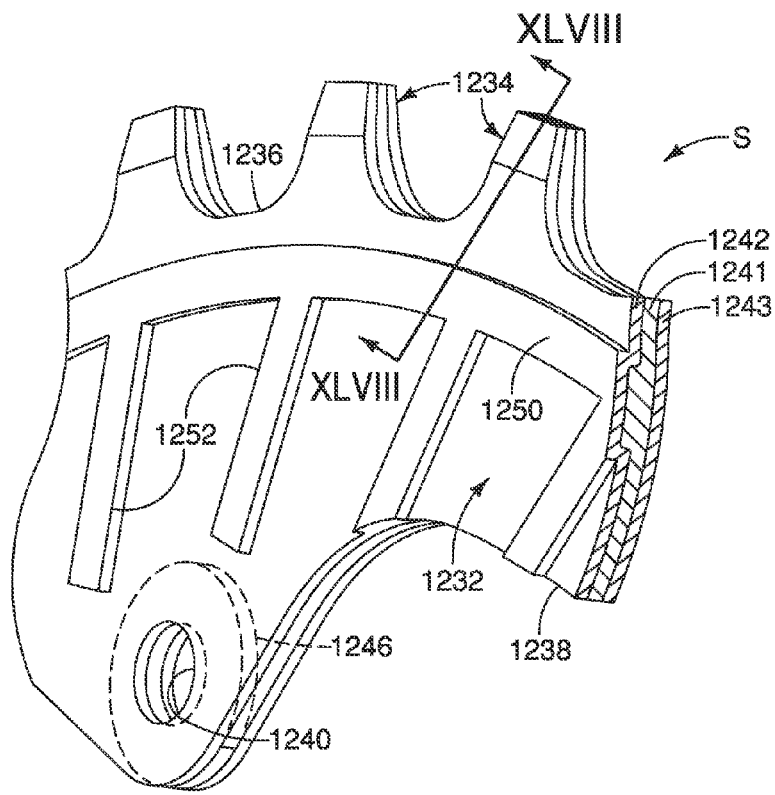
FIG. 47 is a partial perspective view of a portion of a bicycle sprocket in accordance with a thirteenth embodiment having the same overall configuration as the bicycle sprocket illustrated in FIG. 35, but the first layered member is made of metallic material instead of a non-metallic material.
Figure 48:
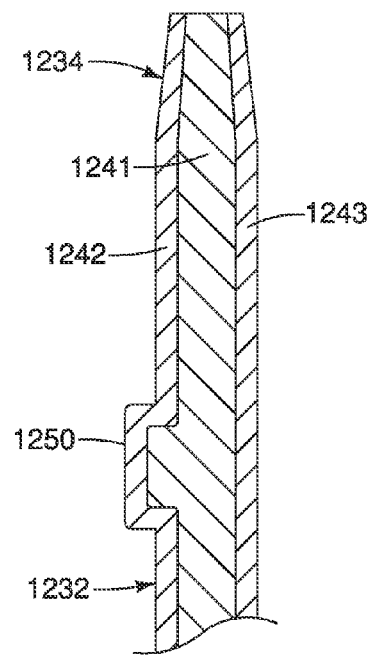
FIG. 48 is a partial cross sectional profile view of a portion of the bicycle sprocket illustrated in FIG. 47 as seen along section line XLVIII-XLVIII of FIG. 47.

Referring now to FIGS. 47 and 48, a front bicycle sprocket S is illustrated in accordance with a thirteenth embodiment. As shown in FIGS. 47 and 48, the bicycle sprocket S includes a sprocket body 1232 and sprocket teeth 1234 (only three shown). Similar to the prior embodiments, the bicycle sprocket S illustrated in FIGS. 47 and 48 has a multi-layered structure. Specifically, the sprocket body 1232 includes a first layered member 1241, a second layered member 1242 and a third layered member 1243. The first layered member 1241 is made of a first metallic material such as a stainless steel alloy, a titanium alloy or an aluminum alloy. The second layered member 1242 is made of a second metallic material such as a stainless steel alloy, a titanium alloy or an aluminum alloy. The third layered member 1243 is made of a third metallic material such as a stainless steel alloy, a titanium alloy or an aluminum alloy. Preferably, the first metallic material is different from the second and third metallic materials. For example, the first metallic material can be an aluminum alloy while the second and third metallic materials can be a stainless steel alloy. At least one of the second and third layered members 1242 and 1243 is attached to the first layered member 1241 by diffusion bonding. Preferably, both of the second and third layered members 1242 and 1243 are attached to the first layered member 1241 by diffusion bonding.

Preferably, the second and third layered members 1242 and 1243 are provided with textured portions (e.g., a plurality of dimples) to aid in the binding the second and third layered members 1242 and 1243 to the first layered member 1241 in the same manner as seen in FIGS. 30 and 31 of the eighth embodiment. Alternatively, the second and third layered members 1242 and 1243 can be made without textured portions.

The bicycle sprocket S in accordance with the thirteenth embodiment has the same overall configuration as the bicycle sprocket illustrated in FIG. 35, but the first layered member 1241 is made of metallic material instead of a non-metallic material and the bonding of the second and third layered members 1242 and 1243 to the first layered member 1241 is accomplished by diffusion bonding instead of by an integral molding process. The descriptions of the tenth embodiment apply to the thirteenth embodiment except for the material of the first layered member 1241 and the bonding of the second and third layered members 1242 and 1243 to the first layered member 1241. Like the tenth embodiment, the second layered members 1242 has concavo-convex portions 1250 and 1252 that mate with convex portions of the first layered member 1241.

FOURTEENTH EMBODIMENT

Figure 49:
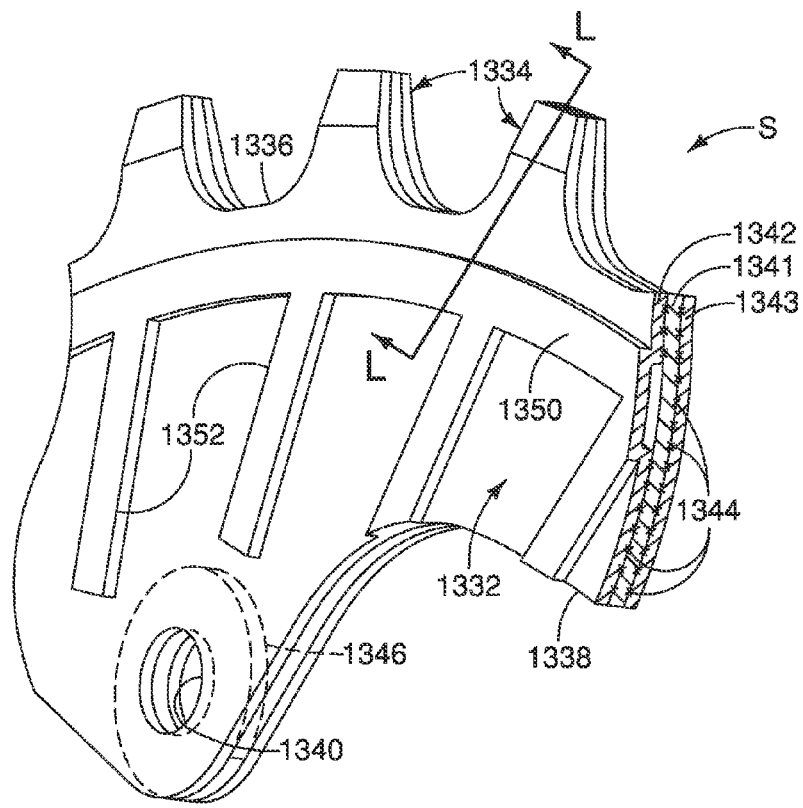
FIG. 49 is a partial perspective view of a portion of a bicycle sprocket in accordance with a fourteenth embodiment having the same overall configuration as the bicycle sprocket illustrated in FIG. 39, but the first layered member is made of metallic material instead of a non-metallic material.
Figure 50:
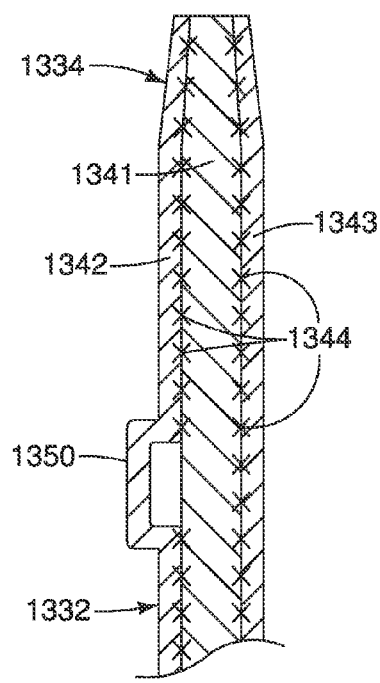
FIG. 50 is a partial cross sectional profile view of a portion of the bicycle sprocket illustrated in FIG. 49 as seen along section line L-L of FIG. 49.

Referring now to FIGS. 49 and 50, a front bicycle sprocket S is illustrated in accordance with a fourteenth embodiment. As shown in FIG. 49, the bicycle sprocket S includes a sprocket body 1332 and a plurality of sprocket teeth 1334. Similar to the prior embodiments, the bicycle sprocket S illustrated in FIGS. 49 and 50 has a multi-layered structure. Specifically, the sprocket body 1332 includes a first layered member 1341, a second layered member 1342 and a third layered member 1343. The first layered member 1341 is made of a first metallic material such as a stainless steel alloy, a titanium alloy or an aluminum alloy. The second layered member 1342 is made of a second metallic material such as a stainless steel alloy, a titanium alloy or an aluminum alloy. The third layered member 1343 is made of a third metallic material such as a stainless steel alloy, a titanium alloy or an aluminum alloy. Preferably, the first metallic material is different from the second and third metallic materials. For example, the first metallic material can be an aluminum alloy while the second and third materials can be a stainless steel alloy. At least one of the second and third layered members 1342 and 1343 is attached to the first layered member 1341 by adhesive 1344. Preferably, both of the second and third layered members 1342 and 1343 are attached to the first layered member 1341 by the adhesive 1344.

Preferably, the second and third layered members 1342 and 1343 are provided with textured portions (e.g., a plurality of dimples) to aid in the binding the second and third layered members 1342 and 1343 to the first layered member 1341 in the same manner as seen in FIGS. 30 and 31 of the eighth embodiment. Alternatively, the second and third layered members 1342 and 1343 can be made without textured portions.

The bicycle sprocket S in accordance with the fourteenth embodiment has the same overall configuration as the bicycle sprocket illustrated in FIGS. 39 to 41, but the first layered member 1341 is made of metallic material instead of a non-metallic material. The descriptions of the eleventh embodiment apply to the fourteenth embodiment except for the material of the first layered member 1341. Thus, the bicycle sprocket S in accordance with the fourteenth embodiment will not be discussed or illustrated in detail herein.

FIFTEENTH EMBODIMENT

Figure 51:
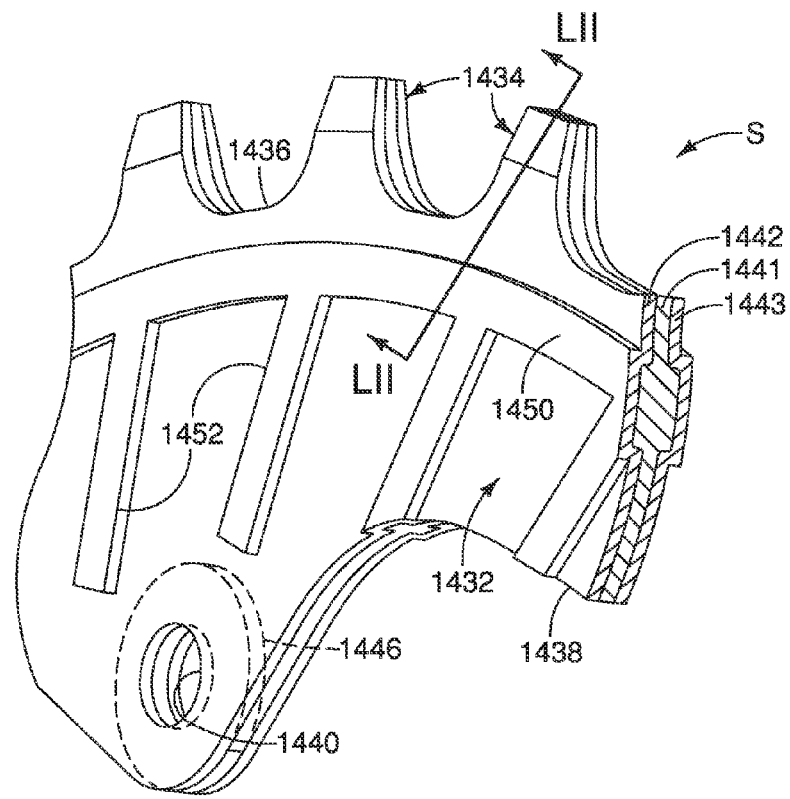
FIG. 51 is a partial perspective view of a portion of a bicycle sprocket in accordance with a fifteenth embodiment having the same overall configuration as the bicycle sprocket illustrated in FIGS. 42 and 43, but the first layered member is made of metallic material instead of a non-metallic material.
Figure 52:
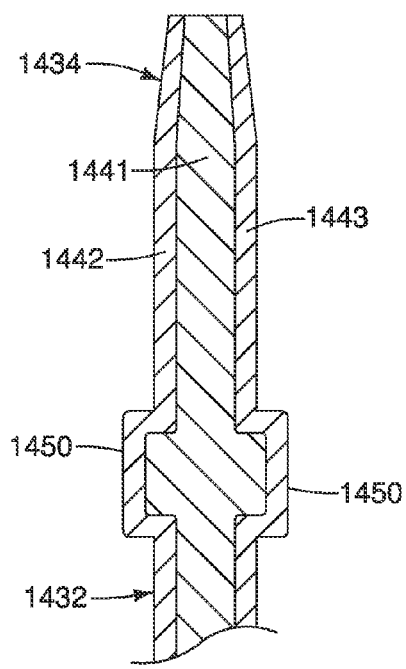
FIG. 52 is a partial cross sectional profile view of a portion of the bicycle sprocket illustrated in FIG. 51 as seen along section line LII-LII of FIG. 51.

Referring now to FIGS. 51 and 52, a front bicycle sprocket S is illustrated in accordance with a fifteenth embodiment. As shown in FIG. 51, the bicycle sprocket S includes a sprocket body 1432 and a plurality of sprocket teeth 1434. Similar to the prior embodiments, the bicycle sprocket S illustrated in FIGS. 51 and 52 has a multi-layered structure. Specifically, the sprocket body 1432 includes a first layered member 1441, a second layered member 1442 and a third layered member 1443. The first layered member 1441 is made of a first metallic material such as a stainless steel alloy, a titanium alloy or an aluminum alloy. The second layered member 1442 is made of a second metallic material such as a stainless steel alloy, a titanium alloy or an aluminum alloy. The third layered member 1443 is made of a third metallic material such as a stainless steel alloy, a titanium alloy or an aluminum alloy. Preferably, the first metallic material is different from the second and third metallic materials. For example, the first metallic material can be an aluminum alloy while the second and third materials can be a stainless steel alloy. One or both of the second and third layered members 1442 and 1443 is attached to the first layered member 1441 by diffusion bonding.

Preferably, the second and third layered members 1442 and 1443 are provided with textured portions (e.g., a plurality of dimples) to aid in the binding the second and third layered members 1442 and 1443 to the first layered member 1441 in the same manner as seen in FIGS. 30 and 31 of the eighth embodiment. Alternatively, the second and third layered members 1442 and 1443 can be made without textured portions.

The bicycle sprocket S in accordance with the fifteenth embodiment has the same overall configuration as the bicycle sprocket illustrated in FIGS. 42 to 46, but the first layered member 1441 is made of metallic material instead of a non-metallic material and the bonding of the second and third layered members 1442 and 1443 to the first layered member 1441 is accomplished by diffusion bonding instead of by an integral molding process. Like the twelfth embodiment, each of the second and third layered members 1442 and 1443 has concavo-convex portions 1450 and 1452 that mate with convex portions of the first layered member 1441. The descriptions of the twelfth embodiment apply to the fifteenth embodiment, except for the material of the first layered member 1441 and the bonding of the second and third layered members 1442 and 1443 to the first layered member 1441. Thus, the bicycle sprocket S in accordance with the fifteenth embodiment will not be discussed or illustrated in detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined". "connected", "coupled", "mounted", "bonded", "fixed" and their derivatives. The term "layered member", as used herein, means structure comprising a plurality of substantial layers that are overlapped with each other, but such substantial layers do not encompass very thin coating such as plated membranes. Also, the terms "part," "section," "portion," "member" or "element" when used in the singular can have the dual meaning of a single part or a plurality of parts. Also, it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, this invention can be applied for not only a type of a bicycle sprocket such as described in the illustrated embodiments but can also be applied to any kind of bicycle sprocket. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. For example, in each of the disclosed embodiments, the axial surfaces of the metallic layered members can be provided with a textured portion (e.g., a plurality of dimples) to aid in the binding one or more of the non-metallic layered members to the metallic layered member. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a sprocket body having a rotational axis; and
a plurality of sprocket teeth extending radially outwardly from an outer periphery of the sprocket body,
the sprocket body including a first layered member, a second layered member and a third layered member,
the first layered member having a first axial surface and a second axial surface opposite to the first axial surface,
the second layered member being attached to the first axial surface of the first layered member at an interior axial surface of the second layered member such that the first and second layered members overlap each other in an axial direction as viewed parallel to the rotational axis, the second layered member having an exterior axial surface,
the third layered member being attached to the second axial surface of the first layered member at an interior axial surface of the third layered member such that the first and third layered members overlap each other in the axial direction as viewed parallel to the rotational axis, the third layered member having an exterior axial surface,
at least one of the second and third layered members having at least one concavo-convex portion positioned radially inward from each of the sprocket teeth, the at least one concavo-convex portion defining a recess on one of the interior axial surfaces of the second and third layered members and defining a projection on the exterior axial surface of the one of the second and third layered members.

2. The bicycle sprocket according to claim 1, wherein the first layered member has a specific gravity that is less than those of the second layered member and the third layered member.

3. The bicycle sprocket according to claim 1, wherein at least one of the first and second axial surfaces of the first layered member has a convex portion that mates with the at least one concavo-convex portion.

4. The bicycle sprocket according to claim 3, wherein no gap exists at an interface between the at least one concavo-convex portion and the convex portion.

5. The bicycle sprocket according to claim 1, wherein the at least one of the second and third layered members being attached to the first layered member by an integral molding process.

6. The bicycle sprocket according to claim 1, wherein the at least one of the second and third layered members is attached to the first layered member by adhesive.

7. The bicycle sprocket according to claim 1, wherein the at least one of the second and third layered members is attached to the first layered member by diffusion bonding.

8. The bicycle sprocket according to claim 1, wherein the first layered member is made of a first metallic material, the second layered member is made of a second metallic material, the third layered member is made of a third metallic material, and the first metallic material being different from the second and third metallic materials.

9. The bicycle sprocket according to claim 1, wherein the first layered member is made of a first non-metallic material, the second layered member is made of a second metallic material, the third layered member is made of a third metallic material.

10. The bicycle sprocket according to claim 1, wherein each of the second and third layered members has at least one concavoconvex portion.

11. The bicycle sprocket according to claim 1, wherein the at least one concavo-convex portion extends in a circumferential direction along the sprocket body with respect to the rotational axis of the sprocket body.

12. The bicycle sprocket according to claim 1, wherein the at least one concavo-convex portion extends generally in a radial direction with respect to the rotational axis of the sprocket body.

13. The bicycle sprocket according to claim 1, wherein the at least one of the second and third layered members has a plurality of concavo-convex portions.

14. The bicycle sprocket according to claim 1, wherein at least one of the sprocket teeth includes the first layered member, the second layered member and the third layered member.

15. The bicycle sprocket according to claim 12, wherein the at least one concavo-convex portion inclines with respect to the radial direction with respect to the rotational axis of the sprocket body.

16. The bicycle sprocket according to claim 12, wherein the at least one concavo-convex portion includes a plurality of concavo-convex portions equaling to a total number of the sprocket teeth.

17. The bicycle sprocket according to claim 12, wherein the first concavo-convex portion is curved and the second concavo-convex portion extends from the first concavo-con vex portion towards the rotational axis of the sprocket body.

18. The bicycle sprocket according to claim 17, wherein the plurality of concavo-convex portions includes a plurality of the second concavo-convex portions extends from the first concavo-convex portion towards the rotational axis of the sprocket body.

19. A bicycle sprocket comprising:
a sprocket body having a rotational axis; and
a plurality of sprocket teeth extending radially outwardly from an outer periphery of the sprocket body,
the sprocket body including a first layered member, a second layered member and a third layered member,
the first layered member having a first axial surface and a second axial surface opposite to the first axial surface,
the second layered member being attached to the first axial surface of the first layered member such that the first and second layered members overlap each other in an axial direction as viewed parallel to the rotational axis,
the third layered member being attached to the second axial surface of the first layered member such that the first and third layered members overlap each other in the axial direction as viewed parallel to the rotational axis,
at least one of the second and third layered members having a plurality of concavo-convex portions positioned radially inward from each of the sprocket teeth, the plurality of concavo-convex portions including a first concavo-convex portion extending in a circumferential direction with respect to the rotational axis of the sprocket body and a second concavo-convex portion extending generally in a radial direction with respect to the rotational axis of the sprocket body.

20. A bicycle sprocket comprising:
a sprocket body having a rotational axis; and
a plurality of sprocket teeth extending radially outwardly from an outer periphery of the sprocket body,
the sprocket body including a first layered member, a second layered member and a third layered member,
the first layered member having a first axial surface and a second axial surface opposite to the first axial surface,
the second layered member being attached to the first axial surface of the first layered member such that the first and second layered members overlap each other in an axial direction as viewed parallel to the rotational axis,
the third layered member being attached to the second axial surface of the first layered member such that the first and third layered members overlap each other in the axial direction as viewed parallel to the rotational axis,
at least one of the second and third layered members having at least one concavo-convex portion positioned radially inward from each of the sprocket teeth and extending father in an axial direction from a side of the sprocket body farther than the sprocket teeth extends from the side of the sprocket body.

* * * * *